(12) United States Patent
Kobayashi et al.

(10) Patent No.: US 7,826,552 B2
(45) Date of Patent: Nov. 2, 2010

(54) SEMICONDUCTOR DEVICE AND WIRELESS COMMUNICATION SYSTEM

(75) Inventors: Hidetomo Kobayashi, Atsugi (JP); Tomoaki Atsumi, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 874 days.

(21) Appl. No.: 11/498,808

(22) Filed: Aug. 4, 2006

(65) Prior Publication Data

US 2007/0036237 A1 Feb. 15, 2007

(30) Foreign Application Priority Data

Aug. 11, 2005 (JP) ............................. 2005-232823
Nov. 4, 2005 (JP) ............................. 2005-321290

(51) Int. Cl.
    *H04L 25/49* (2006.01)
(52) U.S. Cl. .................. 375/295; 375/302; 375/303; 375/304
(58) Field of Classification Search .............. 375/269, 375/272, 239, 303, 271, 268, 323, 334, 300, 375/320, 353; 329/317, 300, 332, 100; 340/10.1–10.5
    See application file for complete search history.

(56) References Cited

U.S. PATENT DOCUMENTS 4,129,755 A * 12/1978 Murakami .................. 370/350
5,521,602 A * 5/1996 Carroll et al. ............ 340/10.41
5,677,927 A * 10/1997 Fullerton et al. ............ 375/130

(Continued)

FOREIGN PATENT DOCUMENTS

EP 0 730 251 9/1996

(Continued)

OTHER PUBLICATIONS

International Search Report dated Oct. 31, 2006 for Application No. PCT/JP 2006/315542.

(Continued)

*Primary Examiner*—Chieh M Fan
*Assistant Examiner*—Santiago Garcia
(74) *Attorney, Agent, or Firm*—Eric J. Robinson; Robinson Intellectual Property Law Office, P.C.

(57) ABSTRACT

The present invention provides a structure in which an amplitude-modulation mode and a frequency-modulation mode are switched. A semiconductor device of the invention has: a reset control circuit to which a modulation mode select signal which selects an amplitude-modulation mode or a frequency-modulation mode and Manchester-encoded information are input, which outputs a first reset signal and a second reset signal; a first frequency-dividing circuit to which a carrier wave is input, which outputs a sub-carrier wave responding to the amplitude-modulation mode or a frequency-modulation signal responding to the frequency-modulation mode, according to the first reset signal; a second frequency-dividing circuit which outputs a basic clock of which a duty ratio is different between the amplitude-modulation mode and the frequency-modulation mode, according to the second reset signal and an output of the first frequency-dividing circuit; and an ASK/FSK switching portion to which an output from the first frequency-dividing circuit and Manchester-encoded information are input, which outputs an amplitude-modulation signal or a frequency-modulation signal according to the modulation mode select signal.

8 Claims, 33 Drawing Sheets

U.S. PATENT DOCUMENTS

| | | | |
|---|---|---|---|
| 5,751,765 A | | 5/1998 | Matsubara |
| 5,907,585 A | * | 5/1999 | Suzuki et al. ............... 375/324 |
| 5,960,031 A | * | 9/1999 | Fullerton et al. ............ 375/130 |
| 5,995,534 A | * | 11/1999 | Fullerton et al. ............ 375/146 |
| 6,031,862 A | * | 2/2000 | Fullerton et al. ............ 375/146 |
| 6,320,900 B1 | * | 11/2001 | Liu ............................. 375/219 |
| 6,411,199 B1 | * | 6/2002 | Geiszler et al. ............ 340/10.1 |
| 6,470,053 B1 | * | 10/2002 | Liu ............................. 375/257 |
| 6,611,198 B1 | * | 8/2003 | Geiszler et al. .......... 340/10.41 |
| 2003/0043931 A1 | * | 3/2003 | Fullerton et al. ............ 375/295 |
| 2004/0233973 A1 | * | 11/2004 | Fullerton et al. ............ 375/130 |
| 2005/0063491 A1 | * | 3/2005 | Saloka ....................... 375/322 |
| 2005/0128827 A1 | | 6/2005 | Shionoiri et al. |
| 2005/0135181 A1 | | 6/2005 | Shionoiri et al. |
| 2006/0145816 A1 | * | 7/2006 | Koele ........................ 340/10.2 |
| 2007/0036237 A1 | * | 2/2007 | Kobayashi et al. .......... 375/269 |
| 2007/0064511 A1 | * | 3/2007 | Shionoiri et al. ............ 365/203 |
| 2007/0126059 A1 | * | 6/2007 | Dembo et al. ............... 257/344 |
| 2007/0229228 A1 | * | 10/2007 | Yamazaki et al. ........ 340/10.34 |
| 2007/0229281 A1 | * | 10/2007 | Shionoiri et al. ......... 340/572.7 |
| 2007/0290207 A1 | * | 12/2007 | Atsumi et al. ................. 257/71 |
| 2008/0088367 A1 | * | 4/2008 | Atsumi ....................... 329/310 |
| 2008/0111678 A1 | * | 5/2008 | Mizoguchi et al. ..... 340/539.11 |
| 2008/0153450 A1 | * | 6/2008 | Atsumi et al. ............... 455/337 |
| 2008/0164478 A1 | * | 7/2008 | Murakami et al. ............ 257/72 |
| 2009/0079572 A1 | * | 3/2009 | Atsumi et al. ............ 340/572.7 |

FOREIGN PATENT DOCUMENTS

| | | |
|---|---|---|
| EP | 1 170 696 | 1/2002 |
| JP | 07-200749 | 8/1995 |
| JP | 08-084163 | 3/1996 |
| JP | 08-241383 | 9/1996 |
| JP | 09-127196 | 5/1997 |
| JP | 11-120307 | 4/1999 |
| JP | 11-232406 | 8/1999 |
| JP | 2000-068890 | 3/2000 |

OTHER PUBLICATIONS

Written Opinion dated Oct. 31, 2006 for Application No. PCT/JP 2006/315542.

* cited by examiner

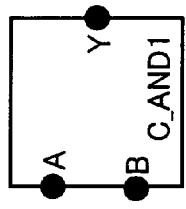
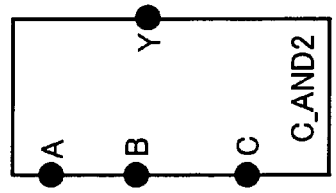
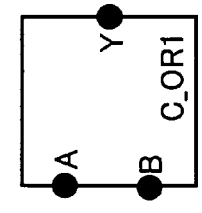
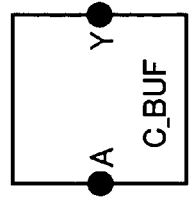
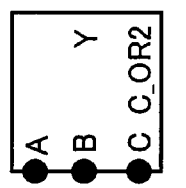
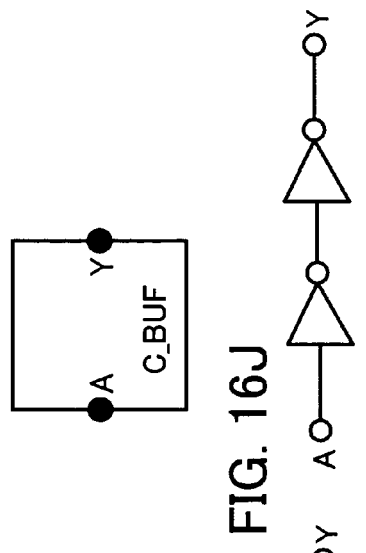
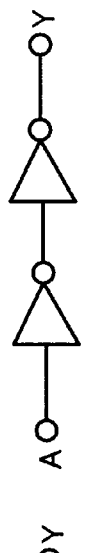
FIG. 16A, FIG. 16B, FIG. 16C, FIG. 16D, FIG. 16E, FIG. 16F, FIG. 16G, FIG. 16H, FIG. 16I, FIG. 16J

US 7,826,552 B2

SEMICONDUCTOR DEVICE AND WIRELESS COMMUNICATION SYSTEM

TECHNICAL FIELD

The present invention relates to a semiconductor device which can input and output data by wireless communication. In addition, the present invention relates to a wireless communication system having the semiconductor device and a reader/writer which inputs and outputs data by wireless communication.

BACKGROUND ART

An individual recognition technique is attracting attentions, such that an ID (identification number) is assigned to each object to clarify the history of the object for clarifying the manufacturing, management, or the like. In particular, an RFID (Radio Frequency Identification) technique using a semiconductor device which inputs and outputs data by wireless communication such as a wireless tag has started to be used. The wireless tag is also referred to as an IC tag, an IC chip, an RF (Radio Frequency) tag, an RFID tag, an electronic tag, or a transponder.

DISCLOSURE OF INVENTION

In a semiconductor device, inputting and outputting data by wireless communication is performed by encoding data stored in a memory, generating a signal for modulating a carrier wave according to encoded information, load-modulating a carrier wave according to the signal, and transmitting a modulated carrier wave from an antenna. There are a plurality of methods for modulating a carrier wave, and a semiconductor device which switches among a plurality of modulation methods to operate has been proposed.

For example, a semiconductor device which switches between a phase shift keying (PSK) method and a frequency shift keying (FSK) method to operate is described in Patent Document 1: Japanese Patent Laid-Open No. 7-200749. A structure of a semiconductor device described in the Patent Document 1 is shown typically in FIG. 10. The semiconductor device in FIG. 10 has a PSK circuit 1001, an FSK circuit 1002, a memory 1003, a first switch 1004, and a second switch 1005. In a case of performing PSK (hereinafter also referred to as a PSK mode or a phase-modulation mode), data output from the memory 1003 is input to the PSK circuit 1001 via the first switch 1004. The PSK circuit 1001 encodes the data output from the memory 1003, generates a signal (hereinafter also referred to as a phase-modulation signal) for phase-modulating a carrier wave according to the encoded information, and load-modulates a carrier wave 1006 by using the signal. The load-modulated carrier wave is output via the second switch 1005 (output 1008). The output 1008 is input to an antenna, and transmitted from the antenna. On the other hand, in a case of performing FSK (hereinafter also referred to as an FSK mode, or a frequency-modulation mode), data output from the memory 1003 is input to the FSK circuit 1002 via the first switch 1004. The FSK circuit 1002 encodes the data output from the memory 1003, generates a signal (hereinafter also referred to as a frequency-modulation signal) for frequency-modulating a carrier wave according to the encoded information, and load-modulates the carrier wave 1006 by using the signal. The load-modulated carrier wave is output via the second switch 1005 (output 1008). The output 1008 is input to the antenna, and transmitted from the antenna.

That is, a circuit (the PSK circuit 1001) which generates a signal for performing a PSK method and a circuit (the FSK circuit 1002) which generates a signal for performing an FSK method are provided independently of each other in the semiconductor device shown in FIG. 10. Then, whether the PSK circuit 1001 or the FSK circuit 1002 is used is selected by a switching signal 1007, the first switch 1004, and the second switch 1005.

In a conventional semiconductor device, in a case of performing communication by switching among a plurality of modulation methods, circuits corresponding to the plurality of modulation methods respectively are provided independently of each other and the plurality of circuits are switched. Therefore, a circuit scale of the semiconductor device is increased. When a circuit scale is increased, leading of wires is lengthened, and the yield is lowered. In addition, the number of semiconductor devices that can be formed over one substrate decreases, and manufacturing cost increases. Furthermore, power consumption increases.

In view of the above-described circumstances, it is an object of the invention to decrease a circuit scale in a semiconductor device capable of inputting and outputting data by wireless communication, which switches among a plurality of modulation methods to operate.

In order to solve the above-described problems, a semiconductor device of the invention which inputs and outputs data by wireless communication switches between an amplitude shift keying (ASK) method (also referred to as an amplitude-modulation method) and a frequency shift keying (FSK) method (also referred to as a frequency-modulation method) to operate, and has the following features.

A semiconductor device of the invention has a first frequency-dividing circuit, a second frequency-dividing circuit, an ASK/FSK switching portion, and a reset control circuit. A modulation mode select signal which selects an amplitude-modulation mode or a frequency-modulation mode, and Manchester-encoded information are input to the reset control circuit, and a first reset signal and a second reset signal are output from the reset control circuit. A carrier wave is input to the first frequency-dividing circuit, and a sub-carrier wave responding to the frequency-modulation mode or a frequency-modulation signal responding to the frequency-modulation mode is output from the first frequency-dividing circuit, according to the first reset signal. The second frequency-dividing circuit outputs a basic clock signal of which the duty ratio is different between the amplitude-modulation mode and the frequency-modulation mode, according to the second reset signal and the output of the first frequency-dividing circuit. The output from the first frequency-dividing circuit and Manchester-encoded information are input to the ASK/FSK switching portion, and an amplitude-modulation signal or a frequency-modulation signal is output from the ASK/FSK switching portion, according to the modulation mode select signal.

It is to be noted that the amplitude-modulation mode is a case where amplitude-modulation is performed, and the frequency-modulation mode is a case where frequency modulation is performed. The modulation mode select signal is a signal which selects the amplitude-modulation mode or the frequency-modulation mode. The frequency-modulation signal is a signal for frequency-modulating a carrier wave according to encoded information, and the amplitude-modulation signal is a signal for amplitude-modulating a carrier wave according to encoded information.

In the semiconductor device with the above structure, a structure which sets the data transmission rate to a plurality of stages may be provided. For example, a low-speed/high-speed switching portion to which the output of the first frequency-dividing circuit is input and from which a basic clock control signal is output to the second frequency-dividing circuit may be provided. The second frequency-dividing circuit to which the basic clock control signal is input outputs a basic clock signal of which the cycle is different depending on the selected data transmission rate. In this manner, the second frequency-dividing circuit outputs basic clock signals with different duty ratios between the amplitude-modulation mode and the frequency-modulation mode, and with different cycles depending on the data transmission rate, according to the second reset signal and the basic clock control signal.

Furthermore, the ASK/FSK switching portion may include an ASK signal generating portion and an output signal switching portion. A sub-carrier wave responding to the amplitude-modulation mode or a frequency-modulation signal responding to the frequency-modulation mode output from the first frequency-dividing circuit, and Manchester-encoded information are input to the ASK signal generating portion. In this way, the ASK signal generating portion processes arithmetically the sub-carrier wave responding to the amplitude-modulation mode and the Manchester-encoded information and thereby outputs an amplitude-modulation signal. Alternatively, the ASK signal generating portion outputs a frequency-modulation signal. The output from the ASK signal generating portion and the modulation mode select signal are input to the output signal switching portion. And the output signal switching portion switches and outputs an amplitude-modulation signal or a frequency-modulation signal, according to the modulation mode select signal.

It is to be noted that a control signal from the first frequency-dividing circuit and a count signal from the second frequency-dividing circuit may be input to the reset control circuit.

Furthermore, the semiconductor device of the invention may include an encoding circuit and an SOF-EOF adding circuit. Here, SOF stands for Start Of Frame, which is a frame start signal. EOF stands for End Of Frame, which is a frame end signal. Each data of flag, DSFID, UID, and CRC is sequentially input to the encoding circuit to be Manchester-encoded and output sequentially. DSFID stands for Data Storage Format Identifier, and UID stands for Unique Identifier. CRC stands for Cyclic Redundancy Check, which is result data of a cyclic redundancy check. The SOF-EOF adding circuit to which the output of the encoding circuit is input generates Manchester-encoded information by adding SOF and EOF to the output of the encoding circuit, and outputs the Manchester-encoded information.

Furthermore, the semiconductor device of the invention may include a modulating circuit. An amplitude-modulation signal or a frequency-modulation signal is input to the modulating circuit, and the modulating circuit load-modulates a carrier wave by the amplitude-modulation signal or the frequency-modulation signal.

The semiconductor device of the invention may include an antenna and a modulating circuit. An amplitude-modulation signal or a frequency-modulation signal is input to the modulating circuit, and the modulating circuit load-modulates a carrier wave by the amplitude-modulation signal or the frequency-modulation signal. The antenna transmits the load-modulated carrier wave.

Furthermore, the invention may be a wireless communication system having a semiconductor device and a reader/writer which inputs and outputs data from/to the semiconductor device by wireless communication.

According to the above-described structure, a circuit which generates a signal for performing an amplitude-modulation method and a circuit which generates a signal for performing a frequency-modulation method can be shared in a semiconductor device with a structure in which the amplitude-modulation method and the frequency-modulation method are switched. Specifically, a frequency-dividing circuit (a first frequency-dividing circuit) which generates a sub-carrier wave and a circuit (a second frequency-dividing circuit) which outputs a basic clock signal of which the duty ratio is different depending on the sub-carrier wave can be shared between the amplitude-modulation method and the frequency-modulation method. In addition, a circuit (a low-speed/high-speed switching portion) which changes the cycle of a basic clock signal depending on the selected data transmission rate can be shared between the amplitude-modulation method and the frequency-modulation method. Furthermore, a modulating circuit which load-modulates a carrier wave according to the amplitude-modulation signal or the frequency-modulation signal can be shared between the amplitude-modulation method and the frequency-modulation method.

In this manner, in a semiconductor device capable of inputting and outputting data by wireless communication and which operates by switching among a plurality of modulation methods, the circuit scale can be decreased. Therefore, leading of wires can be shortened and the yield can be improved. Furthermore, the number of semiconductor devices that can be formed over one substrate increases, and manufacturing cost can be lowered. Furthermore, power consumption can be decreased.

BRIEF DESCRIPTION OF DRAWINGS

FIGS. 16A to 16J are diagrams each showing a structure of a semiconductor device of Embodiment Mode 2.

BEST MODE FOR CARRYING OUT THE INVENTION

Figure 1:
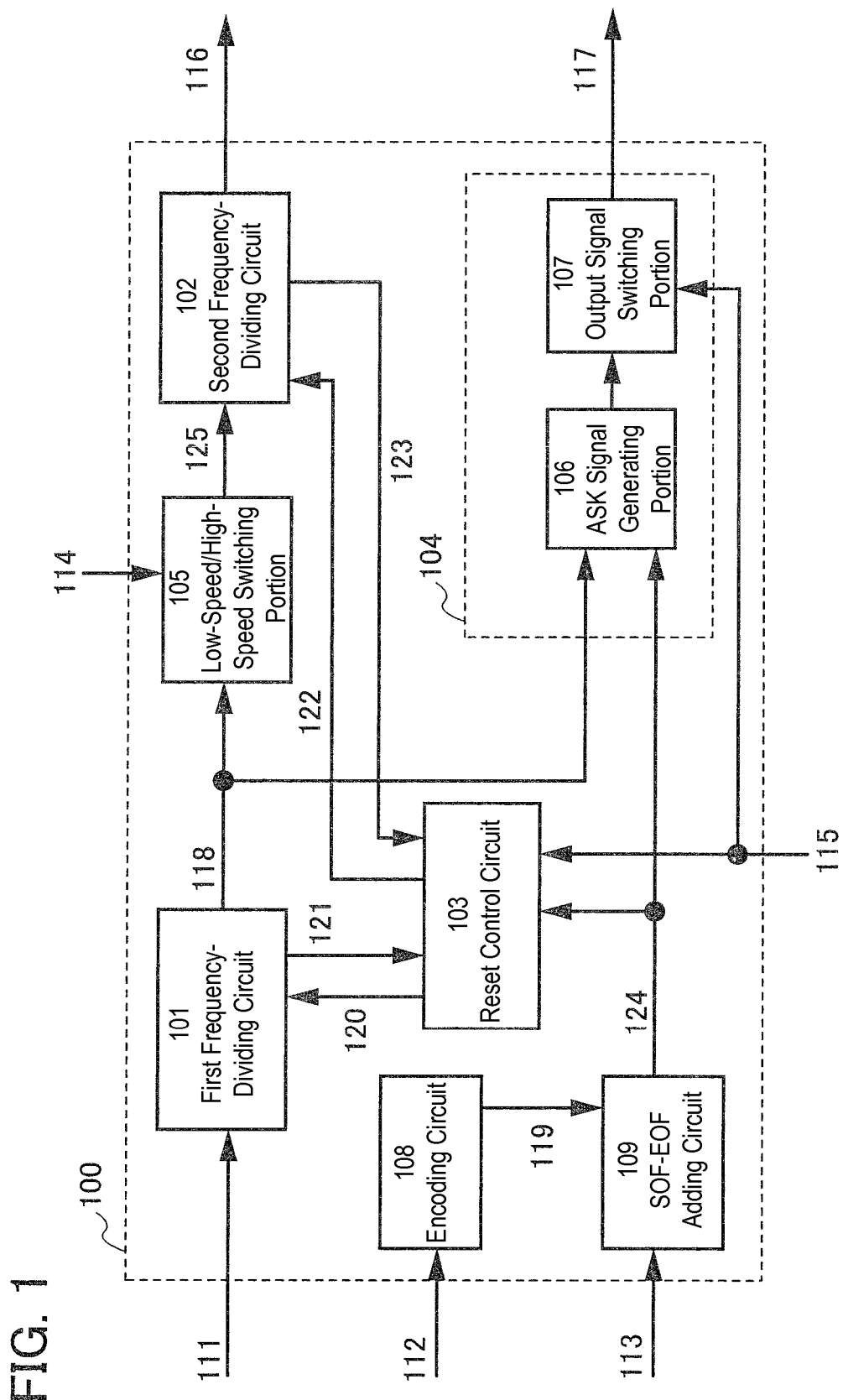
FIG. 1 is a diagram showing a structure of a semiconductor device of Embodiment Mode 1.

Embodiment modes of the invention will be described in detail with reference to the drawings. However, the invention is not limited to the following description, and it is to be easily understood by those skilled in the art that modes and details can be changed variously without departing from the purpose and the scope of the invention. Therefore, the invention is not interpreted as being limited to the following description of embodiment modes. In the structure of the invention described hereinafter, reference numerals and symbols indicating the same things are used in common in the different drawings. In addition, in the invention, "be connected" is synonymous with "be electrically connected", so that another element or the like may be interposed.

Embodiment Mode 1

In Embodiment Mode 1, a structure of a semiconductor device of the invention capable of inputting and outputting data by wireless communication and its operation will be described with reference to FIGS. 1 to 9.

Figure 2:
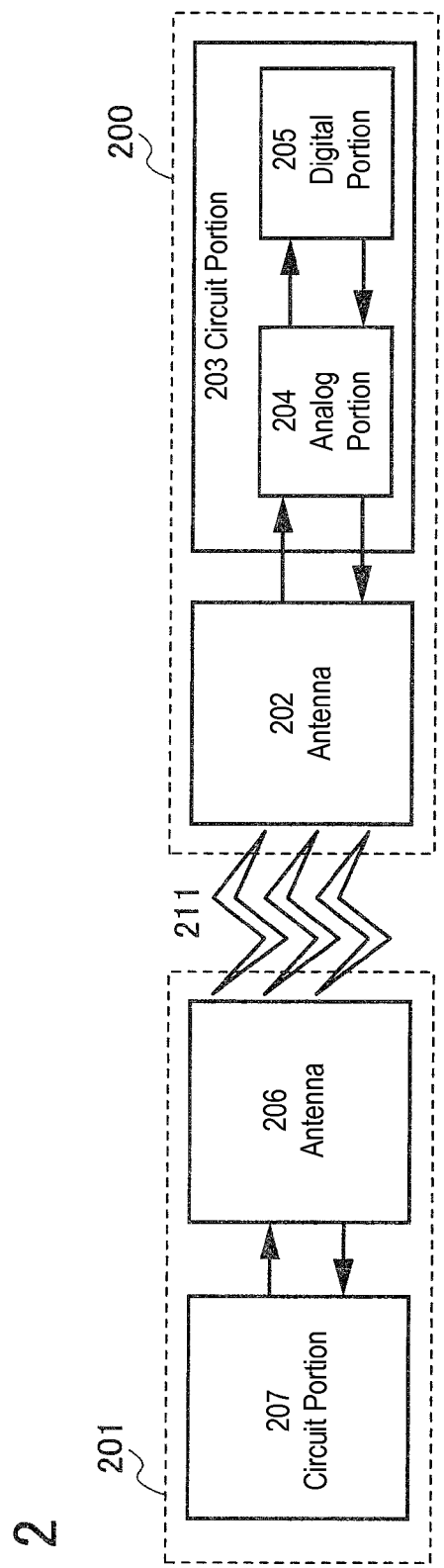
FIG. 2 is a diagram showing a structure of a semiconductor device of Embodiment Mode 1.

A structure of a semiconductor device of the invention (denoted by a wireless tag 200, in FIG. 2) is shown in FIG. 2. In addition, a structure of a wireless communication system having the wireless tag 200 and a reader/writer 201 which inputs and outputs data from/to the wireless tag 200 by wireless communication is shown. The wireless tag 200 has an antenna 202, and a circuit portion 203 which transmits and receives signals to/from the antenna 202. The reader/writer 201 has an antenna 206 and a circuit portion 207 which transmits and receives signals to/from the antenna 206. The wireless tag 200 and the reader/writer 201 output and input data by transmitting and receiving a modulated carrier wave 211 (also referred to as a wireless signal), using the antenna 202 and the antenna 206. The circuit portion 203 has an analog portion 204 and a digital portion 205. The analog portion 204 transmits and receives signals to/from the antenna 202. The digital portion 205 transmits and receives signals to/from the analog portion 204.

Figure 5:
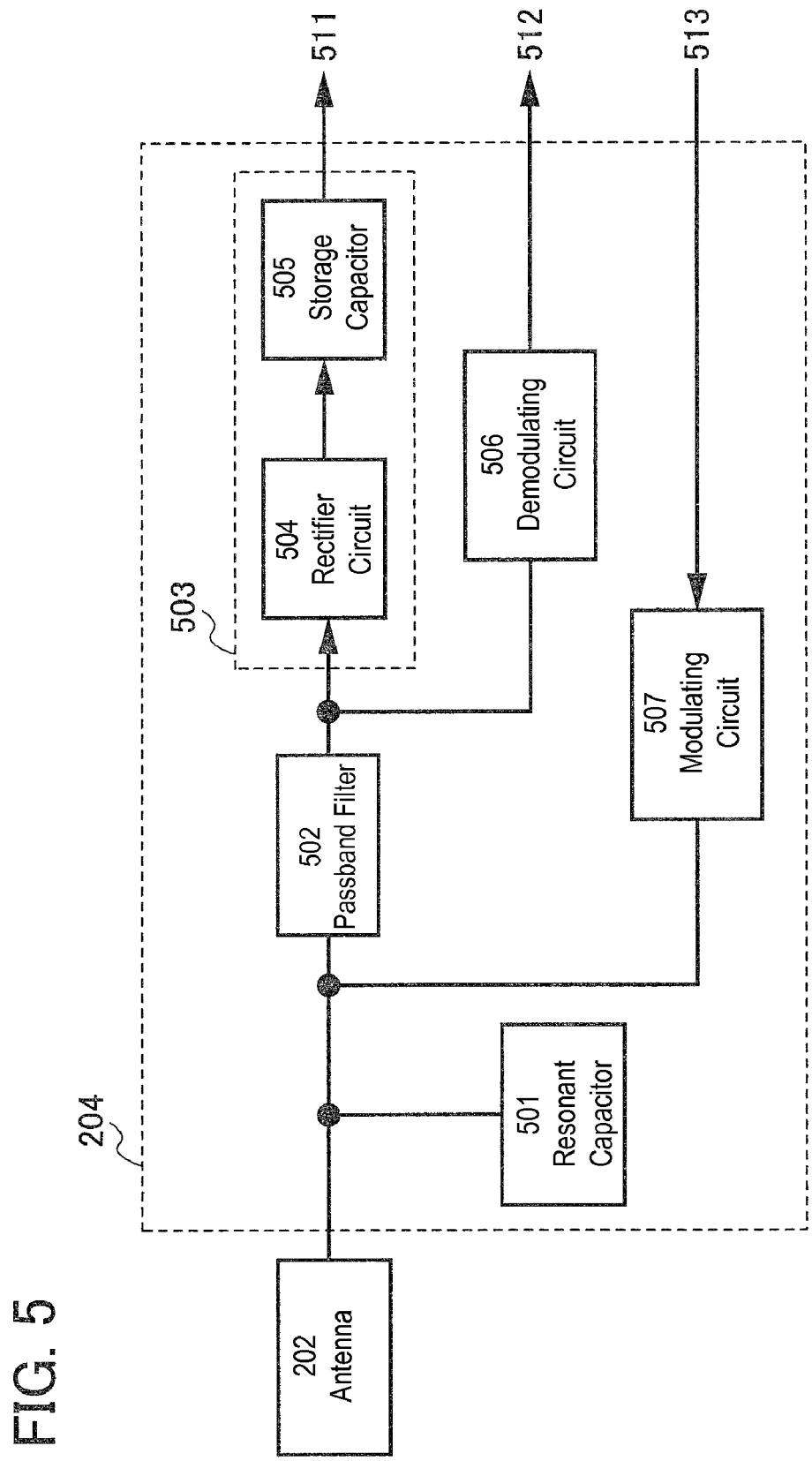
FIG. 5 is a diagram showing a structure of a semiconductor device of Embodiment Mode 1.

A structure of the analog portion 204 is shown in FIG. 5. The analog portion 204 has a resonant capacitor 501, a passband filter 502, a power supply circuit 503, a demodulating circuit 506, and a modulating circuit 507. The resonant capacitor 501 is provided so that the antenna 202 can easily receives a signal with a predetermined frequency. A modulated carrier wave input from the antenna 202, from which noises are removed by the passband filter 502, is input to the power supply circuit 503 and the demodulating circuit 506. The power supply circuit 503 has a rectifier circuit 504 and a storage capacitor 505. The modulated carrier wave input via the passband filter 502 is rectified by the rectifier circuit 504 and smoothed by the storage capacitor 505. In this manner, the power supply circuit 503 generates a DC voltage. The DC voltage 511 generated in the power supply circuit 503 is supplied as a power supply voltage to each circuit in the circuit portion 203 included in the wireless tag 200. The modulated carrier wave input via the passband filter 502 is demodulated by the demodulating circuit 506, and the demodulated signal 512 is input to the digital portion 205. In addition, a signal 513 (a signal for modulating a carrier wave corresponding to each modulation method) output from the digital portion 205 is input to the modulating circuit 507. The modulating circuit 507 load-modulates the carrier wave according to the input signal, and outputs the carrier wave to the antenna 202.

Figure 3:
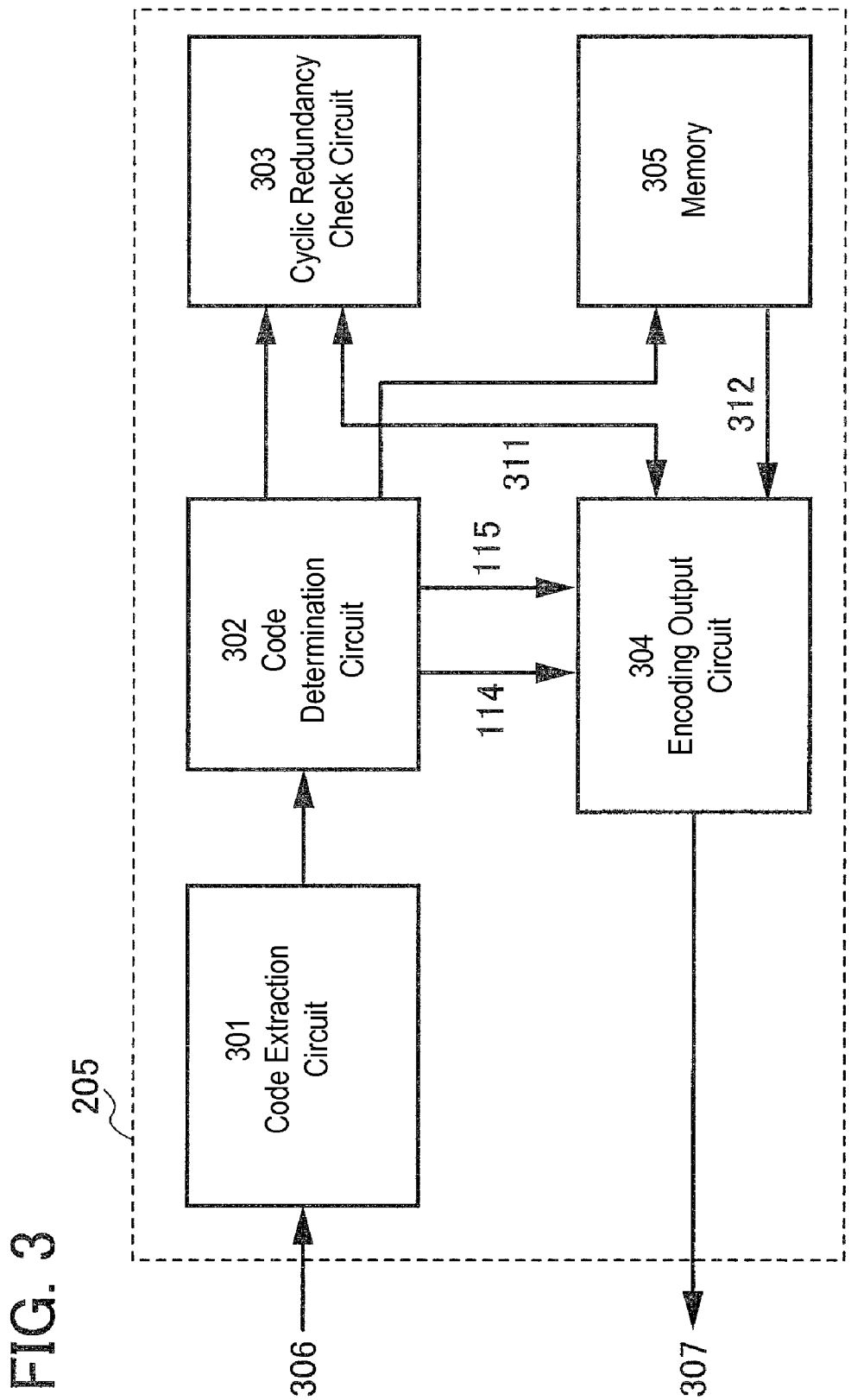
FIG. 3 is a diagram showing a structure of a semiconductor device of Embodiment Mode 1.

A structure of the digital portion 205 is shown in FIG. 3. The digital portion 205 has a code extraction circuit 301, a code determination circuit 302, a cyclic redundancy check circuit 303, a memory 305, and an encoding output circuit 304. An input 306 from the analog portion 204, that is, a signal which is made by demodulating a modulated carrier wave by the demodulating circuit 506, is input to the code extraction circuit 301, and a code of the signal is extracted. An output of the code extraction circuit 301 is input to the code determination circuit 302, and the extracted code is analyzed. The analyzed code is input to the cyclic redundancy check circuit 303, and an arithmetic processing for identifying a transmission error is performed. Then, the cyclic redundancy check circuit 303 outputs CRC 311 to the encoding output circuit 304. The memory 305 outputs a stored UID 312 to the encoding output circuit 304, according to a signal input from the code determination circuit 302. The code determination circuit 302 outputs a signal which selects a case of performing an amplitude-modulation (an amplitude-modulation mode) or a case of performing a frequency modulation (a frequency-modulation mode), that is, a modulation mode select signal 115, to the encoding output circuit 304. In addition, the code determination circuit 302 outputs a transmission rate switching signal 114 for switching among a plurality of stages of the data transmission rate to the encoding output circuit 304. The encoding output circuit 304 outputs an amplitude-modulation signal or a frequency-modulation signal. The output 307 of the encoding output circuit 304 is input to the modulating circuit 507 of the analog portion 204.

Figure 4:
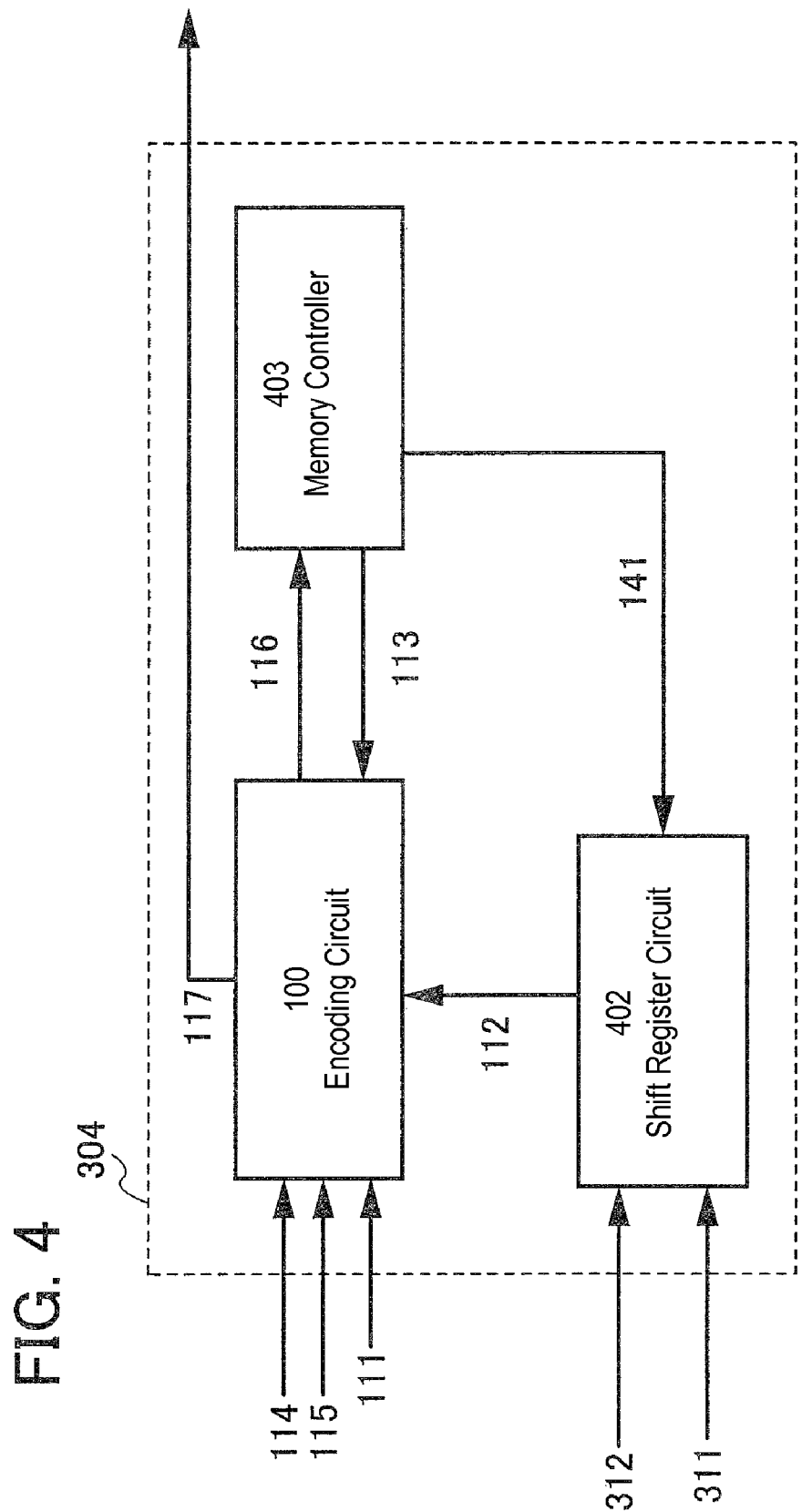
FIG. 4 is a diagram showing a structure of a semiconductor device of Embodiment Mode 1.

A structure of the encoding output circuit 304 is shown in FIG. 4, in more detail. The encoding output circuit 304 has an encoding circuit 100, a memory controller 403, and a shift register circuit 402. A basic clock signal 116 output from the encoding circuit 100 is input to the memory controller 403, and the memory controller 403 outputs a first enable signal 141 and a second enable signal 113. The UID 312, the CRC 311, and the first enable signal 141 are input to the shift register circuit 402. Then, the shift register circuit 402 generates a flag and a DSFID, and outputs the flag, the DSFID, the UID, and the CRC sequentially, synchronizing with the first enable signal 141. A carrier wave 111, a modulation mode select signal 115 output from the code determination circuit 302, a transmission rate switching signal 114, and data 112 in which the flag, the DSFID, the UID, and the CRC are lined sequentially output from the shift register circuit 402, and the second enable signal 113 output from the memory controller 403 are input to the encoding circuit 100. An output 117 of the encoding circuit 100 is an amplitude-modulation signal or a frequency-modulation signal, which becomes an output 307 of the encoding output circuit 304. The output 307 is input to a modulating circuit 507 of the analog portion 204.

A structure of the encoding circuit 100 is shown in FIG. 1, in more detail. The encoding circuit 100 has a first frequency-dividing circuit 101, a second frequency-dividing circuit 102, a reset control circuit 103, an ASK/FSK switching portion 104, a low-speed/high-speed switching portion 105, an encoding circuit 108, and an SOF-EOF adding circuit 109. The ASK/FSK switching portion 104 has an ASK signal generating portion 106 and an output signal switching portion 107.

A modulation mode select signal 115 which selects an amplitude-modulation mode or a frequency-modulation mode, and Manchester-encoded information 124 are input to the reset control circuit 103, and the reset control circuit 103 outputs a first reset signal 120 and a second reset signal 122. A carrier wave 111 is input to the first frequency-dividing circuit 101, and the first frequency-dividing circuit 101 outputs a signal 118 (a sub-carrier wave responding to the amplitude-modulation mode or a frequency-modulation signal responding to the frequency-modulation mode) according to the first reset signal 120. The low-speed/high-speed switching portion 105 outputs a basic clock control signal 125, responding to the signal 118 output from the first frequency-dividing circuit 101 and a transmission rate switching signal 114. The second frequency-dividing circuit 102 outputs a basic clock signal 116 of which the duty ratio is different between the amplitude-modulation mode and the frequency-modulation mode, and of which the period is different depending on the data transmission rate, according to the second reset signal 122 and an output of the low-speed/high-speed switching portion 105 (the basic clock control signal 125). The signal 118 output from the first frequency-dividing circuit 101 and Manchester-encoded information 124 are input to the ASK/FSK switching portion 104, and the ASK/FSK switching portion 104 outputs an amplitude-modulation signal or a frequency-modulation signal according to the modulation mode select signal 115. The output of the ASK/FSK switching portion 104 becomes an output 117 of the encoding circuit 100.

It is to be noted that, although a structure in which the signal 118 output from the first frequency-dividing circuit 101 is input to the second frequency-dividing circuit 102 via the low-speed/high-speed switching portion 105 is shown in FIG. 1, the invention is not limited thereto. In a case where the data transmission rate is not changed, a structure in which the low-speed/high-speed switching portion 105 is not provided and the signal 118 output from the first frequency-dividing circuit 101 is input to the second frequency-dividing circuit 102 can also be adopted.

The ASK/FSK switching portion 104 has the ASK signal generating portion 106 and the output signal switching portion 107. To the ASK signal generating portion 106, the signal 118 output from the first frequency-dividing circuit 101, that is, the sub-carrier wave responding to the amplitude-modulation mode or the frequency-modulation signal responding to the frequency-modulation mode, and the Manchester-encoded information 124 are input. Then, in a case where the sub-carrier wave responding to the amplitude-modulation mode is input, the ASK signal generating portion 106 processes arithmetically the sub-carrier wave responding to the amplitude-modulation mode and the Manchester-encoded information 124, and outputs an amplitude-modulation signal. In a case where the frequency-modulation signal responding to the frequency-modulation mode is input, the ASK signal generating portion outputs the frequency-modulation signal. To the output signal switching portion 107, the output of the ASK signal generating portion 106 is input. Thus, the output signal switching portion 107 outputs an amplitude-modulation signal or a frequency-modulation signal by switching between the two according to the modulation mode select signal 115. The output of the output signal switching portion 107 becomes an output 117 of the encoding circuit 100.

To the reset control circuit 103, a control signal 121 is input from the first frequency-dividing circuit 101, and a count signal 123 is input from the second frequency-dividing circuit 102.

The data 112 in which each of the flag, DSFID, UID, and CRC is lined sequentially are input to the encoding circuit 108, and the encoding circuit 108 generates Manchester-encodes the data 112 and then outputs sequentially (an output 119). The output 119 of the encoding circuit 108 is input to the SOF-EOF adding circuit 109, and the SOF-EOF adding circuit 109 generates Manchester-encoded information 124 by adding SOF and EOF to the output 119 in synchronization with the second enable signal 113 input from the memory controller 403. In this manner, the SOF-EOF adding circuit 109 outputs the Manchester-encoded information 124.

The above-described amplitude-modulation signal, frequency-modulation signal, the signal 118 output from the first frequency-dividing circuit 101, the Manchester-encoded information 124, and the output 119 from the encoding circuit 108 will be described in detail, with reference to FIGS. 6A to 6D, FIGS. 7A and 7B, FIGS. 8A and 8B, and FIG. 9.

As for timing of signals or the like, an example based on ISO 15693 is described. That is, a frequency of a carrier wave is 13.56 MHz±7 kHz. A frequency of a sub-carrier wave is f/32 (approximately 423.75 kHz) (f is a frequency of a carrier wave) in a case of a single sub-carrier wave, that is, in a case of the amplitude-modulation mode, and f/32 (approximately 423.75 kHz) and f/28 (approximately 484.28 kHz) in a case of a double sub-carrier wave, that is, in a case of the frequency-modulation mode. The data transmission rate is switched between two stages of high-speed and low-speed. In a case of a single sub-carrier wave, that is, in a case of the amplitude-modulation mode, the data transmission rate is approximately 26.48 kbit/s when high-speed, and 6.62 kbit/s when low-speed. In a case of a double sub-carrier wave, that is, in a case of the frequency-modulation mode, the data transmission rate is approximately 26.69 kbit/s when high-speed, and 6.67 kbit/s when low-speed. An output of the low-speed/high-speed switching portion 105 (a basic clock control signal 125) is switched between a case where the signal 118 is output without changing the frequency (responding to a case where the data transmission rate is set to be high-speed) and a case where the signal 118 is output while being divided by four (responding to a case where the data transmission rate is set to be low-speed). By this basic clock control signal 125, the cycle of the basic clock signal 116 in the case where the data transmission rate is set to be low-speed can be 4 times that of the case where the data transmission rate is set to be high-speed.

Here, an amplitude-modulation signal and a frequency-modulation signal will be described with reference to FIGS. 6A to 6D. An amplitude-modulation signal and a frequency-modulation signal are both digital signals. In FIGS. 6A to 6D, examples responding to a case where the transmission rate is high-speed are shown. "f" in FIGS. 6A to 6D denotes the frequency of a carrier wave. In a case where the transmission rate is low-speed, a signal has one bit transmission duration which is four times longer than that shown in FIGS. 6A to 6D, and the number of pulses of a sub-carrier wave in one bit is four times that of a case of high-speed.

Figure 6C:
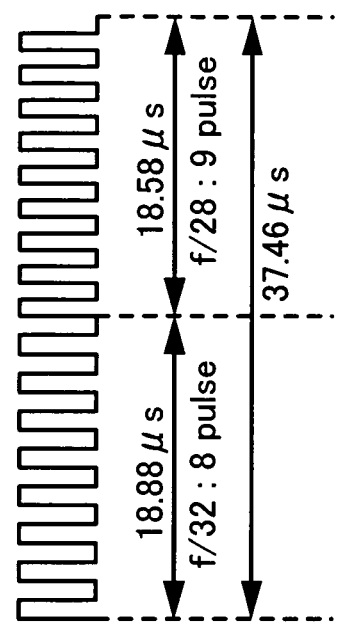
FIGS. 6A to 6D are diagrams each showing a signal of a semiconductor device of Embodiment Mode 1.
Figure 6D:
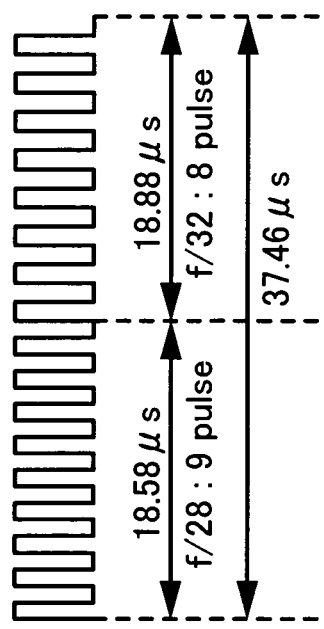
Figure 6A:
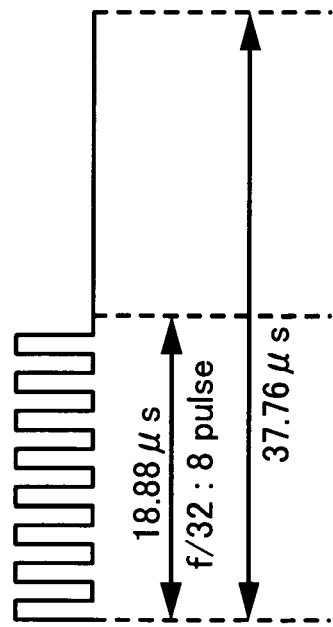
Figure 6B:
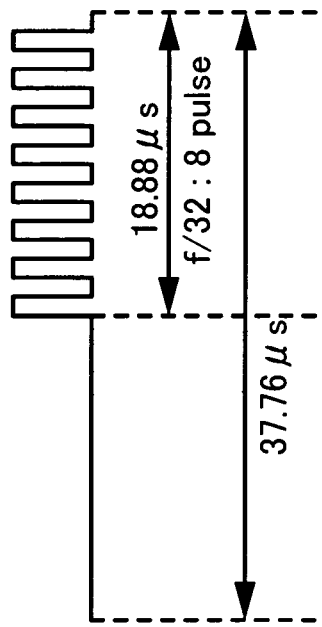

An amplitude-modulation signal is a signal for amplitude-modulating a carrier wave according to encoded information in an amplitude-modulation (ASK) mode. A logical value "0" of an amplitude-modulation signal is shown in FIG. 6A, and a logical value "1" of an amplitude-modulation signal is shown in FIG. 6B.

A frequency-modulation signal is a signal for frequency-modulating a carrier wave according to encoded information in a frequency-modulation (FSK) mode. A logical value "0" of a frequency-modulation signal is shown in FIG. 6C, and a logical value "1" of a frequency-modulation signal is shown in FIG. 6D. A frequency-modulation signal is constituted by two sub-carrier waves with different frequencies. Connection between the two sub-carrier waves is required to be continuous. In a semiconductor device of the invention, the first frequency-dividing circuit 101 is controlled by the reset control circuit 103 so that connection between two sub-carrier waves is continuous in the frequency-modulation mode. In this way, the semiconductor device can operate normally.

The basic clock signal 116 responding to the amplitude-modulation signal is a clock of which the frequency is 37.76 μs and duty ratio is 18.88:18.88, that is, 1:1. On the other hand, the basic clock signal 116 responding to the frequency-modulation signal is a clock of which the frequency is 37.46 μs and duty ratio is 18.88:18.58 or 18.58:18.88. In this way, in a structure where an amplitude-modulation mode and a frequency-modulation mode are switched, the frequency and duty ratio of the basic clock signal 116 differs depending on which mode is selected. In the semiconductor device of the invention, the reset control circuit 103 controls the second frequency-dividing circuit 102 so that the basic clock signal 116 of which the frequency and duty ratio are different according to the amplitude-modulation mode or the frequency-modulation mode can be output. In this manner, the semiconductor device can operate normally.

Figure 7A:
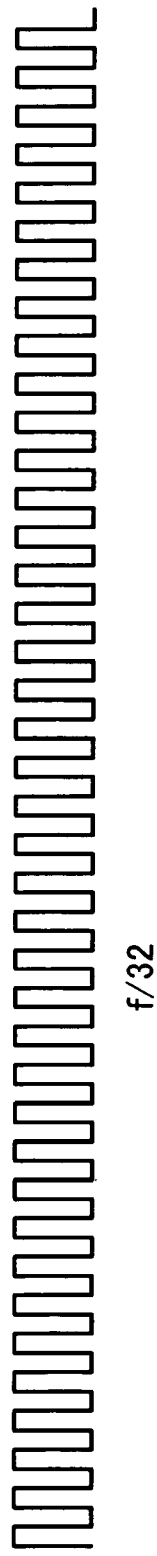
FIGS. 7A and 7B are diagrams each showing a signal of a semiconductor device of Embodiment Mode 1.
Figure 7B:
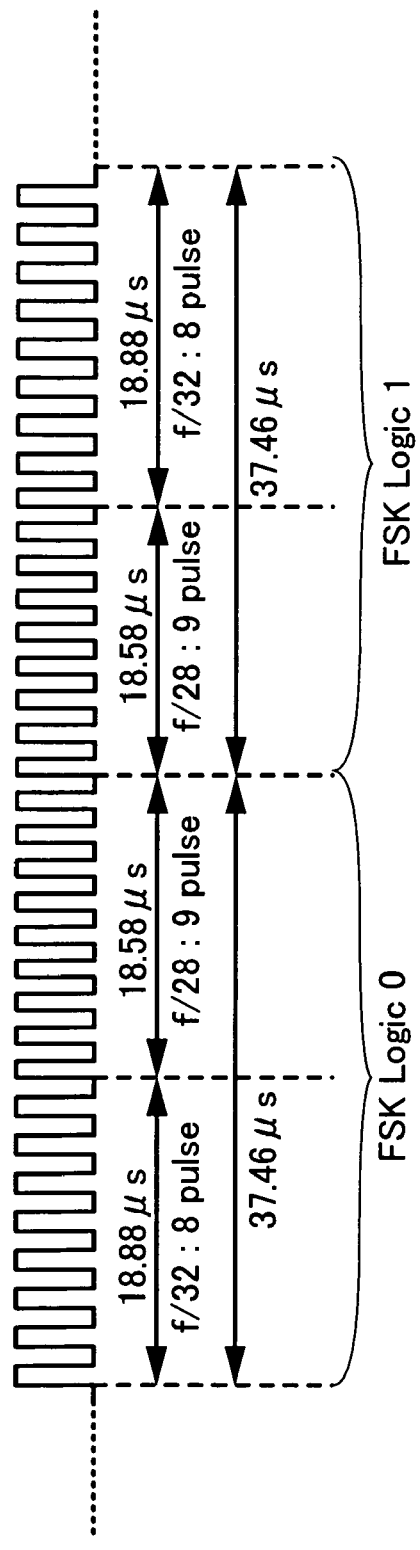

Next, the signal 118 output from the first frequency-dividing circuit 101 will be described, with reference to FIGS. 7A and 7B. The signal 118 responding to the amplitude-modulation mode is shown in FIG. 7A. The signal 118 responding to the frequency-modulation mode is shown in FIG. 7B. In FIGS. 7A and 7B, an example responding to a case where the transmission rate is high-speed is shown. "f" in FIGS. 7A and 7B denotes the frequency of a carrier wave. In a case where the transmission rate is low-speed, a signal has one bit transmission duration which is four times longer than that shown in FIGS. 7A and 7B, and the number of pulses of a sub-carrier wave in one bit is four times that of a case of high-speed.

In FIG. 7A, the signal 118 responding to the amplitude-modulation mode is a single sub-carrier wave, and the frequency is f/32 (f is the frequency of a carrier wave). The signal 118 responding to the amplitude-modulation mode is not related to the Manchester-encoded information 124.

In FIG. 7B, the signal 118 responding to the frequency-modulation mode is a signal expressing the Manchester-encoded information 124 by using a double sub-carrier wave (a sub-carrier wave of which the frequency is f/32 and a sub-carrier wave of which the frequency is f/28). Therefore, the signal 118 responding to the frequency-modulation mode corresponds to a frequency-modulation signal.

Figure 8A:
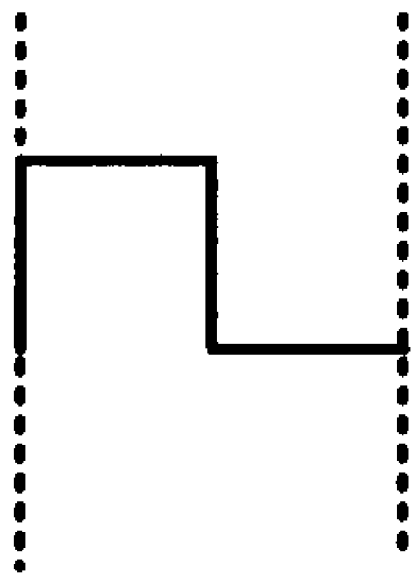
FIGS. 8A and 8B are diagrams each showing a signal of a semiconductor device of Embodiment Mode 1.
Figure 8B:
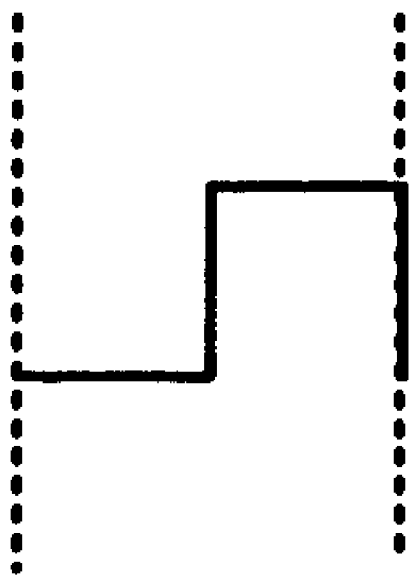
Figure 9:
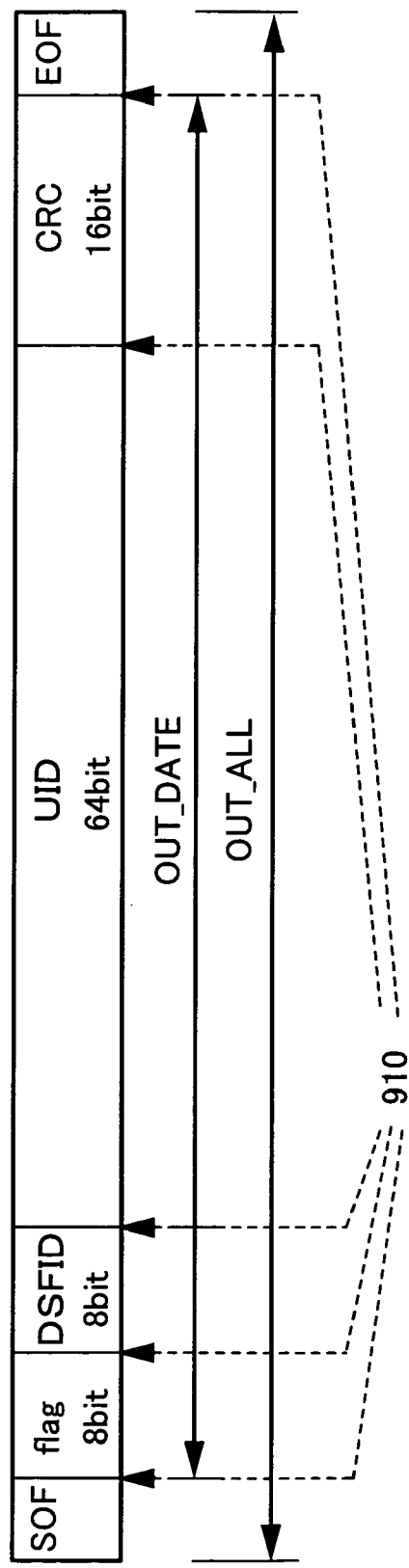
FIG. 9 is a diagram showing a signal of a semiconductor device of Embodiment Mode 1.
Figure 10:
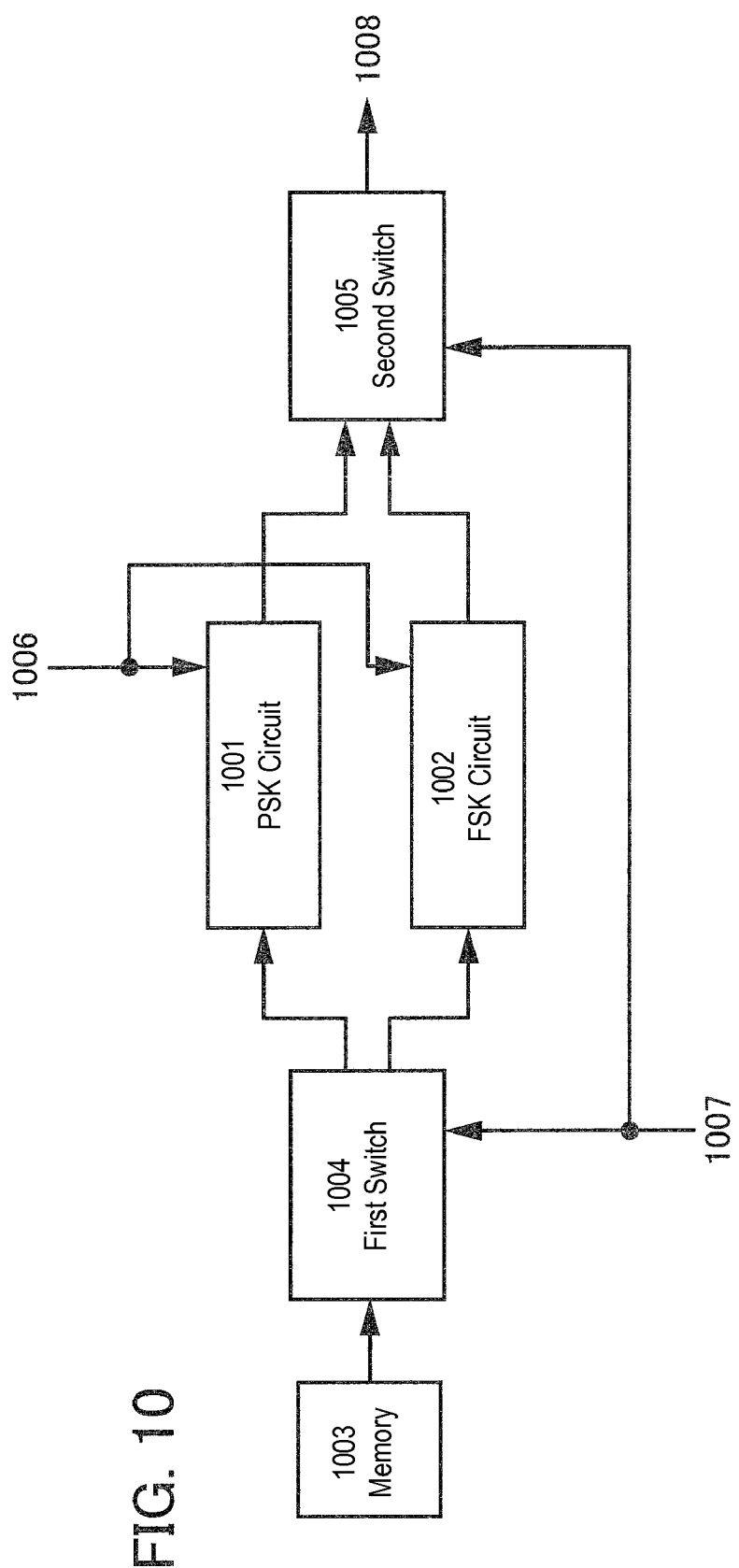
FIG. 10 is a diagram showing a structure of a conventional semiconductor device.

Next, the Manchester-encoded information 124 and the output 119 will be described with reference to FIGS. 8A and 8B, and FIG. 9. A signal representing a logical value "0" of the Manchester-encoded information 124 and a signal representing a logical value "1" of the Manchester-encoded information 124 are shown in FIGS. 8A and 8B, respectively. The Manchester-encoded information 124 is a signal in which SOF, a flag, DSFID, UID, CRC, and EOF are lined sequentially, as shown in FIG. 9. A signal before the SOF and EOF are added corresponds to the output 119. In FIG. 9, timings of portions 910 indicated by dotted arrows are controlled by a first enable signal 141 and a second enable signal 113 output by the memory controller 403. In particular, timing between the flag and DSFID, timing between DSFID and UID, and timing between UID and CRC are controlled by the first enable signal 141 output by the memory controller 403. In addition, timing between SOF and the flag, and timing between CRC and EOF are controlled by the second enable signal 113 output by the memory controller 403.

The above is a description of a structure of the semiconductor device of the invention and the operation thereof. Although a structure of the semiconductor device of the invention as a whole is described, a particular feature of the semiconductor device of the invention is that the amplitude-modulation method and the frequency-modulation method are switched. That is, there is a characteristic in the structure shown in FIG. 1 (particularly, the first frequency-dividing circuit 101, the second frequency-dividing circuit 102, the reset control circuit 103, and the ASK/FSK switching portion 104). Therefore, circuits with known structures can be arbitrarily applied to portions other than the circuits shown in FIG. 1.

In addition, in the description above, an example based on ISO 15693 is described, but the invention is not limited thereto. As for the frequency of a carrier wave, the frequency of a sub-carrier wave, the data transmission rate, the encoding method and the like, arbitrary methods can be used.

For example, as for the frequency of a carrier wave, any of the following can be employed: a submillimeter wave of 300 GHz or more and 3 THz or less; a millimeter wave of 30 GHz or more and less than 300 GHz; a microwave of 3 GHz or more and less than 30 GHz; an ultrashort wave of 300 MHz or more and less than 3 GHz; a very short wave of 30 MHz or more and less than 300 MHz; a short wave of 3 MHz or more and less than 30 MHz; a medium wave of 300 KHz or more and less than 3 MHz; a long wave of 30 KHz or more and less than 300 KHz; and a very long wave of 3 KHz or more and less than 30 KHz.

As the memory 305, a DRAM (Dynamic Random Access Memory), an SRAM (Static Random Access Memory), an FeRAM (Ferroelectric Random Access Memory), a mask ROM (Read Only Memory), an EPROM (Electrically Programmable Read Only Memory), an EEPROM (Electrically Erasable and Programmable Read Only Memory), or a flash memory can be used.

As an antenna 202 of the semiconductor device and an antenna 206 of the reader/writer, any of a dipole antenna, a patch antenna, a loop antenna, and a Yagi antenna can be used. In addition, a method for transmitting and receiving carrier waves (wireless signals) which are modulated in the antenna 202 and the antenna 206 can be any of an electromagnetic coupling type, an electromagnetic induction type, and an electric wave type. Furthermore, a communication method of the antenna 202 and the antenna 206 is one-way communication or two-way communication, and any of a space-division multiplex system, a polarization-division multiplex system, a frequency-division multiplex system, a time-division multiplex system, a code-division multiplex system, and an orthogonal frequency-division multiplex system can be used.

In the description above, a structure of a semiconductor device (the wireless tag 200) which receives a wireless signal from the reader/writer 201 and responds to the wireless signal is explained. However, the invention can also be applied to a reader/writer.

According to the above-described structure, in a semiconductor device capable of inputting and outputting data by wireless communication and a wireless communication system using the semiconductor device of the invention, part of circuits which generate amplitude-modulation signals and frequency-modulation signals (the first frequency-dividing circuit 101, the second frequency-dividing circuit 102, the low-speed/high-speed switching portion 105, the modulating circuit 507 and the like) can be shared between the amplitude-modulation method and the frequency-modulation method. In this way, size and power consumption of the semiconductor device can be reduced.

Embodiment Mode 2

In Embodiment Mode 2, a further specific structure of the structure described in Embodiment Mode 1 will be described with reference to FIGS. 11 to 15, FIGS. 16A to 16J, FIGS. 17A and 17B, FIGS. 18A and 18B, and FIGS. 19A and 19B. It is to be noted that circuit blocks indicated by the same symbols in the figures show the same structures. In addition, of terminals indicated by open circles in views, the same signals are input to terminals indicated by the same symbols. A description "_b" stands for an inverted signal. That is, "fc1_b" stands for an inverted signal of "fc1".

Figure 11:
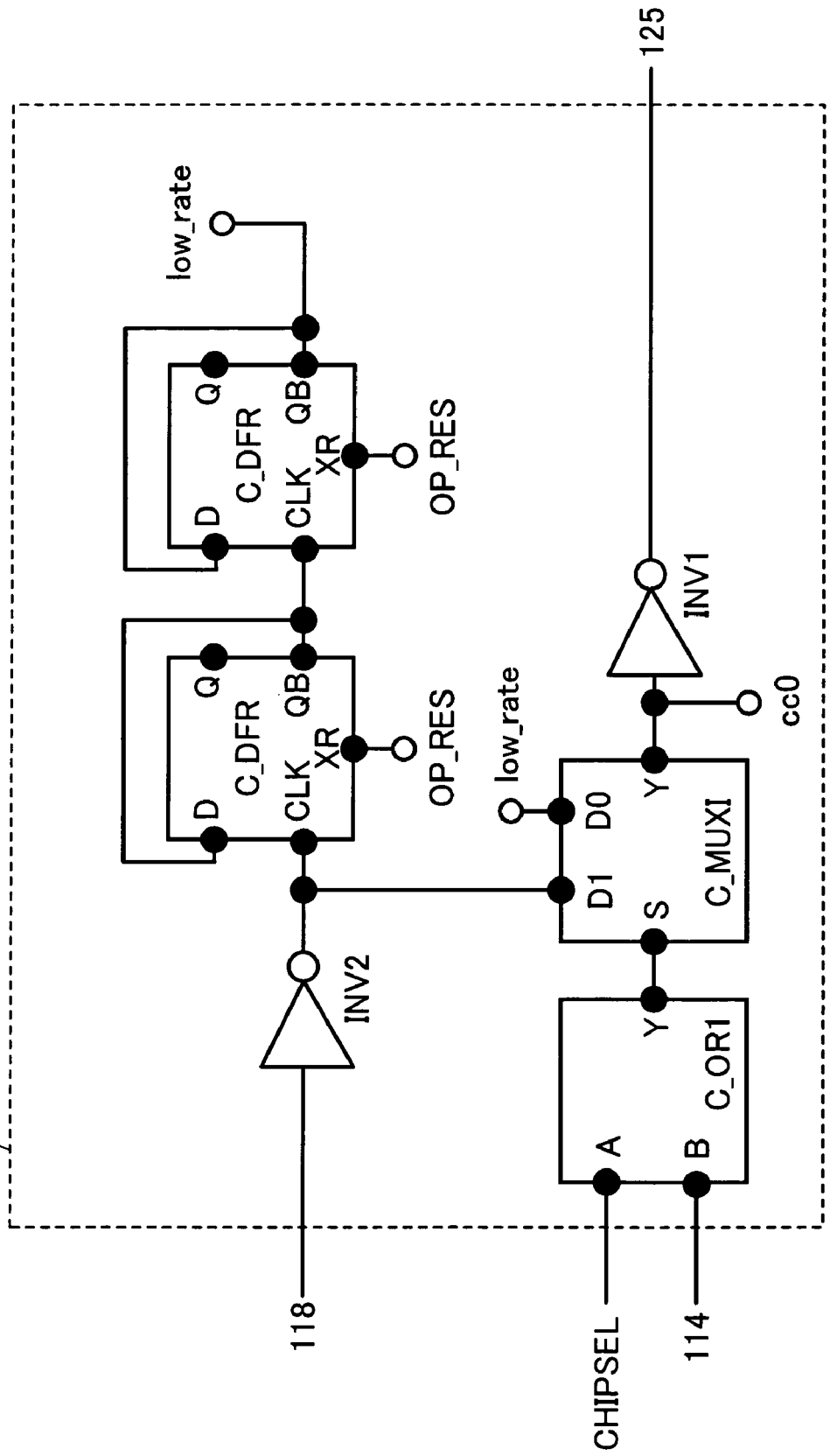
FIG. 11 is a diagram showing a structure of a semiconductor device of Embodiment Mode 2.

In FIG. 11, a structure of the low-speed/high-speed switching portion 105 is shown. The low-speed/high-speed switching portion 105 includes an INV1, an INV2, two C_DFRs, a C_OR1, and a C_MUXI.

A transmission rate switching signal 114 is a signal which selects whether the data transmission rate is made to be high speed or low speed. The C_DFR is a reset type D-type flip-flop circuit, and the two C_DFRs constitute a frequency-dividing circuit. The signal 118 output from the first frequency-dividing circuit is input to the frequency-dividing circuit, divided by four, and output to a terminal low_rate. The C_MUXI is a multiplexer. The C_MUXI selects whether to output a signal with the same frequency as the signal 118 or output a signal of the terminal low_rate (corresponding to a signal obtained by dividing the signal 118 by four), according to the transmission rate switching signal 114. In this manner, the low-speed/high-speed switching portion 105 outputs a signal with the same frequency as the signal 118 or a signal obtained by dividing the signal 118 by four, as the basic clock control signal 125.

A CHIPSEL is a signal which sets a period in which the semiconductor device (the wireless tag 200) responds to the wireless signal from the reader/writer 201. An OP-RES is a signal which stops an operation of the low-speed/high-speed switching portion 105. By stopping the operation of the low-speed/high-speed switching portion 105 by the OP-RES in a period in which the low-speed/high-speed switching portion 105 does not output a signal, power consumption of the circuit can be reduced.

Hereinafter, a further specific structure of the circuit blocks included in the low-speed/high-speed switching portion 105 will be described.

Figures 17A, 17B:
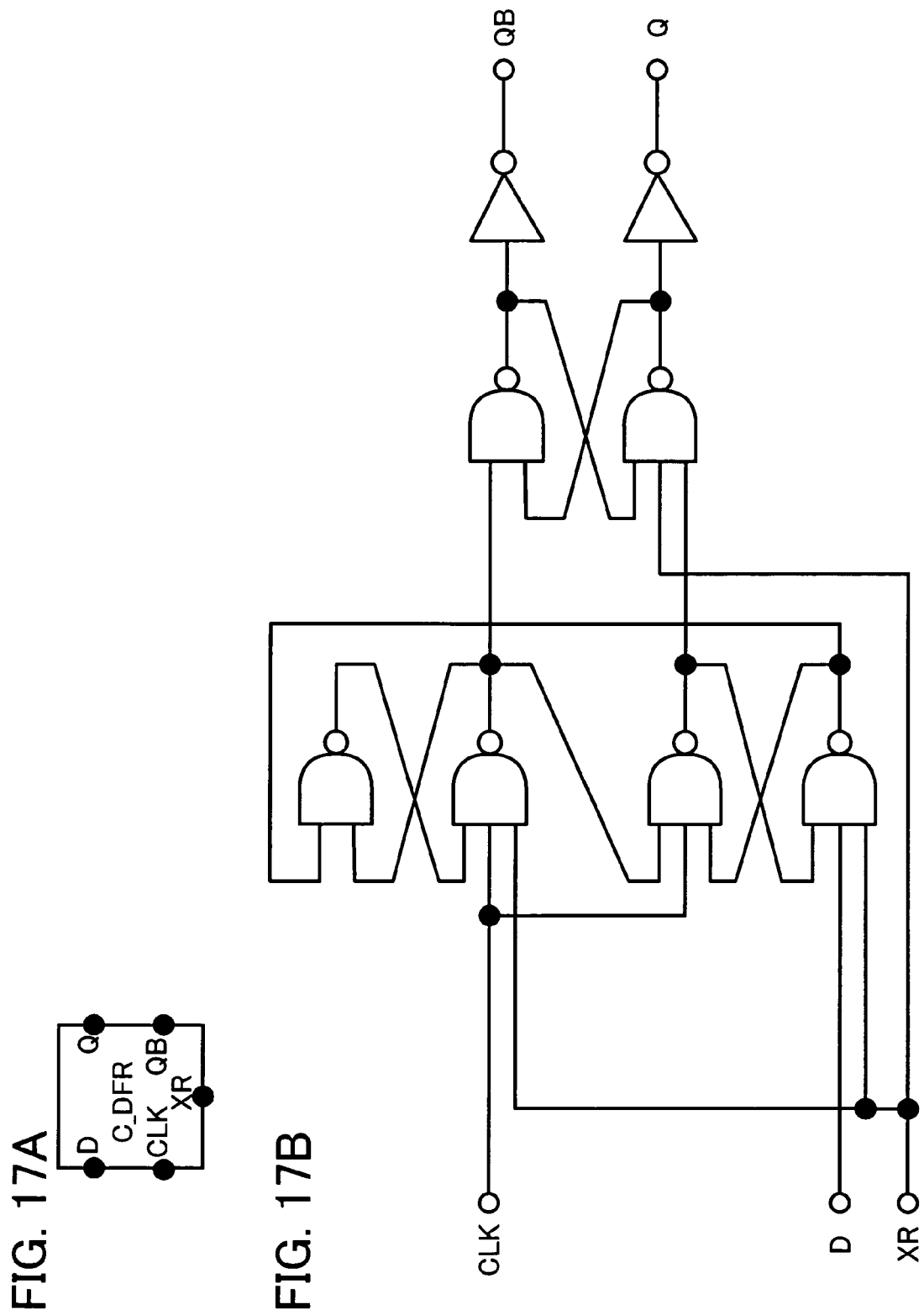
FIGS. 17A and 17B are diagrams each showing a structure of a semiconductor device of Embodiment Mode 2.
Figure 19B:
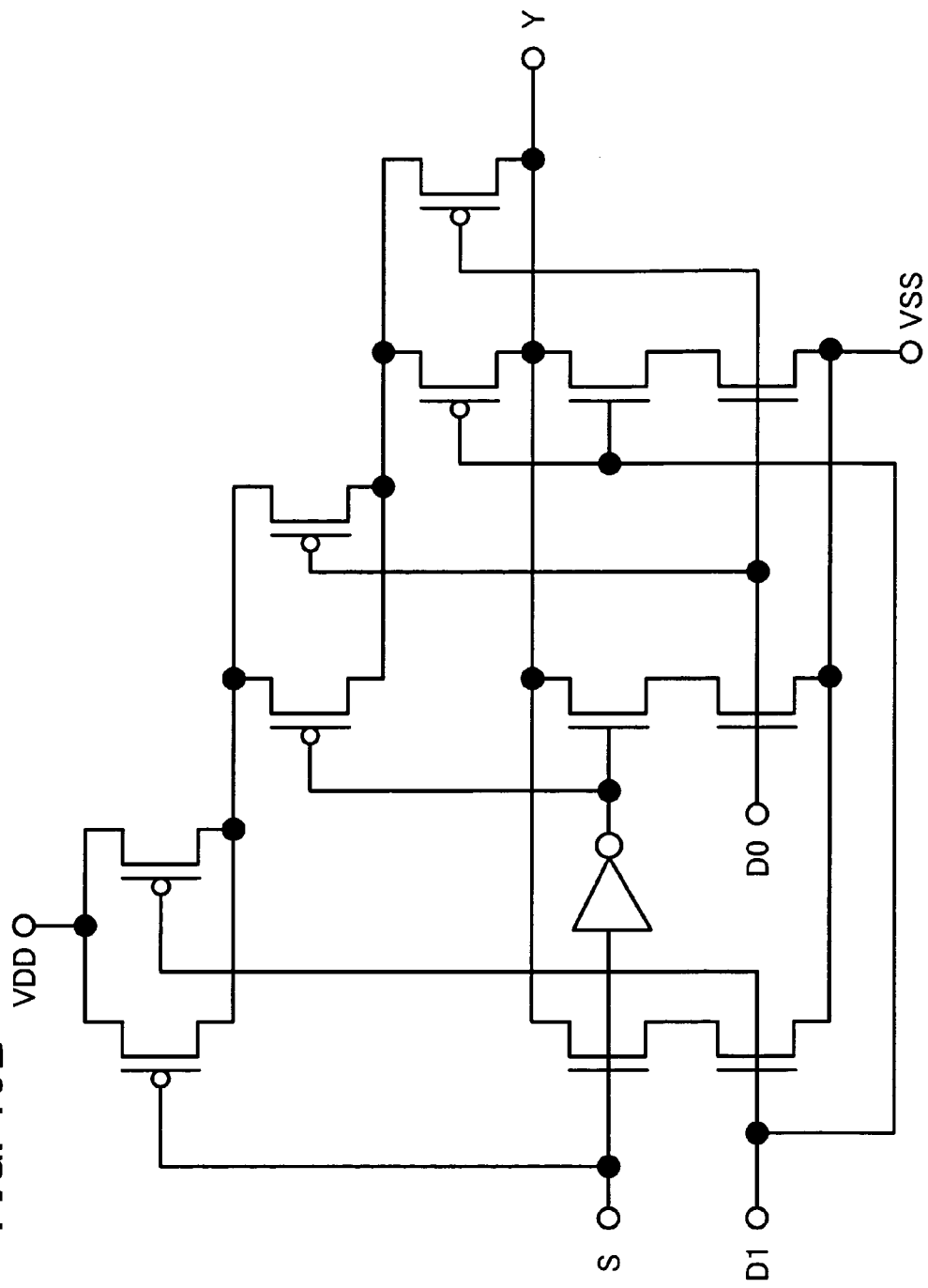
FIGS. 19A and 19B are diagrams each showing a structure of a semiconductor device of Embodiment Mode 2.
Figure 19A:
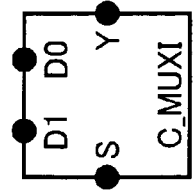

A specific structure of the C_DFR is shown in FIGS. 17A and 17B. FIG. 17A shows the C_DFR with a circuit block, and FIG. 17B corresponds to the specific circuit structure. In FIG. 17B, the C_DFR includes six NAND circuits and two inverter circuits. A specific structure of the C_OR1 is shown in FIGS. 16E and 16F. FIG. 16E shows the C_OR1 with a circuit block, and FIG. 16F corresponds to the specific circuit structure. A structure of the C_MUXI is shown in FIGS. 19A and 19B. FIG. 19A shows the C_MUXI with a circuit block, and FIG. 19B corresponds to the specific circuit structure.

In FIG. 19B, VDD stands for a potential of the high potential side of a power supply voltage. VSS stands for a potential of the low potential side of the power supply voltage. A potential difference between VDD and VSS is a power supply voltage. The power supply voltage can be generated by the power supply circuit 503 shown in FIG. 5.

The above is a description of the low-speed/high-speed switching portion 105. Next, a structure of the first frequency-dividing circuit 101 will be described.

Figure 12:
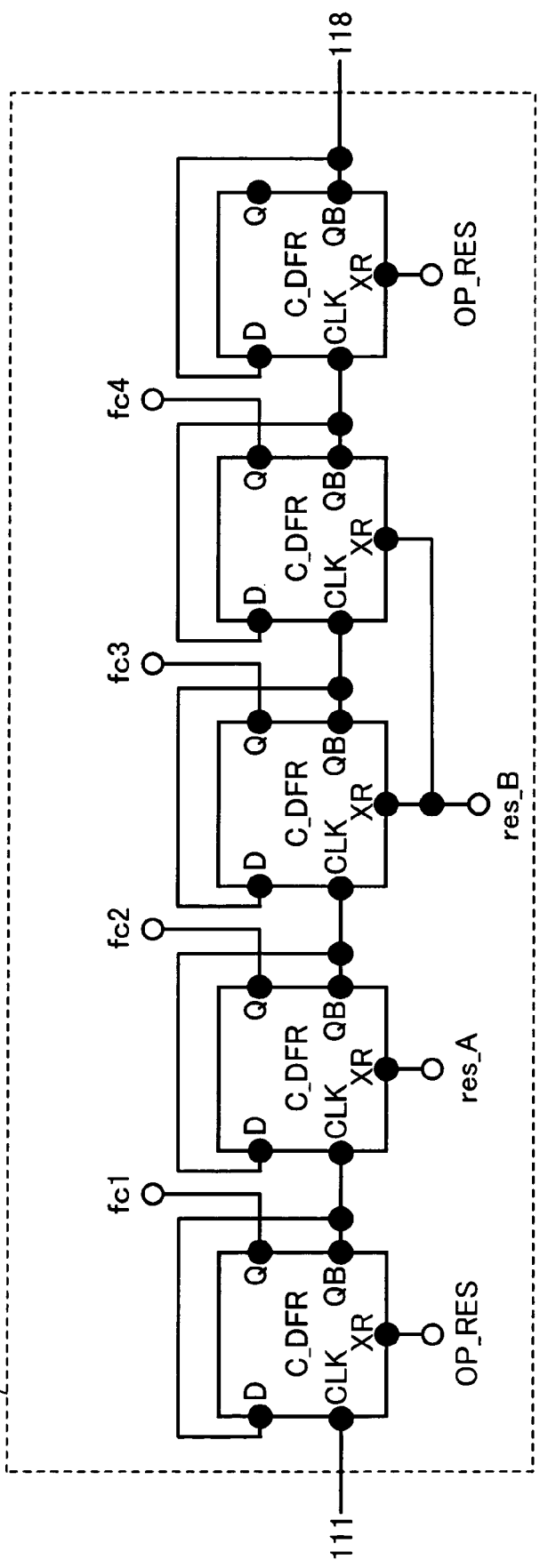
FIG. 12 is a diagram showing a structure of a semiconductor device of Embodiment Mode 2.

In FIG. 12, a structure of the first frequency-dividing circuit 101 is shown. The first frequency-dividing circuit 101 includes five C_DFRs. The five C_DFRs constitute a frequency-dividing circuit, which divides an input carrier wave 111 by 32 and outputs it. In addition, in a case of the frequency-modulation mode, the input signal is divided by 28 by the first reset signal 120 (corresponding to res_A and res_B, in FIG. 12) input from the reset control circuit 103, and then output. In this manner, in the frequency-dividing circuit, by inputting the first reset signals 120, a frequency-modulation signal can be generated and output as the signal 118.

It is to be noted that the first frequency-dividing circuit 101 also outputs the control signal 121 (corresponding to fc1, fc2, fc3, and fc4, in FIG. 12) for controlling the reset control circuit 103.

The OP_RES is a signal which stops an operation of the first frequency-dividing circuit 101. By stopping the operation of the first frequency-dividing circuit 101 by the OP_RES in a period in which the first frequency-dividing circuit 101 does not output a signal, power consumption of the circuit can be reduced.

A specific structure of the C_DFR is the structure shown in FIGS. 17A and 17B, and as described above, so the explanation is omitted here.

The above is a description of the structure of the first frequency-dividing circuit 101. Next, the second frequency-dividing circuit 102 will be described.

Figure 13:
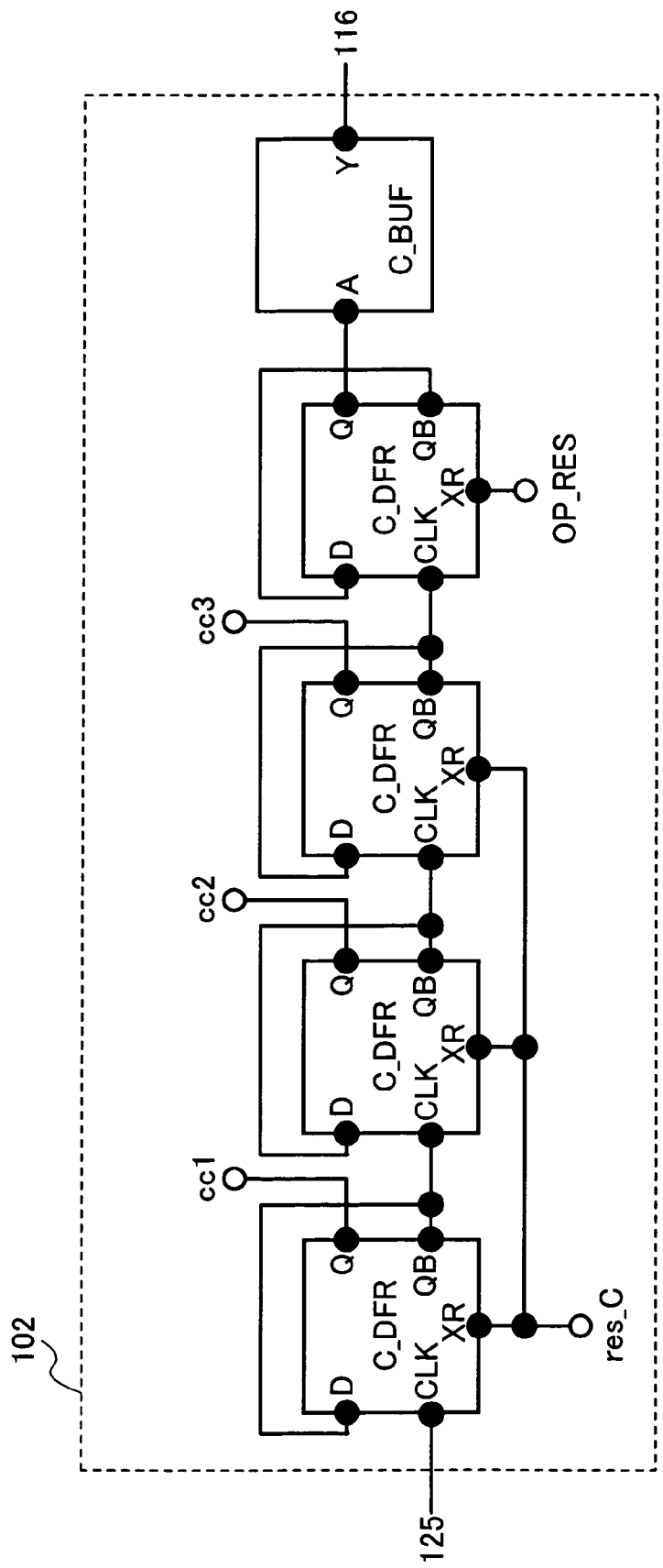
FIG. 13 is a diagram showing a structure of a semiconductor device of Embodiment Mode 2.

In FIG. 13, a structure of the second frequency-dividing circuit 102 is shown. The second frequency-dividing circuit 102 includes four C_DFRs and a C_BUF. The four C_DFRs constitute a frequency-dividing circuit, and output the basic clock signal 116 responding to the output of the low-speed/high-speed switching portion 105 (the basic clock control signal 125). By the basic clock control signal 125, the second frequency-dividing circuit 102 outputs the basic clock signal 116 of which the frequency differs according to the data transmission rate. In a case of the frequency-modulation mode, the basic clock signal 116 of which a duty ratio is changed responding to the frequency-modulation mode is output by the second reset signal 122 (corresponding to res_C in FIG. 13) input from the reset control circuit 103.

It is to be noted that the second frequency-dividing circuit 102 also outputs the count signal 123 (corresponding to cc1, cc2, and cc3, in FIG. 13) for controlling the reset control circuit 103.

The OP_RES is a signal which stops an operation of the second frequency-dividing circuit 102. By stopping the operation of the second frequency-dividing circuit 102 by the OP_RES in a period in which the second frequency-dividing circuit 102 does not output a signal, power consumption of the circuit can be reduced.

Hereinafter, a further specific structure of circuit blocks included in the second frequency-dividing circuit 102 will be described.

A specific structure of the C_DFR is the structure shown in FIGS. 17A and 17B, and as described above, so the explanation is omitted here.

A specific structure of the C_BUF is shown in FIGS. 16I and 16J. FIG. 16I shows the C_BUF with a circuit block, and FIG. 16J corresponds to the specific circuit structure.

The above is a description of the structure of the second frequency-dividing circuit 102. Next, the reset control circuit 103 will be described.

Figure 14:
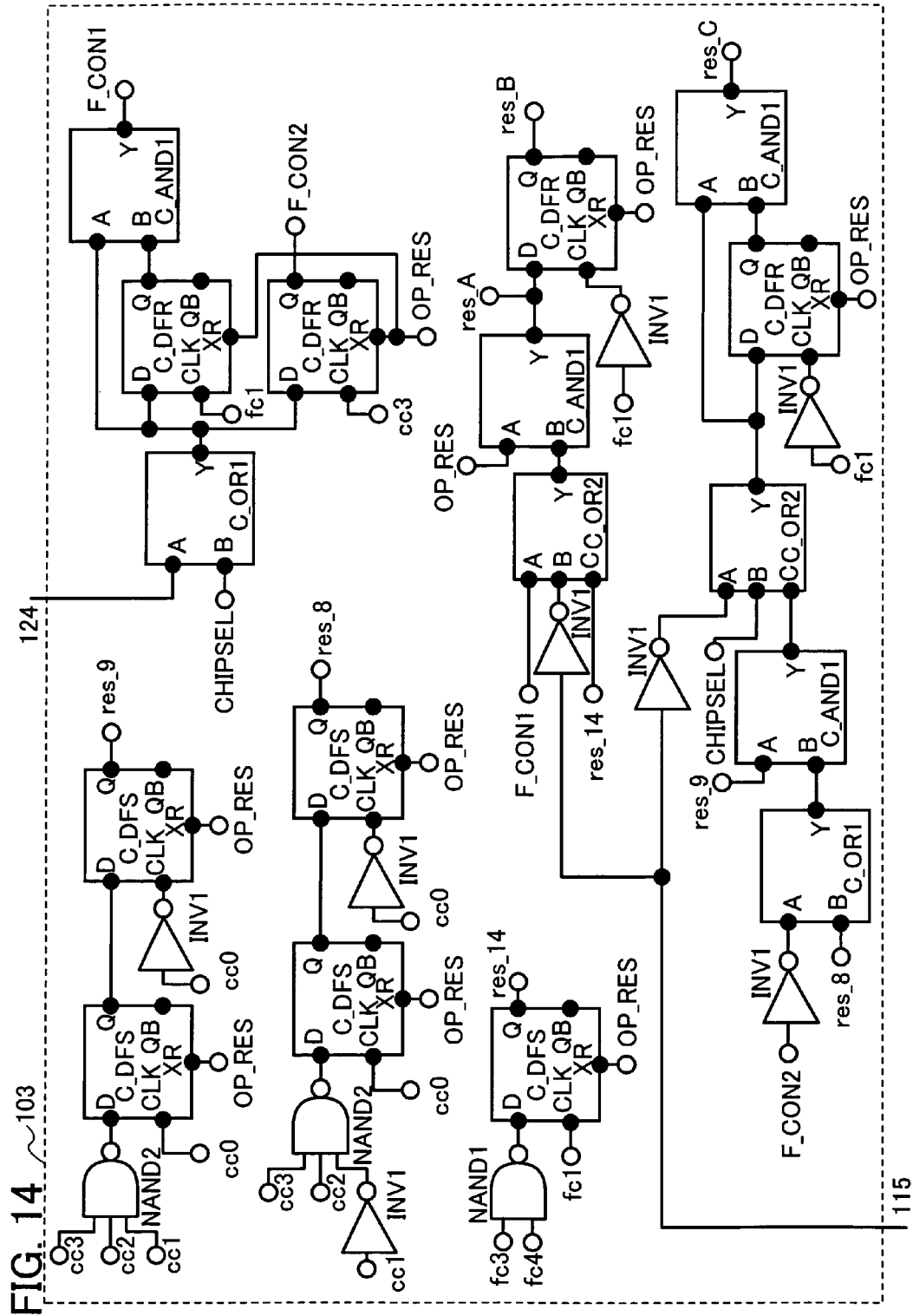
FIG. 14 is a diagram showing a structure of a semiconductor device of Embodiment Mode 2.

A structure of the reset control circuit 103 is shown in FIG. 14. The reset control circuit 103 includes a NAND1, two NAND2s, eight INV1s, four C_AND1s, two C_OR1s, two C_OR2s, four C_DFRs, and five C_DFSs.

To the reset control circuit 103, the Manchester-encoded information 124, the modulation mode select signal 115, the control signal 121 (fc1, fc2, fc3, and fc4), and the count signal 123 (cc1, cc2, and cc3) are input. And the reset control circuit 103 outputs the first reset signal 120 (res_A and res_B) and the second reset signal 122 (res_C).

The OP_RES is a signal which stops an operation of the reset control circuit 103. By stopping the operation of the reset control circuit 103 by the OP_RES in a period in which the reset control circuit 103 does not output a signal, power consumption of the circuit can be reduced.

Hereinafter, further specific structures of circuit blocks included in the reset control circuit 103 will be described.

A specific structure of the C_AND1 is shown in FIGS. 16A and 16B. FIG. 16A shows the C_AND1 with a circuit block, and FIG. 16B corresponds to the specific circuit structure.

A specific structure of the C_OR1 is the structure shown in FIGS. 16E and 16F, and as described above, so the explanation is omitted here.

A specific structure of the C_OR2 is shown in FIGS. 16G and 16H. FIG. 16G shows the C_OR2 with a circuit block, and FIG. 16H corresponds to the specific circuit structure.

A specific structure of the C_DFR is the structure shown in FIGS. 17A and 17B, and as described above, so the explanation is omitted here.

Figure 18A:
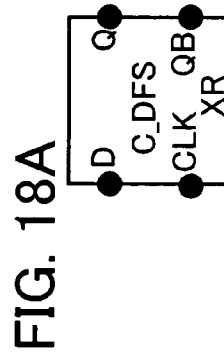
FIGS. 18A and 18B are diagrams each showing a structure of a semiconductor device of Embodiment Mode 2.
Figure 18B:
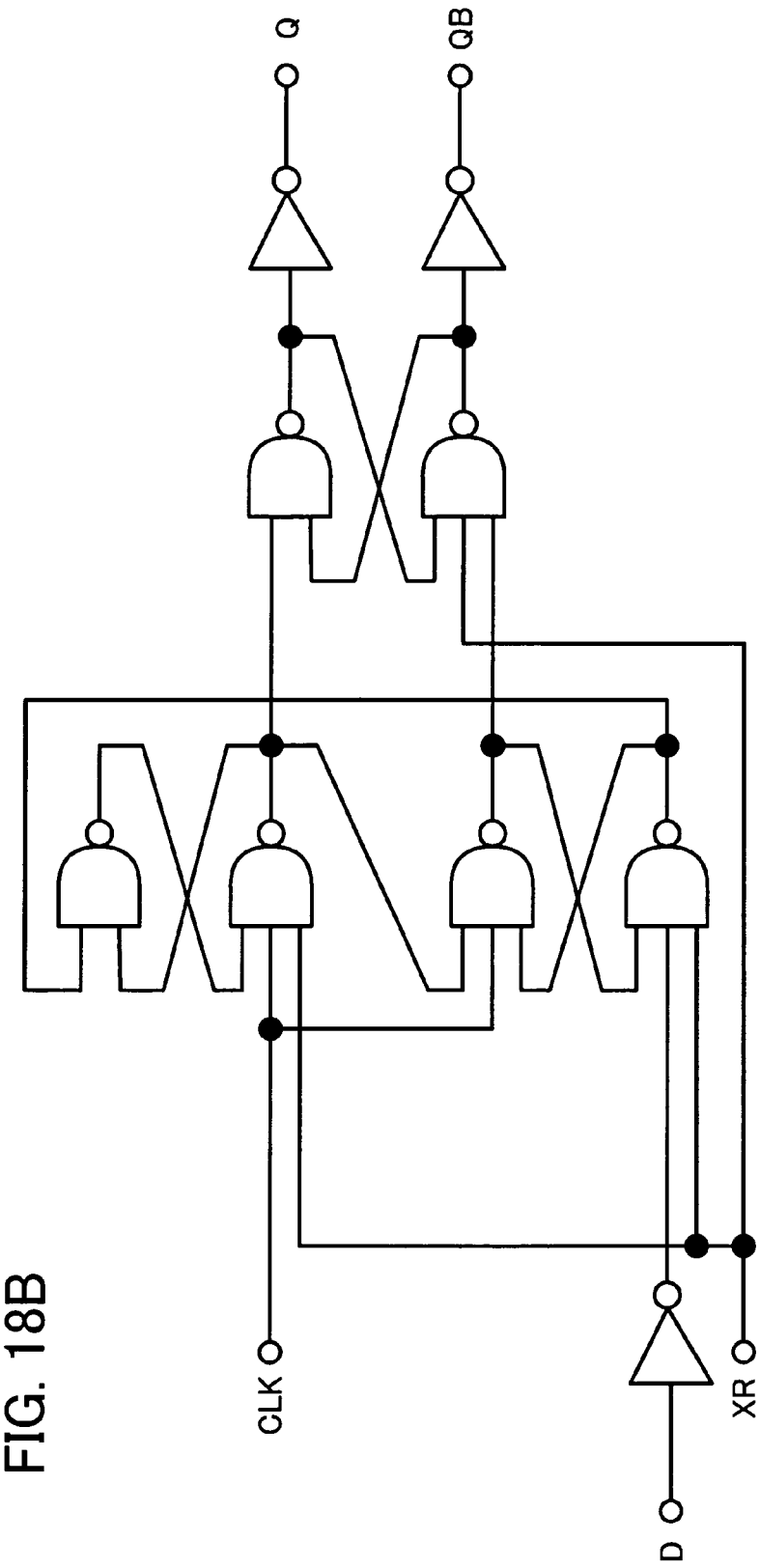

A specific structure of the C_DFS is shown in FIGS. 18A and 18B. The C_DFS is a set type D-type flip-flop circuit. FIG. 18A shows the C_DFS with a circuit block, and FIG. 18B corresponds to the specific circuit structure.

The above is a description of the structure of the reset control circuit 103. Next, the ASK/FSK switching portion 104 will be described.

Figure 15:
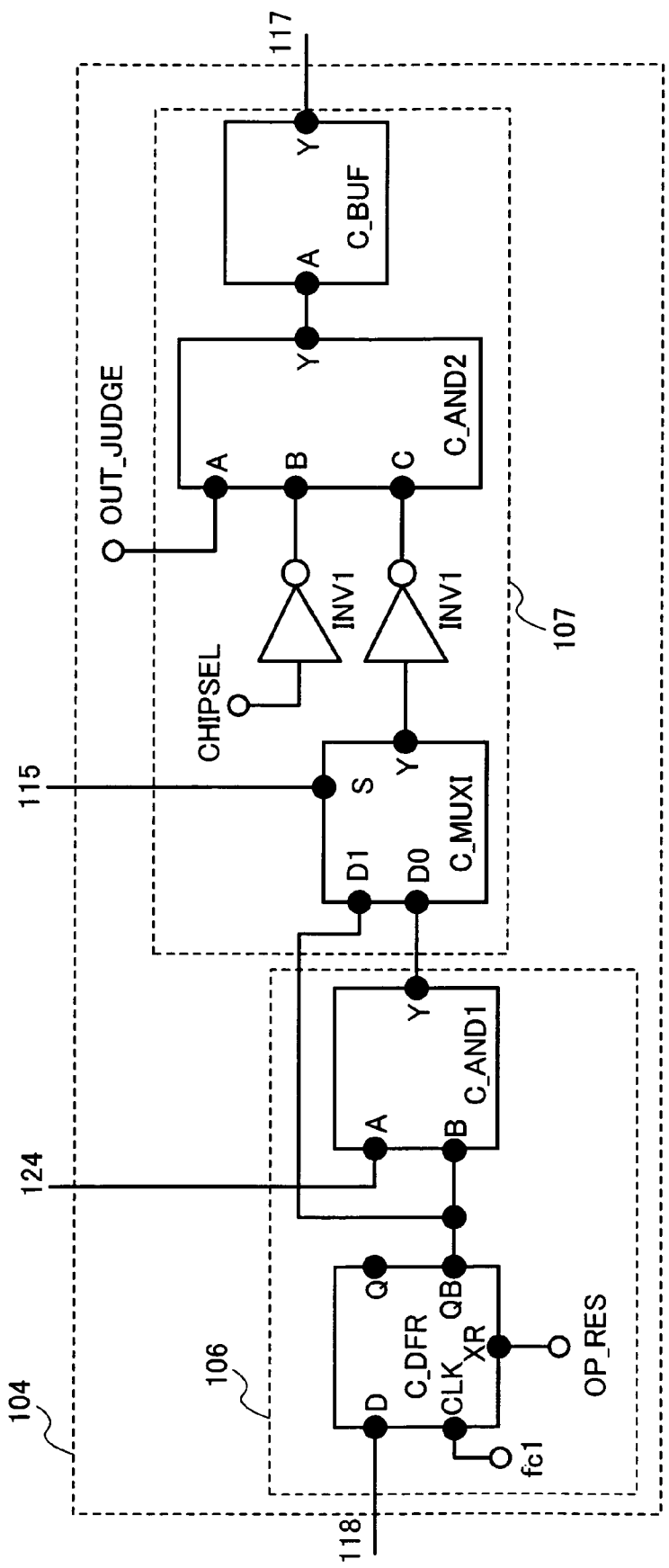
FIG. 15 is a diagram showing a structure of a semiconductor device of Embodiment Mode 2.

A structure of the ASK/FSK switching portion 104 is shown in FIG. 15. The ASK/FSK switching portion 104 has the ASK signal generating portion 106 and the output signal switching portion 107. The ASK signal generating portion 106 includes the C_DFR and the C_AND1. The output signal switching portion 107 includes the two INV1s, the C_AND2, the C_MUXI, and the C_BUF.

The ASK signal generating portion 106 outputs either of two signals by switching: the signal 118 or a signal obtained by conducting AND operation of the input signal 118 and the Manchester-encoded information 124. It is to be noted, in the ASK signal generating portion 106, the C_DFR is provided so as to expand the margin of timing when arithmetic processing with other signals is performed, by changing the timing of the signal 118. The C_DFR in the ASK signal generating portion 106 can be omitted.

The output signal switching portion 107 selects, in the C_MUXI, which signal of the two signals input from the ASK signal generating portion 106 to be output, according to the modulation mode select signal 115. In this manner, the ASK/FSK switching portion 104 outputs an amplitude-modulation signal or a frequency-modulation signal, as an output 117.

It is to be noted that the OUT_JUDGE is a signal for selecting one semiconductor device from a plurality of semiconductor devices in a case of a wireless communication system includes a plurality of semiconductor devices (which corresponds to a case where there are a plurality of the wireless tags 200, in FIG. 2).

The OP_RES is a signal which stops an operation of the ASK signal generating portion 106. By stopping the operation of the ASK signal generating portion 106 by the OP_RES in a period in which the ASK signal generating portion 106 does not output a signal, power consumption of the circuit can be reduced.

Hereinafter, further specific structures of circuit blocks included in the ASK/FSK switching portion 104 will be described.

Structures of the INV1, C_AND1, C_MUXI, C_BUF, and C_DFR are as described above, so the explanation is omitted here.

A specific structure of the C_AND2 is shown in FIGS. 16C and 16D. FIG. 16C shows the C_AND2 with a circuit block, and FIG. 16D corresponds to the specific circuit structure.

According to the above-described structure, in a semiconductor device capable of inputting and outputting data by wireless communication and a wireless communication system using the semiconductor device of the invention, part of circuits which generate amplitude-modulation signals and frequency-modulation signals (the first frequency-dividing circuit 101, the second frequency-dividing circuit 102, the low-speed/high-speed switching portion 105, the modulating circuit 507 and the like) can be shared between the amplitude-modulation method and the frequency-modulation method. In this way, size and power consumption of the semiconductor device can be reduced.

Embodiment Mode 2 can be carried out freely combining with Embodiment Mode 1.

Embodiment 1

In this embodiment, a specific structure of a semiconductor device of the invention will be described with reference to FIGS. 20A to 22B.

Figure 20A:
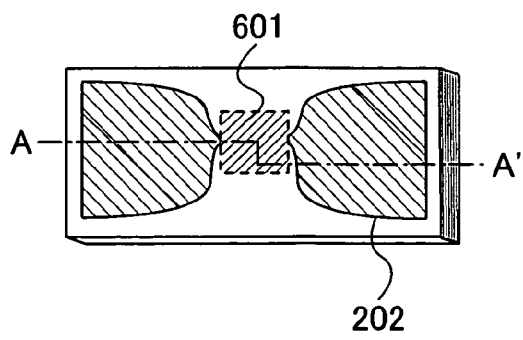
FIGS. 20A to 20D are diagrams each showing a structure of a semiconductor device of Embodiment 1.
Figure 20B:
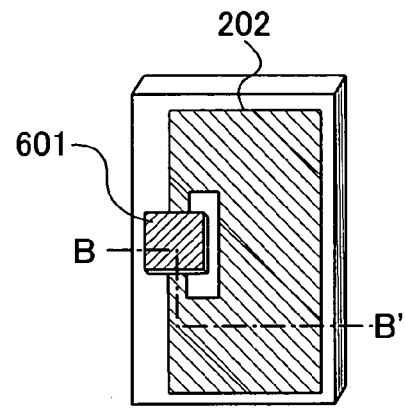
Figure 20C:
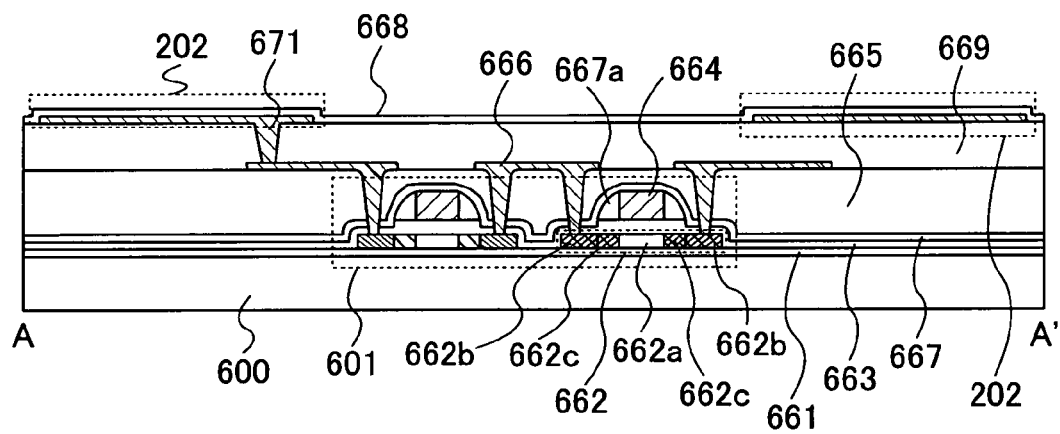
Figure 20D:
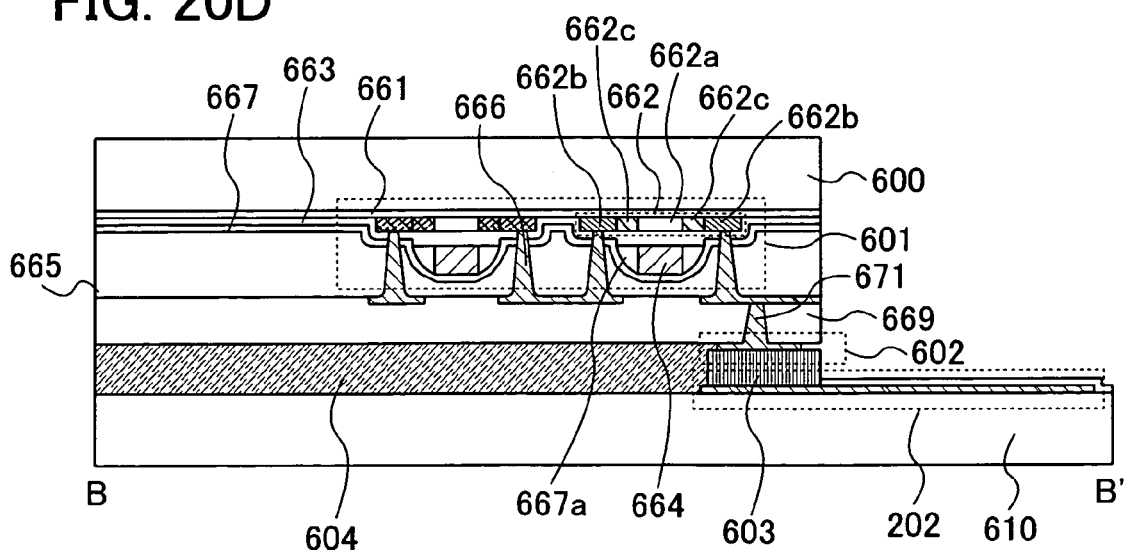

FIGS. 20A to 20D show examples of a structure of the antenna 202 in the semiconductor device of the invention. The antenna 202 is provided in two ways, one of which (hereinafter referred to as a first antenna installation system) is shown in FIGS. 20A and 20C and the other (hereinafter referred to as a second antenna installation system) is shown in FIGS. 20B and 20D. FIG. 20C is a cross-sectional view along a line A-A' of FIG. 20A, while FIG. 20D is a cross-sectional view along a line B-B' of FIG. 20B.

According to the first antenna installation system, the antenna 202 is provided over a substrate 600 over which a plurality of elements (hereinafter referred to as an element group 601) are provided (see FIGS. 20A and 20C). The element group 601 constitutes a circuit portion 203 in FIG. 2 other than the antenna in the semiconductor device of the invention. The element group 601 includes a plurality of thin film transistors. In the shown structure, a conductive film functioning as the antenna 202 is provided over an insulating layer which is provided so as to cover the element group 601. However, the conductive film functioning as the antenna 202 may be provided in the same layer as a wiring 666 which is connected to a source or a drain of a thin film transistor included in the element group 601, or may be provided in the same layer as a gate electrode 664 of a thin film transistor included in the element group 601.

According to the second antenna installation system, a terminal portion 602 is provided over the substrate 600 over which the element group 601 is provided. Then, the terminal portion 602 is connected to the antenna 202 that is formed over a substrate 610 that is different from the substrate 600 (see FIGS. 20B and 20D). In the shown structure, a wiring 671 provided over the insulating layer which is provided so as to cover the element group 601 is used as the terminal portion 602. A part of a wiring 666 connected to a source or a drain of a thin film transistor included in the element group 601 may be used as the terminal portion 602. Then, the substrate 600 is attached to the substrate 610 over which the antenna 202 is provided, so that the antenna 202 is connected to the terminal portion 602. A conductive particle 603 and a resin 604 are provided between the substrate 600 and the substrate 610. The antenna 202 is electrically connected to the terminal portion 602 with the conductive particle 603.

The structure and manufacturing method of the element group 601 will be described. When a plurality of element groups 601 are formed over a large substrate and cut off to be completed, an inexpensive element group can be provided. As the substrate 600, for example, a glass substrate made of barium borosilicate glass, alumino borosilicate glass, or the like, a quartz substrate, a ceramic substrate, or the like can be used. Alternatively, a semiconductor substrate of which the surface is provided with an insulating film may be used. A substrate made of a flexible synthetic resin such as plastic may also be used. The surface of the substrate may be planarized by polishing using a CMP (Chemical Mechanical Polishing) method or the like. A substrate that is thinned by polishing a glass substrate, a quartz substrate, or a semiconductor substrate may be used as well. For example, a single crystal silicon substrate of which single crystal silicon crystal axis <100> or <110> is roughly parallel to a direction perpendicular to the substrate surface, which is polished so that the whole substrate has a thickness of more than 0.1 μm and 20 μm or less, typically 1 μm or more and 5 μm or less may be used.

As a base layer 661 formed over the substrate 600, an insulating film made of silicon oxide, silicon nitride, silicon nitride oxide, or the like can be used. The base layer 661 can prevent an alkali metal or an alkaline earth metal contained in the substrate 600, such as Na, from being diffused in the semiconductor layer 662 and adversely affecting the characteristics of the thin film transistor. Although the base layer 661 shown in FIGS. 20C and 20D has a single layer structure, it may have a two or more layer structure. It is to be noted that if the diffusion of impurities is not a serious problem such as in a quartz substrate, the base layer 661 is not necessarily provided.

It is to be noted that the surface of the substrate 600 may be directly processed by high density plasma. The high density plasma is generated using a high frequency wave (for example, 2.45 GHz). High density plasma with an electron density of $10^{11}$ to $10^{13}/cm^3$, an electron temperature of 2 eV or lower, and an ion energy of 5 eV or lower is used. Since such high density plasma featuring a low electron temperature has low kinetic energy of active species, a film with less plasma damage and defects can be formed as compared to that formed by a conventional plasma treatment. Plasma can be generated using a plasma processing apparatus utilizing high frequency excitation, which employs a radial slot antenna. The distance between the antenna that generates a high frequency wave and the substrate 600 is 20 to 80 mm (preferably, 20 to 60 mm).

The surface of the substrate 600 can be nitrided by performing the high density plasma treatment in a nitrogen atmosphere, for example an atmosphere containing nitrogen (N) and a rare gas (containing at least one of He, Ne, Ar, Kr, and Xe), an atmosphere containing nitrogen, hydrogen (H), and a rare gas, or an atmosphere containing ammonium ($NH_3$) and a rare gas. When the substrate 600 is made of glass, quartz, a silicon wafer, or the like, a nitride layer formed over the surface of the substrate 600, which contains silicon nitride as a main component, can be used as a blocking layer against impurities diffused from the substrate 600 side. A silicon oxide film or a silicon oxynitride film may be formed over the nitride layer by a plasma CVD method to be used as the base layer 661.

When similar high density plasma treatment is applied to the surface of the base layer 661 made of silicon oxide, silicon oxynitride, or the like, the surface and a region with a depth of 1 to 10 nm from the surface can be nitrided. This extremely thin silicon nitride layer is favorable since it functions as a blocking layer and has less stress on the semiconductor layer 662 formed thereover.

A semiconductor layer 662 is formed over the base layer 661. As the semiconductor layer 662, a crystalline semiconductor film or an amorphous semiconductor film that is processed into an island-shape can be used. Alternatively, an organic semiconductor film may be used. A crystalline semiconductor film can be obtained by crystallizing an amorphous semiconductor film. A laser crystallization method, a thermal crystallization method using RTA or an annealing furnace, a thermal crystallization method using a metal element which promotes crystallization, or the like can be used as the crystallization method. The semiconductor layer 662 includes a channel forming region 662a and a pair of impurity regions 662b to which an impurity element imparting conductivity is added. Shown here is a structure where low concentration impurity regions 662c to which the impurity element is added at a lower concentration than to the impurity regions 662b are provided between the channel forming region 662a and the pair of impurity regions 662b; however, the invention is not limited to this. The low concentration impurity regions 662c are not necessarily provided. In addition, a structure in which a silicide is formed over a part of the upper surface of the pair of impurity regions 662b (in particular, a portion to be in contact with the wiring 666) or over the whole surface may be adopted.

Figure 22A:
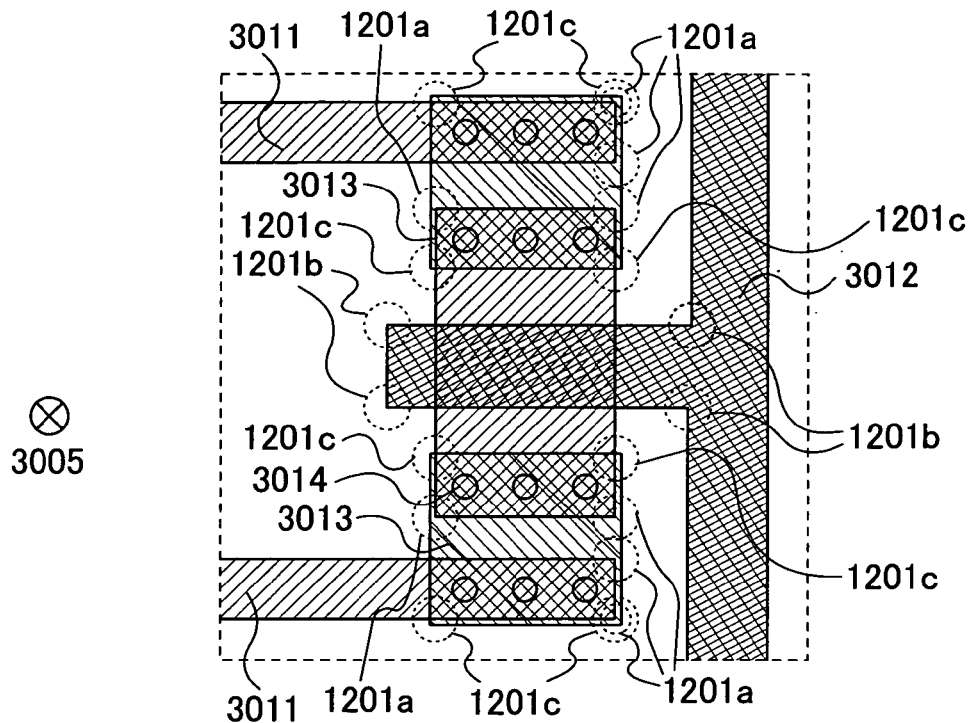
FIGS. 22A and 22B are diagrams each showing a structure of a semiconductor device of Embodiment 1.
Figure 22B:
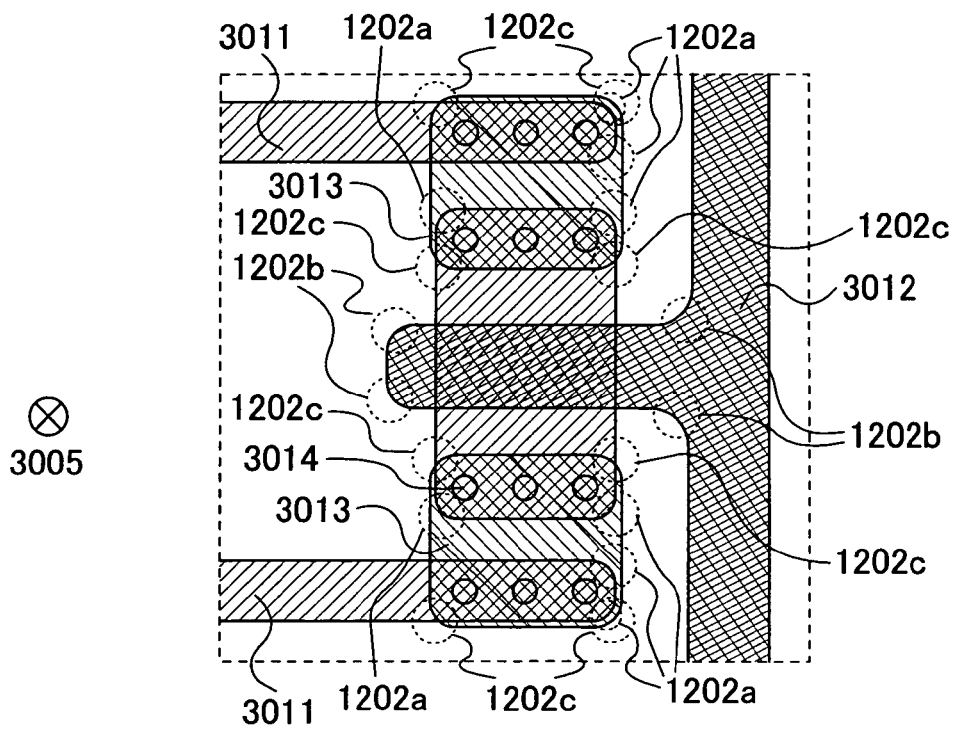

It is to be noted that a wiring that is formed simultaneously with the semiconductor layer 662 is preferably led so that corners are rounded when seen from a direction 3005 perpendicular to the top surface of the substrate 600. FIGS. 22A and 22B are schematic views each showing leading wirings. In FIGS. 22A and 22B, a wiring 3011 which is formed simultaneously with the semiconductor layer is shown. FIG. 22A shows conventional leading wirings. FIG. 22B shows leading wirings of the invention. Corners (bend portions) 1202a are rounded as compared to corners (bend portions) 1201a of the conventional wiring 3011. The rounded corners (bend portions) can prevent dusts and the like from remaining at the corners (bend portions) of the wiring. As a result, defects of a semiconductor device caused by dusts can be reduced and the yield can be improved.

An impurity element that imparts conductivity may be added to the channel forming region 662a of the thin film transistor. In this manner, a threshold voltage of the thin film transistor can be controlled.

A first insulating layer 663 is formed over the semiconductor layer 662. The first insulating layer 663 can be formed using a single layer or a stack of a plurality of films made of silicon oxide, silicon nitride, silicon nitride oxide, or the like. In this case, the surface of the first insulating layer 663 may be processed by high density plasma in an oxygen atmosphere or a nitrogen atmosphere, thereby being oxidized or nitrided to be densified. The high density plasma is generated using a high frequency wave (for example, 2.45 GHz) as described above. It is to be noted that high density plasma with an electron density of $10^{11}$ to $10^{13}/cm^3$, an electron temperature of 2 eV or lower, and an ion energy of 5 eV or lower is used. Plasma can be generated using a plasma processing apparatus utilizing high frequency excitation, which employs a radial slot antenna. In the apparatus for generating high density plasma, the distance between the antenna that generates a high frequency wave and the substrate 600 is 20 to 80 mm (preferably, 20 to 60 mm).

Before forming the first insulating layer 663, the high density plasma treatment may be applied to the surface of the semiconductor layer 662 so that the surface of the semiconductor layer is oxidized or nitrided. At this time, by performing the treatment in an oxygen atmosphere or a nitrogen atmosphere with the substrate 600 at a temperature of 300 to 450° C., a favorable interface with the first insulating layer 663 that is formed over the semiconductor layer 662 can be obtained.

As the nitrogen atmosphere, an atmosphere containing nitrogen (N) and a rare gas (containing at least one of He, Ne, Ar, Kr, and Xe), an atmosphere containing nitrogen, hydrogen (H), and a rare gas, or an atmosphere containing ammonium ($NH_3$) and a rare gas can be used. As the oxygen atmosphere, an atmosphere containing oxygen (O) and a rare gas, an atmosphere containing oxygen, hydrogen (H), and a rare gas, or an atmosphere containing dinitrogen monoxide ($N_2O$) and a rare gas can be used.

A gate electrode 664 is formed over the first insulating layer 663. The gate electrode 664 can be made of an element selected from Ta, W, Ti, Mo, Al, Cu, Cr, and Nd, or an alloy or a compound containing a plurality of these elements. Furthermore, the gate electrode 664 may have a single layer structure or a stacked-layer structure made of these elements, or an alloy or a compound thereof. In the drawings, the gate electrode 664 has a two-layer structure. It is to be noted that the gate electrode 664 and a wiring that is formed simultaneously with the gate electrode 664 are preferably led so that corners (bend portions) thereof are rounded when seen from the direction 3005 perpendicular to the top surface of the substrate 600. The gate electrode 664 and the wiring can be led in the same manner as that shown in FIG. 22B. The gate electrode 664 and a wiring 3012 that is formed simultaneously with the gate electrode 664 are shown in the drawings. When corners (bend portions) 1202b are rounded as compared to corners (bend portions) 1201b, dusts and the like can be prevented from remaining at the corners (bend portions) of the wiring. As a result, defects of a semiconductor device caused by dusts can be reduced and the yield can be improved.

A thin film transistor is constituted by the semiconductor layer 662, the gate electrode 664, and the first insulating layer 663 functioning as a gate insulating film between the semiconductor layer 662 and the gate electrode 664 and so on. In this embodiment, the thin film transistor has a top gate structure; however, it may be a bottom gate transistor having a gate electrode under the semiconductor layer, or a dual gate transistor having gate electrodes over and under the semiconductor layer.

Furthermore, insulating films (functioning as side walls 667a, in FIGS. 20C and 20D) are provided so as to be in contact with side surfaces of the gate electrode 664. After the side walls 667a are formed, an impurity element which imparts conductivity is added to the semiconductor layer 662, so that low concentration impurity regions 662c can be formed in a self-alignment manner. Alternatively, a structure in which silicides are formed in a pair of impurity regions 662b may be formed in a self-alignment manner, by using the side walls 667a. Although a structure in which the side walls 667a are provided is shown in the views, the invention is not limited to this and the side walls are not necessarily formed.

A second insulating layer 667 is formed over the gate electrode 664 and the side walls 667a. The second insulating layer 667 is desirably an insulating film such as a silicon nitride film, which has barrier properties to block ion impurities. The second insulating layer 667 is made of silicon nitride or silicon oxynitride. The second insulating layer 667 functions as a protective film to prevent contamination of the semiconductor layer 662. After depositing the second insulating layer 667, hydrogen gas may be introduced and the aforementioned high density plasma treatment may be applied, thereby hydrogenating the second insulating layer 667. Alternatively, the second insulating layer 667 may be nitrided and hydrogenated by introducing ammonium ($NH_3$) gas. Otherwise, oxidization-nitridation treatment and hydrogenation treatment may be performed by introducing oxygen, dinitrogen monoxide ($N_2O$) gas, and the like together with hydrogen gas. By performing nitridation treatment, oxidization treatment, or oxidization-nitridation treatment in this manner, the surface of the second insulating layer 667 can be densified. As a result, the function of the second insulating layer 667 as a protective film can be enhanced. Hydrogen introduced into the second insulating layer 667 is discharged when thermal treatment is applied at a temperature of 400 to 450° C., thereby hydrogenating the semiconductor layer 662. It is to be noted that the hydrogenation treatment may be performed in combination with hydrogenation treatment using the first insulating layer 663.

A third insulating layer 665 is formed over the second insulating layer 667. The third insulating layer 665 can have a single layer structure or a stacked-layer structure of an inorganic insulating film and an organic insulating film. As the inorganic insulating film, a silicon oxide film formed by a CVD method, a silicon oxide film formed by an SOG (Spin On Glass) method, or the like can be used. As the organic insulating film, a film made of polyimide, polyamide, BCB (benzocyclobutene), acrylic, a positive photosensitive organic resin, a negative photosensitive organic resin, or the like can be used.

The third insulating layer 665 may be made of a material having a skeleton structure formed of a bond of silicon (Si) and oxygen (O). An organic group containing at least hydrogen (such as an alkyl group and an aromatic hydrocarbon) is used as a substituent of this material. Alternatively, a fluoro group may be used as the substituent. Further alternatively, a fluoro group and an organic group containing at least hydrogen may be used as the substituent.

A wiring 666 is formed over the third insulating layer 665. The wiring 666 can have a single layer structure or a stacked-layer structure made of one element selected from Al, Ni, W, Mo, Ti, Pt, Cu, Ta, Au, and Mn, or an alloy containing a plurality of these elements. In the views, a single layer structure is shown as an example. It is to be noted that the wiring 666 is preferably led so that corners (bend portions) thereof are rounded when seen from the direction perpendicular to the top surface of the substrate 600. The wiring can be led in the same manner as that shown in FIG. 22B. A wiring 3013 which is formed simultaneously with the wiring 666 is shown in the views. When corners (bend portions) 1202c are rounded as compared to corners (bend portions) 1201c, dusts and the like can be prevented from remaining at the corners (bend portions) of the wiring. As a result, defects of a semiconductor device caused by dusts can be reduced and the yield can be improved. The wiring 3013 is connected to the wiring 3011 by contact holes 3014. In the structures shown in FIGS. 20C and 20D, the wiring 666 functions as a wiring connected to the source or the drain of the thin film transistor.

A fourth insulating layer 669 is formed over the wiring 666. The fourth insulating layer 669 can have a single layer structure or a stacked-layer structure of an inorganic insulating film and an organic insulating film. As the inorganic insulating film, a silicon oxide film formed by a CVD method, a silicon oxide film formed by an SOG (Spin On Glass) method, or the like can be used. As the organic insulating film, a film made of polyimide, polyamide, BCB (benzocyclobutene), acrylic, a positive photosensitive organic resin, a negative photosensitive organic resin, or the like can be used.

The fourth insulating layer 669 may be made of a material having a skeleton structure formed of a bond of silicon (Si) and oxygen (O). An organic group containing at least hydrogen (such as an alkyl group and an aromatic hydrocarbon) is used as a substituent of this material. Alternatively, a fluoro group may be used as the substituent. Further alternatively, a fluoro group and an organic group containing at least hydrogen may be used as the substituent.

A wiring 671 is formed over the fourth insulating layer 669. The wiring 671 can have a single layer structure or a stacked-layer structure made of one element selected from Al, Ni, W, Mo, Ti, Pt, Cu, Ta, Au, and Mn, or an alloy containing a plurality of these elements. In the views, a single layer structure is shown as an example. It is to be noted that the wiring 671 is preferably led so that corners (bend portions) thereof are rounded when seen from the direction 3005 perpendicular to the top surface of the substrate 600. The wiring can be led in the same manner as that shown in FIG. 22B. In this manner, dusts and the like can be prevented from remaining at the corners (bend portions) of the wiring. As a result, defects of a semiconductor device caused by dusts can be reduced and the yield can be improved. In the structure shown in FIGS. 20A and 20C, the wiring 671 corresponds to the antenna 202. In the structure shown in FIGS. 20B and 20D, the wiring 671 corresponds to the terminal portion 602.

The antenna 202 can also be formed by a droplet discharge method using a conductive paste containing nano-particles such as Au, Ag, and Cu. The droplet discharge method is a collective term for a method for forming a pattern by discharging droplets, such as an ink jet method and a dispenser method, which has advantages in that the utilization efficiency of a material is improved, and the like.

In the structures shown in FIGS. 20A and 20C, a fifth insulating layer 668 is formed over the wiring 671. The fifth insulating layer 668 can have a single layer structure or a stacked-layer structure of an inorganic insulating film or an organic insulating film. The fifth insulating layer 668 functions as a protective layer of the antenna 202.

Figure 33A:
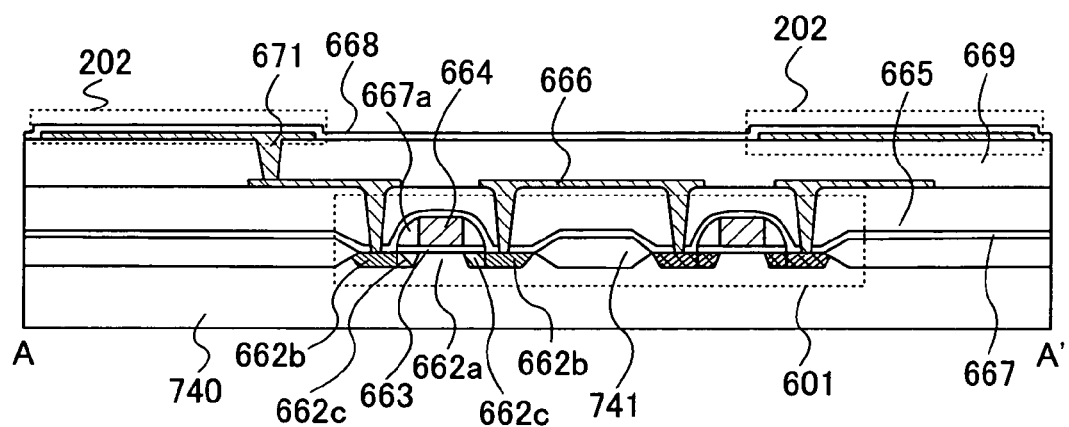
FIGS. 33A and 33B are diagrams each showing a structure of a semiconductor device of Embodiment 1.
Figure 33B:
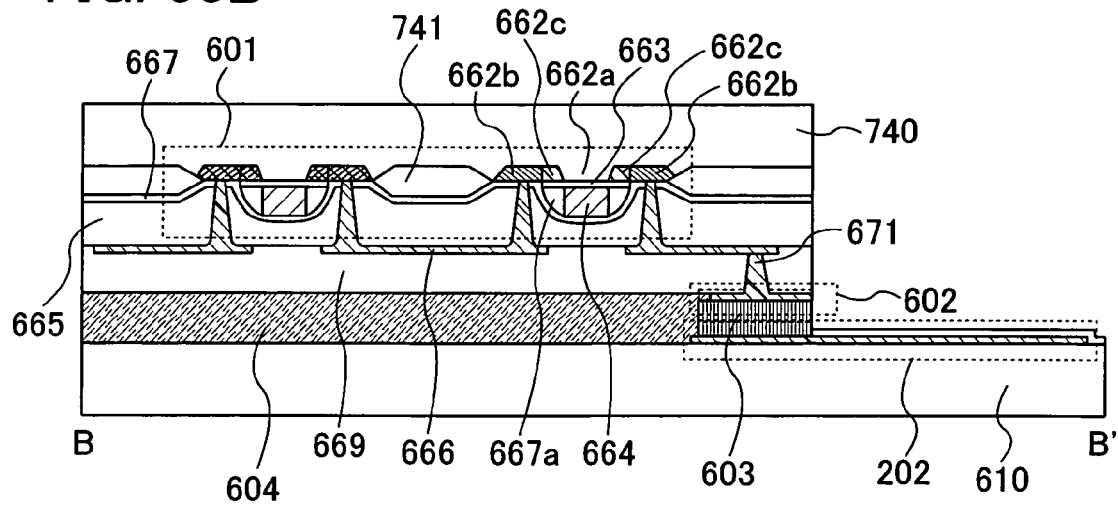

In FIGS. 20A to 20D, a structure in which the element group 601 is formed by using thin film transistors is shown, but the invention is not limited to this. The element group 601 may be formed using transistors (single crystal transistors) formed over a semiconductor substrate such as a silicon wafer. An example in which the element group 601 is formed using single crystal transistors is shown in FIGS. 33A and 33B. FIG. 33A is an example in which the thin film transistors in the structure shown in FIG. 20C are replaced by single crystal transistors. FIG. 33B is an example in which the thin film transistors in the structure shown in FIG. 20D are replaced by single crystal transistors. The same parts as FIGS. 20C and 20D are indicated by the same numerals and symbols, and the description is omitted here.

By adding an impurity element imparting conductivity to a semiconductor substrate 740, a channel forming region 662a, a pair of impurity regions 662b, and low concentration impurity regions 662c in which the above-described impurity element is added at a lower concentration than the impurity regions 662b are formed. Furthermore, a plurality of elements are insulated from each other by providing an insulating layer 741. Although a structure having the low concentration impurity regions 662c is shown in FIGS. 33A and 33B, the invention is not limited to this, and the low concentration impurity regions 662c are not necessarily provided. As the semiconductor substrate 740, for example, a single crystal silicon substrate of which single crystal silicon crystal axis <100> or <110> is roughly parallel to a direction perpendicular to the substrate surface, which is polished so that the whole substrate has a thickness of more than 0.1 μm and 20 μm or less, typically 1 μm or more and 5 μm or less may be used.

In the semiconductor device of a structure shown in FIGS. 20A to 20D, although the element group 601 formed over the substrate 600 may be used as it is, the element group 601 formed over the substrate 600 may be peeled from the substrate 600 and attached to a flexible substrate. A method for peeling the element group 601 from the substrate 600 and providing it over the flexible substrate will be described with reference to FIGS. 21A to 21G.

Figure 21A:
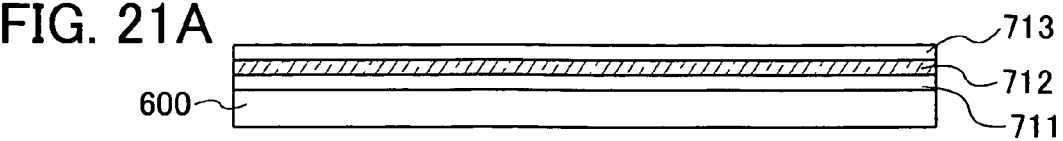
FIGS. 21A to 21G are diagrams showing a manufacturing method of a semiconductor device of Embodiment 1.

As shown in FIG. 21A, an insulating layer 711, a peeling layer 712, an insulating layer 713 are formed over the substrate 600. As the substrate 600, for example, a glass substrate made of barium borosilicate glass, alumino borosilicate glass, or the like, a quartz substrate, a ceramic substrate, or the like can be used. Alternatively, a semiconductor substrate of which the surface is provided with an insulating film may be used. A substrate made of a flexible synthetic resin such as plastic may also be used. The surface of the substrate may be planarized by polishing using a CMP method or the like. As the insulating layer 711 and the insulating layer 713, an oxide of silicon, a nitride of silicon, an oxide of silicon containing nitrogen, a nitride of silicon containing oxygen or the like formed by a vapor deposition method (a CVD method) or a sputtering method can be used. As the peeling layer 712, a layer containing an element selected from W, Mo, Ti, Ta, Nb, Ni, Co, Zr, Zn, Ru, Rh, Pd, Os, Ir, Si and the like, an alloy or a compound containing such elements as its main component is formed as a single layer or a stacked layer by sputtering method or the like. It is to be noted that a layer containing silicon may have any of an amorphous structure, a microcrystalline structure, and a polycrystalline structure.

In a case where the peeling layer 712 has a single layer structure, preferably, a layer containing any of W, Mo, mixture of W and Mo, an oxide of W, a nitride oxide of W, an oxide of Mo, a nitride oxide of Mo, an oxide of a mixture of W and Mo, and a nitride oxide of a mixture of W and Mo can be used.

In a case where the peeling layer 712 has a stacked layer structure including two layers, preferably, a layer containing any of W, Mo, and mixture of W and Mo can be used as a first layer, and a layer containing any of an oxide of W, a nitride oxide of W, an oxide of Mo, a nitride oxide of Mo, an oxide of a mixture of W and Mo, and a nitride oxide of a mixture of W and Mo can be used as a second layer.

Figure 21B:
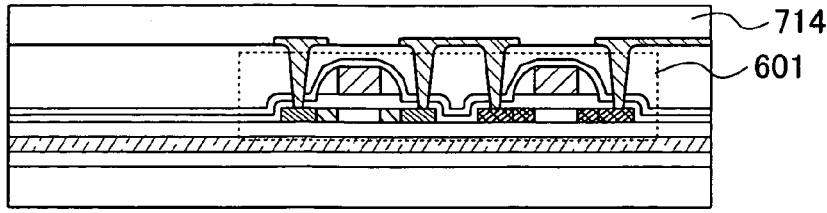

Next, as shown in FIG. 21B, the semiconductor layer is formed over the insulating layer 713, so that the element group 601 is formed. A forming method of the element group 601 is the same as the method described above with reference to FIGS. 20A to 20D, therefore, the description is omitted here. After the element group 601 is formed, an insulating layer 714 covering the element group 601 is formed. As the insulating layer 714, an insulating resin such as an acrylic resin or a polyimide resin can be used. In the structure in which the antenna 202 is formed over the substrate 600 as shown in FIG. 20C, the insulating layer 714 is formed so as to cover the antenna 202 after the antenna 202 which is electrically connected to the element group 601 is formed. In the structure in which the element group 601 and the antenna 202 are formed over different substrates and then the substrates are attached together as shown in FIG. 20D, the insulating layer 714 corresponds to the fourth insulating layer 669. Although not shown in FIG. 21B, an opening may be provided in the insulating layer 714 so as to expose part of the wiring 666, in order to make electrical connection between the antenna 202 and the element group 601.

Figure 21C:
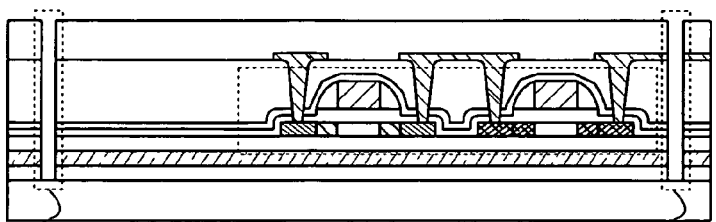

Next, as shown in FIG. 21C, openings 715 are formed so as to expose at least part of the peeling layer 712. The openings 715 can be formed by laser beam irradiation. As the laser, a solid laser with a wavelength of 150 to 380 nm which is an ultraviolet region can be used.

Figure 21D:
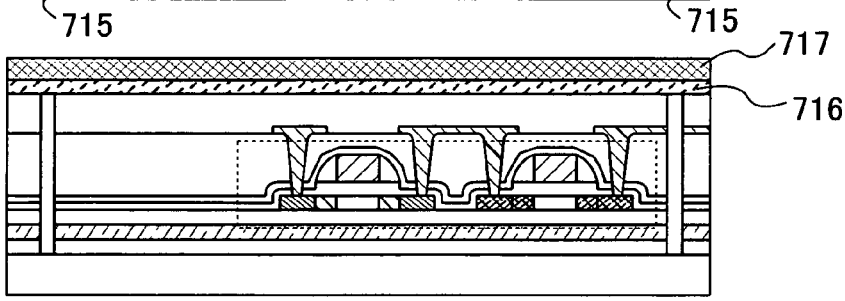

Next, as show in FIG. 21D, a substrate 717 is attached to the insulating layer 714 with an adhesive layer 716.

Figure 21E:
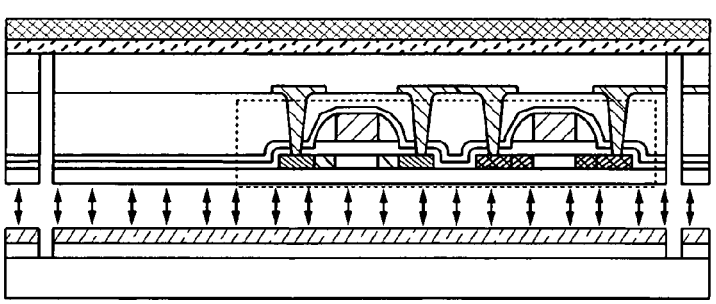

Next, as shown in FIG. 21E, the element group 601 is peeled from the substrate 600. As a method for peeling the element group 601 from the substrate 600, any of the following can be used: (A) a method in which the element group 601 is peeled physically by applying stress; (B) a method in which the peeling layer is removed by an etchant; and (C) a method in which the peeling layer is partially removed by an etchant, and then the element group 601 is peeled physically.

Although peeling occurs in the interface between the peeling layer 712 and the insulating layer 713 in FIG. 21E, the invention is not limited to this, and peeling may occur in the interface between the peeling layer 712 and the insulating layer 711, or the peeling layer 712 itself may be divided into two.

Figure 21F:
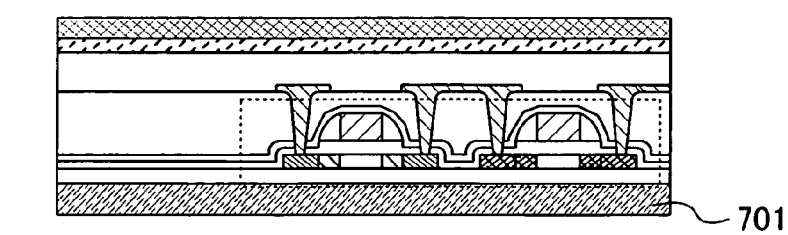
Figure 21G:
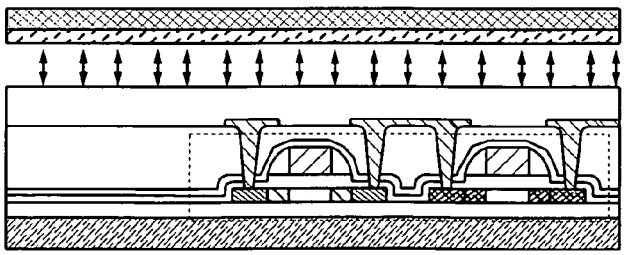

Next, as shown in FIG. 21F, a flexible substrate 701 is attached to the element group 601 with an adhesive. The flexible substrate 701 has flexibility, and a plastic substrate made of polycarbonate, polyarylate, polyether sulfone, or the like, a ceramic substrate, or the like can be used. In addition, to attach the peeled element group 601 to the flexible substrate 701, a commercial adhesive may be used, and an adhesive such as an epoxy resin-based adhesive or a resin additive may be used.

Next, as shown in FIG. 21C after the element group 601 is attached to the flexible substrate 701, the substrate 717 is removed. For example, a layer of which the adhesiveness is lowered by heat treatment may be used as the adhesive layer 716 so that the element group 601 can be peeled from the substrate 717 by applying heat treatment. In this manner, the element group 601 can be provided over the flexible substrate 701.

By providing the element group 601 over the flexible substrate as described above, a thin and light semiconductor device which is not easily broken even when fallen to the ground, is obtained. When an inexpensive flexible substrate is used, an inexpensive semiconductor device can be provided. Furthermore, a flexible substrate having flexibility can be attached to a curved surface or an irregular-shaped substance, which realizes various kinds of usage. For example, the wireless tag 200 as one mode of a semiconductor device of the invention can be attached to a curved surface such as a medicine bottle. Furthermore, when the substrate 600 is reused, a semiconductor device can be manufactured at low cost.

In the structures shown in FIGS. 20A to 20D and 21Q the element group 601 can be covered with a film to be sealed. The surface of the film may be coated with silicon dioxide (silica) powder. The coating allows the element group 601 to be kept waterproof in an environment of high temperature and high humidity. In other words, the element group 601 can have moisture resistance. Moreover, the surface of the film may have antistatic properties. The surface of the film may also be coated with a material containing carbon as its main component (such as diamond like carbon). The coating increases the intensity and can prevent the degradation or destruction of a semiconductor device. Alternatively, the film may be formed of a base material (for example, resin) mixed with silicon dioxide, a conductive material, or a material containing carbon as its main component. In addition, a surface active agent may be provided over the surface of the film to coat the surface, or directly added into the film, so that the element group 601 can have antistatic properties.

In a semiconductor device of the invention, part of circuits which generate amplitude-modulation signals and frequency-modulation signals (the first frequency-dividing circuit 101, the second frequency-dividing circuit 102, the low-speed/high-speed switching portion 105, the modulating circuit 507 and the like) can be shared between the amplitude-modulation method and the frequency-modulation method, so that size and power consumption of the semiconductor device can be reduced.

This embodiment can be freely combined with the above-described embodiment modes.

Embodiment 2

Figure 23A:
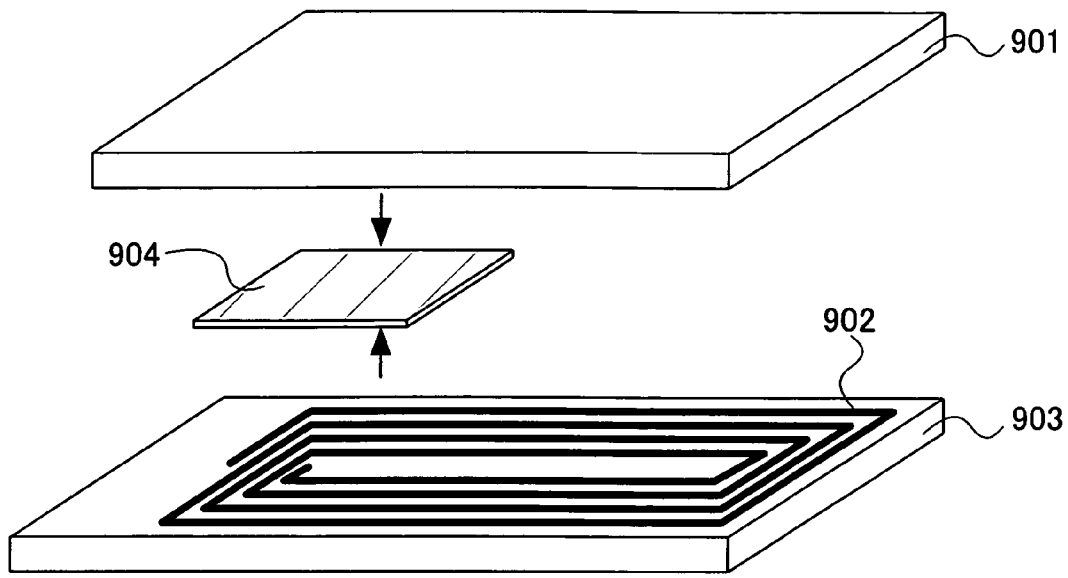
FIGS. 23A to 23C are diagrams showing a structure of a semiconductor device of Embodiment 2.

In this embodiment, an example in which a semiconductor device of the invention has a flexible structure will be described with reference to FIGS. 23A to 23C. In FIG. 23A, a semiconductor device of the invention includes a flexible protective layer 901, a flexible protective layer 903 including an antenna 902 (corresponding to the antenna 202), and an element group 904 formed by a peeling process and thinning of a substrate. The element group 904 can have a similar structure to the element group 601 described in the Embodiment 1. The antenna 902 formed over the protective layer 903 is electrically connected to the element group 904. In FIG. 23A, the antenna 902 is formed only over the protective layer 903; however, the invention is not limited to this structure and the antenna 902 may be formed over the protective layer 901 as well. It is to be noted that a barrier film made of a silicon nitride film or the like may be formed between the element group 904 and each of the protective layer 901 and the protective layer 903. As a result, contamination of the element group 904 can be prevented, which leads to a semiconductor device with improved reliability.

The antenna 902 can be formed of Ag, Cu, or a metal plated with Ag or Cu. The element group 904 and the antenna 902 can be connected to each other using an anisotropic conductive film and applying ultraviolet treatment or ultrasonic wave treatment. It is to be noted that the element group 904 and the antenna 902 may be attached to each other using a conductive paste or the like.

By sandwiching the element group 904 between the protective layer 901 and the protective layer 903, a semiconductor device is completed (see arrows in FIG. 23A).

Figure 23B:
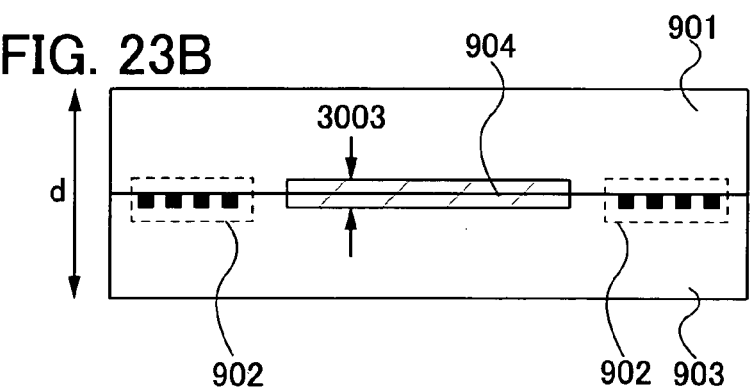
Figure 23C:
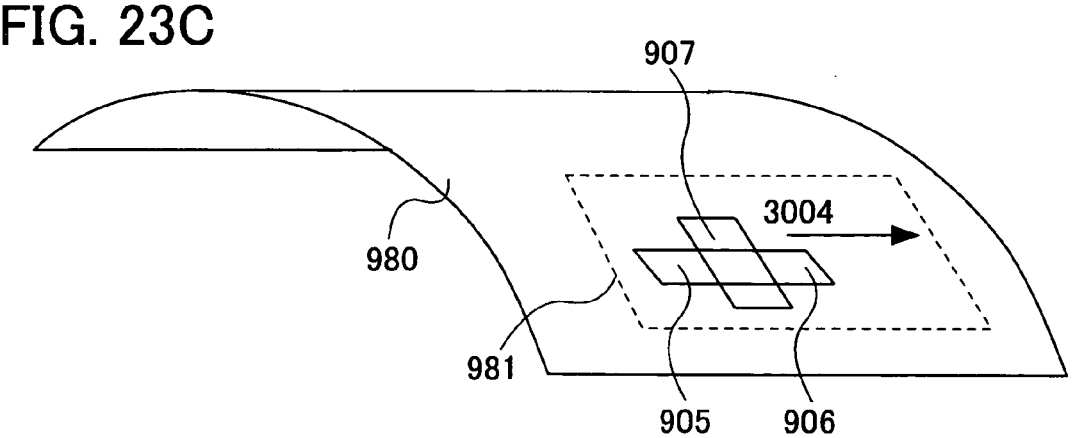

FIG. 23B shows a cross-sectional structure of the thus formed semiconductor device. A thickness 3003 of the element group 904 which is sandwiched is 5 μm or less, and preferably 0.1 to 3 μm. Furthermore, when the protective layer 901 and the protective layer 903 which overlap each other have a thickness of d, each of the protective layer 901 and the protective layer 903 preferably has a thickness of (d/2)±30 μm, and more preferably (d/2)±10 μm. In addition, each of the protective layer 901 and the protective layer 903 desirably has a thickness of 10 to 200 μm. The element group 904 has an area of 10 mm square (100 mm$^2$) or smaller, and desirably 0.3 to 4 mm square (0.09 to 16 mm$^2$).

Each of the protective layer 901 and the protective layer 903 is made of an organic resin material, and thus has high resistance against bending. The element group 904 that is formed by a peeling process or thinning of a substrate also has higher resistance against bending as compared to a single crystal semiconductor. Since the element group 904, the protective layer 901, and the protective layer 903 can be tightly attached to each other without any space, a completed semiconductor device itself also has high resistance against bending. The element group 904 surrounded by the protective layer 901 and the protective layer 903 may be provided over a surface of or inside of another object, or embedded in paper.

The case where a semiconductor device including the element group 904 is attached to a substrate having a curved surface will be described with reference to FIG. 23C. FIG. 23C shows one transistor 981 selected from the element group 904. In the transistor 981, a current flows from a source 905 to a drain 906 in accordance with a potential of a gate electrode 907. The transistor 981 is provided so that the direction 3004 of the current flow in the transistor 981 (carrier movement direction) and the direction of the arc of the substrate 980 cross at right angles. With such an arrangement, the transistor 981 is less affected by stress even when the substrate 980 is bent to be an arc, and thus variations in characteristics of the transistor 981 included in the element group 904 can be suppressed.

In a semiconductor device of the invention, part of circuits which generate amplitude-modulation signals and frequency-modulation signals (the first frequency-dividing circuit 101, the second frequency-dividing circuit 102, the low-speed/high-speed switching portion 105, the modulating circuit 507 and the like) can be shared between the amplitude-modulation method and the frequency-modulation method, so that size and power consumption of the semiconductor device can be reduced.

This embodiment can be freely combined with the above-described embodiment modes and the Embodiment 1.

Embodiment 3

Figure 26:
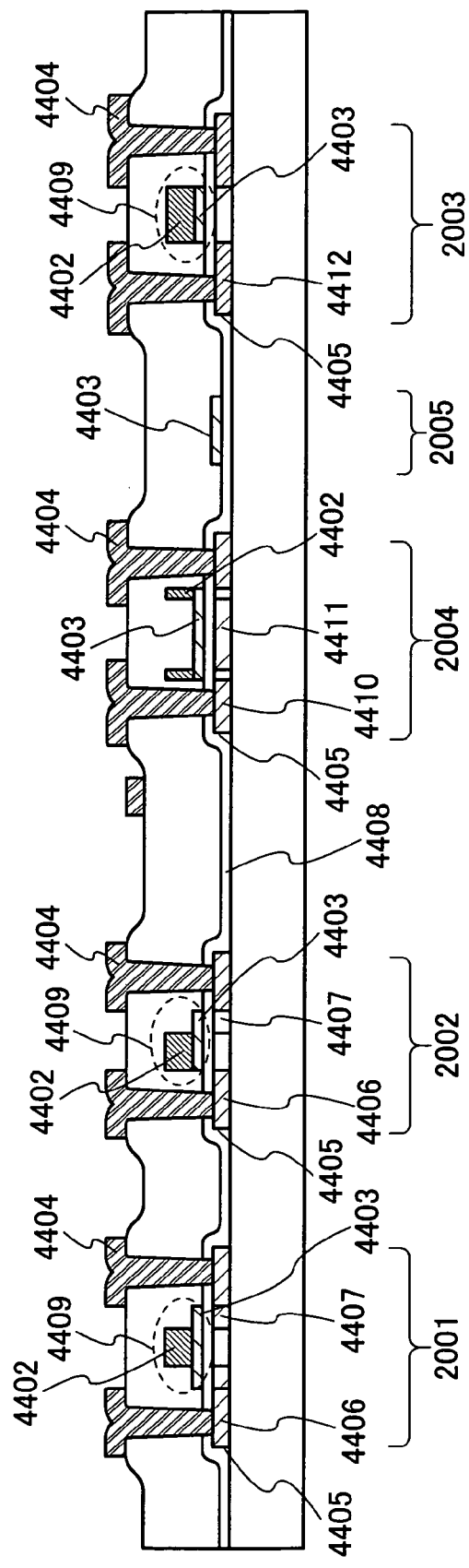
FIG. 26 is a diagram showing a structure of a semiconductor device of Embodiment 3.

This embodiment shows an example structure of a transistor used in a circuit that constitutes a semiconductor device of the invention. The transistor may be a MOS transistor formed over a single crystalline substrate, or a thin film transistor (TFT) as well. FIG. 26 shows a cross-sectional structure of such transistors constituting a circuit. FIG. 26 shows an N-channel transistor 2001, an N-channel transistor 2002, a capacitor 2004, a resistor 2005, and a P-channel transistor 2003. Each of the transistors includes a semiconductor layer 4405, an insulating layer 4408, and a gate electrode 4409. The gate electrode 4409 has a stacked-layer structure of a first conductive layer 4403 and a second conductive layer 4402. FIGS. 27A to 27E are top views corresponding to the transistors, the capacitor, and the resistor shown in FIG. 26, and can also be referred to.

In FIG. 26, the N-channel transistor 2001 has lightly doped drain (LDD) regions on both sides of a channel forming region in the semiconductor layer 4405. The lightly doped drain (LDD) regions are impurity regions 4407 to which an impurity imparting N-type conductivity is doped at a lower concentration than to a source region and a drain region (impurity regions 4406) that are in contact with wirings 4404. In the case of forming the N-channel transistor 2001, the impurity regions 4406 and the impurity regions 4407 are added with an impurity imparting N-type conductivity, such as phosphorus. The LDD regions are formed to suppress hot electron degradation and short channel effects.

Figure 27A:
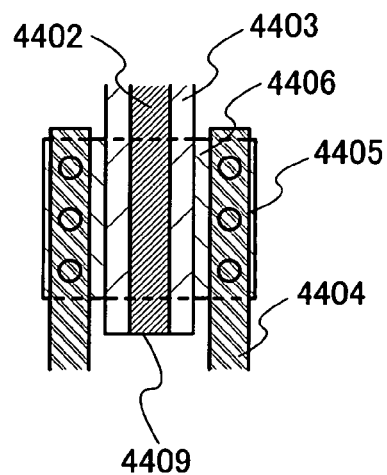
FIGS. 27A to 27E are diagrams each showing an element of the semiconductor device of Embodiment 3.

As shown in FIG. 27A, in the gate electrode 4409 of the N-channel transistor 2001, the first conductive layer 4403 is provided on both sides of the second conductive layer 4402. In this case, the thickness of the first conductive layer 4403 is smaller than that of the second conductive layer 4402. The first conductive layer 4403 is formed to have such a thickness that ion species accelerated with an electric field of 10 to 100 kV can pass through. The impurity regions 4407 are formed to overlap the first conductive layer 4403 of the gate electrode 4409. In other words, the LDD regions overlapping the gate electrode 4409 are provided. In this structure, the impurity regions 4407 are formed in a self-alignment manner by adding an impurity of one conductivity type to the gate electrode 4409 through the first conductive layer 4403 using the second conductive layer 4402 as a mask. That is to say, the LDD regions overlapping the gate electrode are formed in a self-alignment manner.

A transistor having LDD regions on both sides of the channel forming region in the semiconductor layer is applied to a transistor constituting a transmission gate (also referred to as an analog switch) or a transistor used in a rectification circuit 504 in a power supply circuit 503 shown in FIG. 5. Such a transistor preferably includes LDD regions on both sides of a region overlapping the gate electrode in the semiconductor layer, since positive and negative voltages are applied to source and drain electrodes.

Figure 27B:
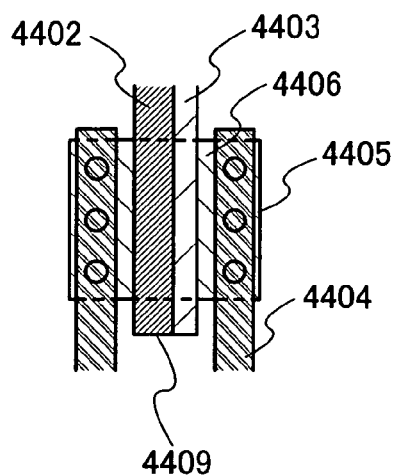

In FIG. 26, the N-channel transistor 2002 has an impurity region 4407 formed on one side of the channel forming region in the semiconductor layer 4405. To the impurity region 4407, an impurity element imparting conductivity is doped at a lower concentration than to the impurity region 4406. As shown in FIG. 27B, in the gate electrode 4409 of the N-channel transistor 2002, the first conductive layer 4403 is provided on one side of the second conductive layer 4402. In this case also, the LDD region can be formed in a self-alignment manner by adding an impurity of one conductivity type through the first conductive layer 4403 using the second conductive layer 4402 as a mask.

A transistor having an LDD region on one side of a region overlapping a gate electrode in a semiconductor layer may be applied to a transistor in which either a positive voltage or a negative voltage is applied between source and drain electrodes. Specifically, the transistor having an LDD region on one side of the region overlapping the gate electrode in the semiconductor layer may be applied to a transistor constituting a logic gate such as an inverter circuit, a NAND circuit, a NOR circuit, and a latch circuit, or a transistor constituting an analog circuit such as a sense amplifier, a constant voltage generation circuit, and a VCO (Voltage Controlled Oscillator).

Figure 27C:
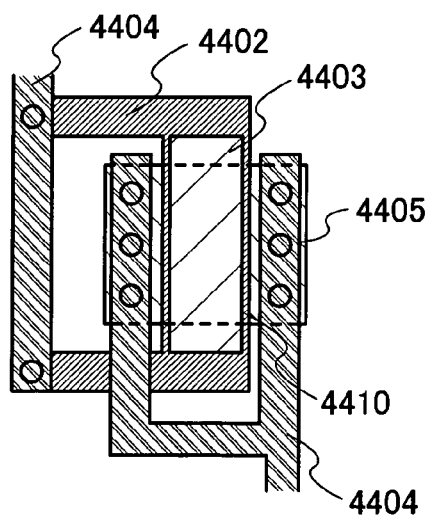

In FIG. 26, the capacitor 2004 has a structure in which the insulating layer 4408 is sandwiched between the first conductive layer 4403 and the semiconductor layer 4405. The semiconductor layer 4405 of the capacitor 2004 includes impurity regions 4410 and an impurity region 4411. The impurity region 4411 is formed in the semiconductor layer 4405 so as to overlap the first conductive layer 4403. The impurity region 4410 is in contact with the wiring 4404. Since an impurity of one conductivity type can be added to the impurity region 4411 through the first conductive layer 4403, the impurity region 4410 and the impurity region 4411 may contain the same concentration of impurity or different concentrations of impurity. In any case, the semiconductor layer 4405 of the capacitor 2004 functions as an electrode; therefore, it is preferable that an impurity of one conductivity type be added to the semiconductor layer 4405 to reduce the resistance thereof. The first conductive layer 4403 and the second conductive layer 4402 can effectively function as an electrode of the capacitor 2004 by utilizing the second conductive layer 4402 as an auxiliary electrode as shown in FIG. 27C. Such a composite electrode structure combining the first conductive layer 4403 and the second conductive layer 4402 allows the capacitor 2004 to be formed in a self-alignment manner.

The capacitor 2004 can be used as the storage capacitor 505 of the power supply circuit 503, the resonant capacitor 501, or the capacitor of the demodulating circuit 506, which are shown in FIG. 5. In particular, the resonant capacitor 501 is required to function as a capacitor regardless of a positive or negative voltage applied between two terminals of the capacitor, since both positive and negative voltages are applied between the two terminals.

Figure 27D:
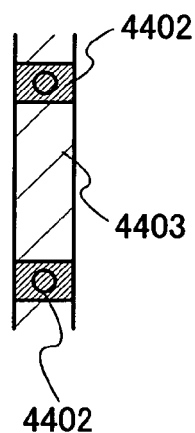

In FIG. 26, the resistor 2005 includes the first conductive layer 4403 (see also FIG. 27D). The first conductive layer 4403 is formed to have a thickness of approximately 30 to 150 nm; therefore, the resistor can be formed by appropriately setting the width and length thereof.

The resistor can be used as the resistance load of the modulating circuit 507 shown in FIG. 5, as well as the resistor of the demodulating circuit 506 shown in FIG. 5. Further, the resistor can be used as the load in the case of controlling a current by a VCO or the like. The resistor may be constituted by a semiconductor layer containing a high concentration of an impurity element that imparts conductivity, or a thin metal layer. While the resistance of a resistor using a semiconductor layer depends on the film thickness, film quality, impurity concentration, activation rate, and the like; the resistance of a resistor using a metal layer is determined by the film thickness and film quality and has few variations, which is preferable.

In FIG. 26, the P-channel transistor 2003 includes the semiconductor layer 4405 provided with impurity regions 4412. The impurity regions 4412 function as source and drain regions that are in contact with the wiring 4404. The gate electrode 4409 has a structure in which the first conductive layer 4403 and the second conductive layer 4402 overlap each other (see also FIG. 27E). The P-channel transistor 2003 is a transistor with a single drain structure in which an LDD region is not provided. When the P-channel transistor 2003 is formed, an impurity that imparts P-type conductivity, such as boron, is added to the impurity region 4412. On the other hand, when an impurity that imparts N-type conductivity, such as phosphorus, is added to the impurity region 4412, an N-channel transistor with a single drain structure can be obtained.

One or both of the semiconductor layer 4405 and the gate insulating layer 4408 may be oxidized or nitrided by high density plasma treatment. This treatment can be performed in a similar manner to that described in the Embodiment 1.

According to the aforementioned treatment, the defect level in the interface between the semiconductor layer 4405 and the gate insulating layer 4408 can be reduced. When this treatment is applied to the gate insulating layer 4408, the gate insulating layer 4408 can be densified. In other words, generation of charged defects can be suppressed, and variations in threshold voltage of the transistor can be suppressed. When the transistor is driven with a voltage of 3 V or lower, an insulating layer that is oxidized or nitrided by the plasma treatment can be used as the gate insulating layer 4408. If the driving voltage of the transistor is 3 V or higher, the gate insulating layer 4408 can be formed by combining an insulating layer formed over the surface of the semiconductor layer 4405 by the plasma treatment and an insulating layer deposited by a CVD method (a plasma CVD method or a thermal CVD method). In addition, the insulating layer may also be used as a dielectric layer of the capacitor 2004. In this case, the insulating layer formed by the plasma treatment is a dense film with a thickness of 1 to 10 nm; therefore, a capacitor with large charge capacity can be obtained.

As described with reference to FIGS. 26 to 27E, the elements with various structures can be formed by combining conductive layers with different thicknesses. A region where only the first conductive layer is formed and a region where the first conductive layer and the second conductive layer are stacked can be formed using a photomask or a reticle provided with a diffraction grating pattern or a semi-transparent assist pattern for reducing light transmittance. That is to say, the amount of light passing through a photomask is controlled when the photoresist is exposed to light in a photolithography step, so that developed resist masks have different thicknesses. In that case, the resist with a complicated shape may be formed by providing the photomask or the reticle with slits that are apart with a distance of resolution limit or less. Furthermore, the mask pattern made of a photoresist material may be deformed by baking at a temperature of approximately 200° C. after the development.

In addition, the region where only the first conductive layer is formed and the region where the first conductive layer and the second conductive layer are stacked can be continuously formed using a photomask or a reticle provided with a diffraction grating pattern or a semi-transparent assist pattern for reducing light transmittance. Such a region where only the first conductive layer is formed over the semiconductor layer is advantageous since an LDD region can be manufactured in a self-alignment manner, but the region where only the first conductive layer is formed is not necessary in other regions (wiring regions connected to the gate electrode) than over the semiconductor layer. When the photomask or the reticle is used, the region where only the first conductive layer is formed is not provided in the wiring regions (portions dense with wirings), which can substantially increases the wiring density in the wiring portions.

Figure 27E:
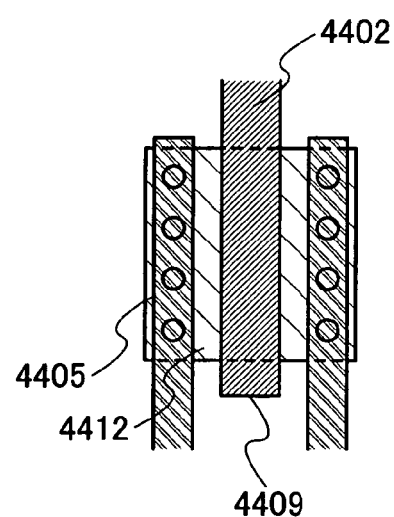

In the case of FIGS. 26 to 27E, the first conductive layer is formed to have a thickness of 30 to 50 nm using a high melting point metal such as tungsten (W), chromium (Cr), tantalum (Ta), tantalum nitride (TaN), or molybdenum (Mo), or an alloy or a compound containing the high melting point metal as its main component. In addition, the second conductive layer is formed to have a thickness of 300 to 600 nm using a high melting point metal such as tungsten (W), chromium (Cr), tantalum (Ta), tantalum nitride (TaN), or molybdenum (Mo), or an alloy or a compound containing the high melting point metal as its main component. For example, the first conductive layer and the second conductive layer are made of different conductive materials so as to have a difference in etching rate in the subsequent etching step. The first conductive layer and the second conductive layer may be made of, for example, TaN and tungsten, respectively.

Shown in this embodiment is the method in which the transistor, the capacitor, and the resistor each having a different electrode structure can be formed in an etching step using the same photomask or reticle provided with a diffraction grating pattern or a semi-transparent assist pattern for reducing light transmittance. According to this embodiment, elements having different modes in accordance with circuit characteristics can be formed and integrated without increasing the number of steps.

In a semiconductor device of the invention, part of circuits which generate amplitude-modulation signals and frequency-modulation signals (the first frequency-dividing circuit 101, the second frequency-dividing circuit 102, the low-speed/high-speed switching portion 105, the modulating circuit 507 and the like) can be shared between the amplitude-modulation method and the frequency-modulation method, so that size and power consumption of the semiconductor device can be reduced.

This embodiment can be freely combined with the aforementioned embodiment modes and Embodiments 1 and 2.

Embodiment 4

In this embodiment, an example of a static RAM (SRAM) that can be used as a memory (the memory 305 in FIG. 3, and the like) of the semiconductor device of the invention will be described with reference to FIGS. 28A to 30B.

Figure 28A:
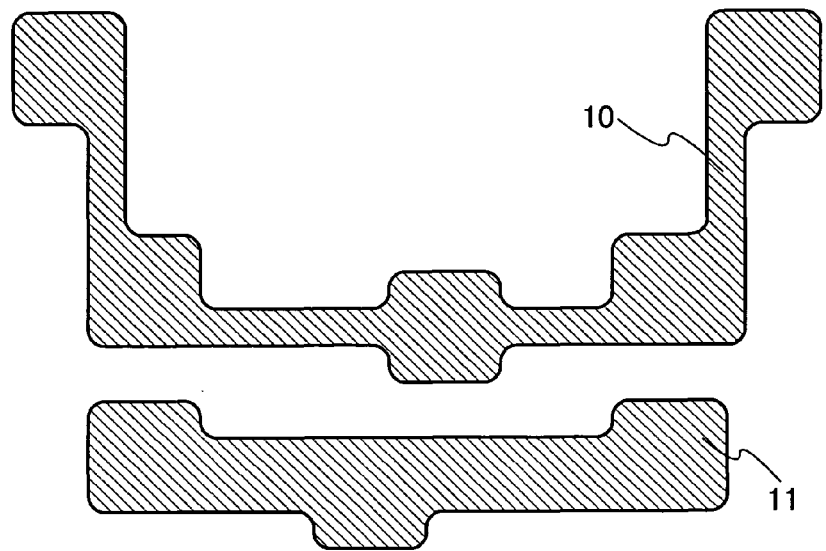
FIGS. 28A and 28B are diagrams each showing semiconductor layers and a mask pattern thereof of a semiconductor device of Embodiment 4.

A semiconductor layer 10 and a semiconductor layer 11 shown in FIG. 28A are preferably made of silicon or a crystalline semiconductor containing silicon. For example, the semiconductor layer 10 and the semiconductor layer 11 are made of polycrystalline silicon, single crystalline silicon, or the like that is obtained by crystallizing a silicon film by laser annealing or the like. Furthermore, a metal oxide semiconductor, amorphous silicon, or an organic semiconductor, which has semiconductor characteristics, may also be employed.

In any case, a semiconductor layer formed first is provided over the entire surface or a part (region with a larger area than that determined as a semiconductor region of a transistor) of a substrate having an insulating surface. Then, a mask pattern is formed over the semiconductor layer by photolithography. The mask pattern is used for etching the semiconductor layer, thereby forming the semiconductor layer 10 and the semiconductor layer 11 having specific island shapes, which include a source region, a drain region, and a channel forming region of a transistor. The shapes of the semiconductor layer 10 and the semiconductor layer 11 are determined, considering the adequacy of layout.

Figure 28B:
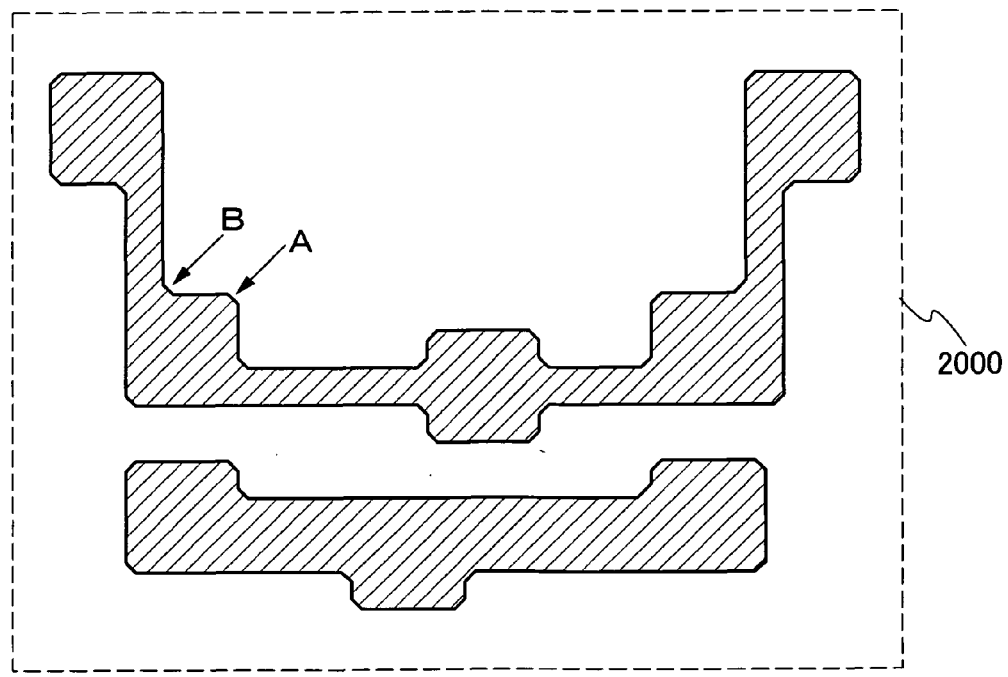

The photomask for forming the semiconductor layer 10 and the semiconductor layer 11 shown in FIG. 28A has a mask pattern 2000 shown in FIG. 28B. The mask pattern 2000 is different depending on whether a resist used in a photolithography step is a positive type or a negative type. In the case of using the positive type resist, the mask pattern 2000 shown in FIG. 28B is manufactured as a light shielding portion. The mask pattern 2000 has a shape in which a vertex portion A of a polygon is removed. In addition, a corner portion B is bent so as not to be a right angle. In closeup, it can be seen that the corner portion B is bent a plurality of times.

The shape of the mask pattern 2000 shown in FIG. 28B is reflected in the semiconductor layer 10 and the semiconductor layer 11 shown in FIG. 28A. In that case, the shape similar to the mask pattern 2000 may be transferred, and the transfer may be conducted so that the corner (convex portion) of the mask pattern 2000 is further rounded. In other words, a round portion in which the pattern shape is smoother than the mask pattern 2000 may be provided.

Figure 29A:
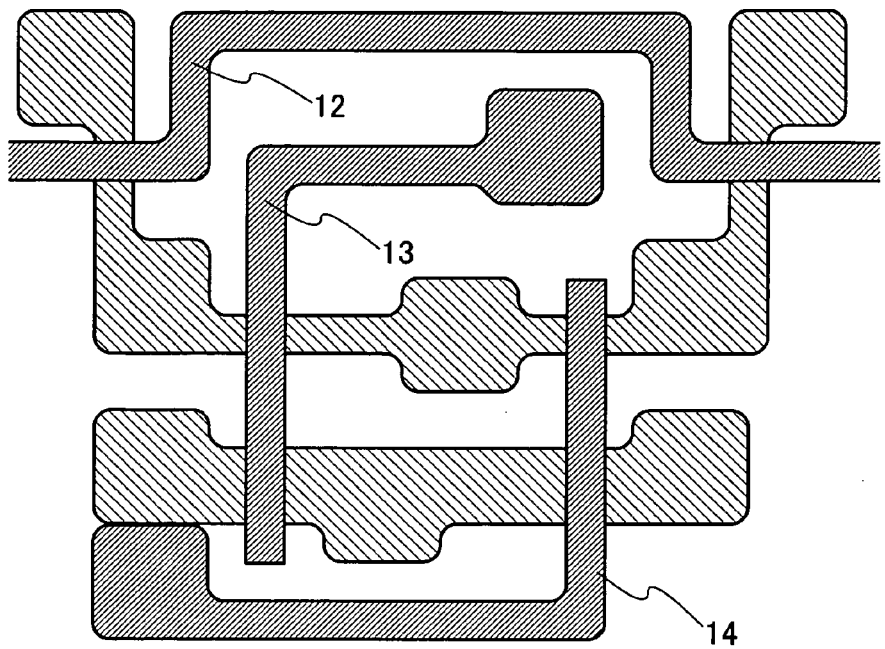
FIGS. 29A and 29B are diagrams each showing semiconductor layers and gate wirings and a mask pattern thereof of the semiconductor device of Embodiment 4.

An insulating layer that contains silicon oxide or silicon nitride at least partially is formed over the semiconductor layer 10 and the semiconductor layer 11. One of the objects for forming this insulating layer is a gate insulating layer 11. Then, as shown in FIG. 29A, a gate wiring 12, a gate wiring 13, and a gate wiring 14 are formed so as to overlap the semiconductor layer partially. The gate wiring 12 is formed corresponding to the semiconductor layer 10, the gate wiring 13 is formed corresponding to the semiconductor layer 10 and the semiconductor layer 11, and the gate wiring 14 is formed corresponding to the semiconductor layer 10 and the semiconductor layer 11. In order to obtain the gate wirings, a metal layer or a semiconductor layer having high conductivity is deposited over the insulating layer and processed into a desired shape by photolithography.

Figure 29B:
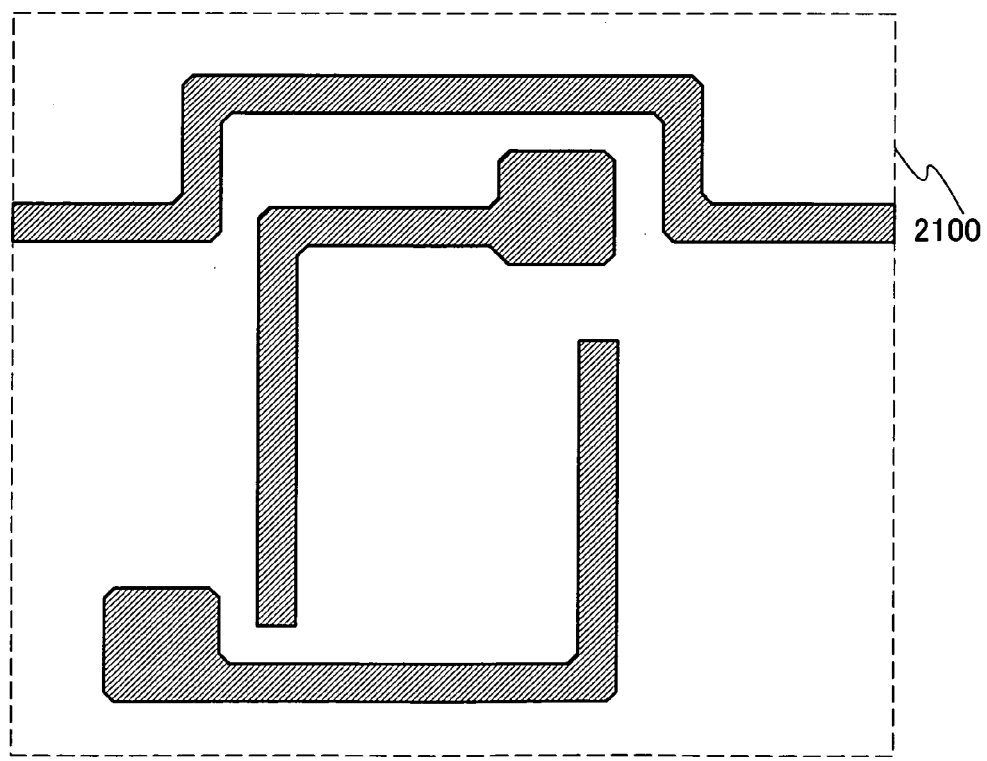

The photomask for forming the gate wirings has a mask pattern 2100 shown in FIG. 29B. The corner of the mask pattern 2100 is chamfered. The shape of the mask pattern 2100 shown in FIG. 29B is reflected in the gate wiring 12, the gate wiring 13, and the gate wiring 14 shown in FIG. 29A. In that case, the shape similar to the mask pattern 2100 may be transferred, and the transfer may be conducted so that the corner (bend portion) of the mask pattern 2100 is further rounded. In other words, a round portion in which the pattern shape is smoother than the mask pattern 2100 may be provided. That is to say, each corner of the gate wiring 12, the gate wiring 13, and the gate wiring 14 may be rounded. The convex portion has an effect that the generation of fine powder due to abnormal discharge can be suppressed in dry etching using plasma, and the bend portion has an effect that even if fine powder that easily gathers in the corner is generated, it can be washed away in cleaning. As a result, improvement in yield can be greatly expected.

An interlayer insulating layer is formed after the gate wiring 12, the gate wiring 13, and the gate wiring 14. The interlayer insulating layer is made of an inorganic insulating material such as silicon oxide, or an organic insulating material using polyimide, an acrylic resin, or the like. An insulating layer made of silicon nitride, silicon nitride oxide, or the like may be formed between the interlayer insulating layer and the gate wiring 12, the gate wiring 13, and the gate wiring 14. In addition, an insulating layer made of silicon nitride, silicon nitride oxide, or the like may be formed over the interlayer insulating layer. Such an insulating layer can prevent the semiconductor layer and the gate insulating layer from being contaminated with impurities such as extrinsic metal ion and moisture, which may adversely affect a thin film transistor (TFT).

Figure 30A:
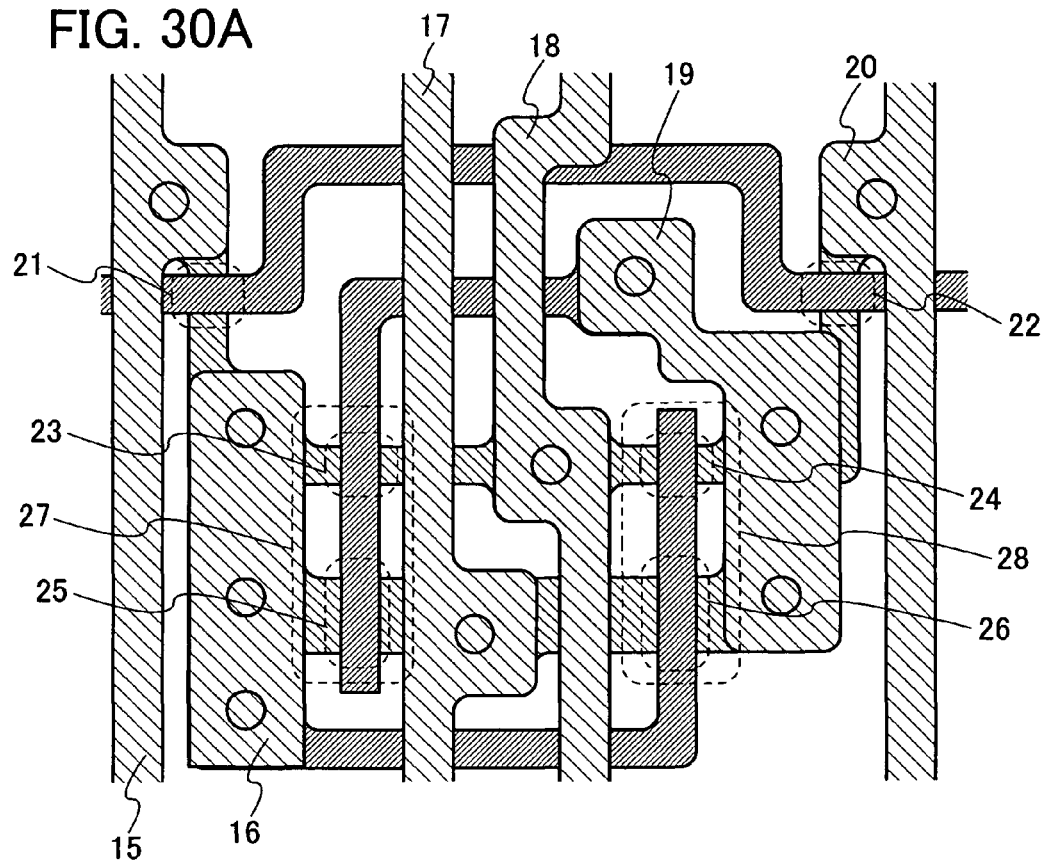
FIGS. 30A and 30B are diagrams each showing semiconductor layers, gate wirings, and wirings and a mask pattern thereof of the semiconductor device of Embodiment 4.

In the interlayer insulating layer, an opening is formed in a predetermined position. For example, the opening is provided corresponding to the gate wiring or semiconductor layer in the lower layer. A wiring layer including one layer or a plurality of layers made of metal or a metal compound is processed into a predetermined pattern by etching using a mask pattern that is formed by photolithography. Then, as shown in FIG. 30A, wirings 15 to 20 are formed so as to partially overlap the semiconductor layer 10 and the semiconductor layer 11. Each of the wirings connects particular elements. Each of the wirings connects particular elements not with a straight line but with a line including a bend portion due to layout limitations. In addition, a wiring width changes in a contact portion with other wirings or in other regions. The wiring width increases in a contact portion if the size of a contact hole is equal to or larger than the wiring width.

Figure 30B:
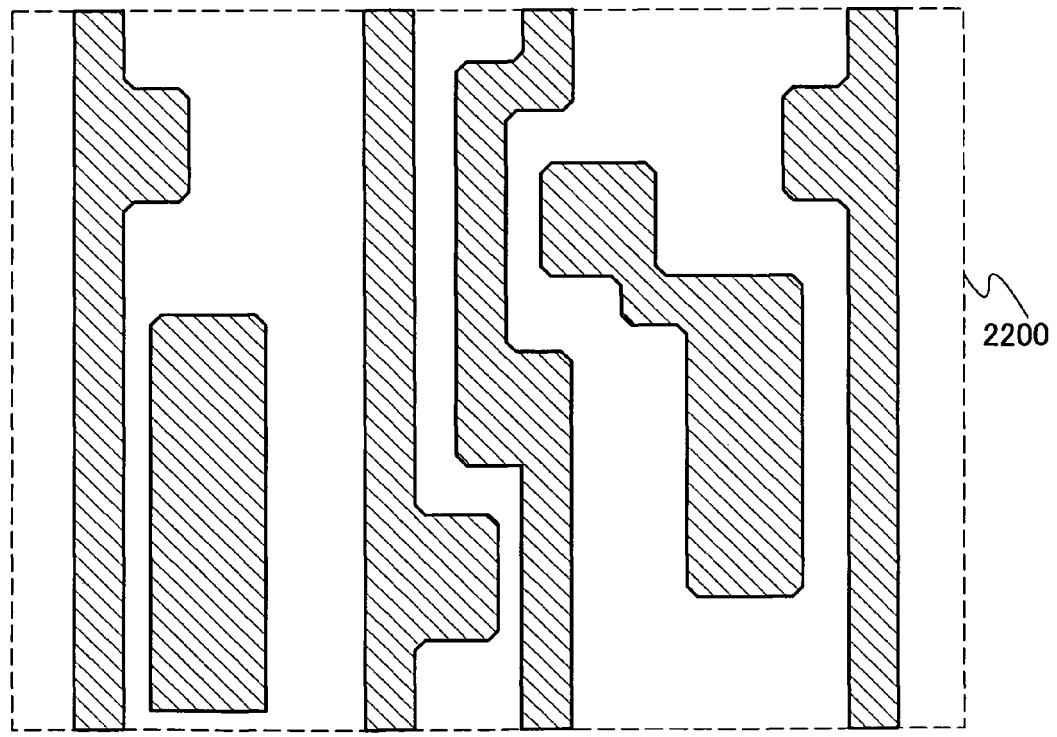

A photomask for forming the wirings 15 to 20 has a mask pattern 2200 shown in FIG. 30B. In that case also, the corner of the wiring is chamfered. Further, the corner may be rounded. The convex portion of such a wiring has an effect that the generation of fine powder due to abnormal discharge can be suppressed in dry etching using plasma, and the bend portion of the wiring has an effect that even if fine powder that easily gathers in the corner is generated, it can be washed away in cleaning. As a result, improvement in yield can be greatly expected. Furthermore, the wiring with a rounded corner improves electrical conduction of wirings. In addition, the use of a wiring with a rounded corner in a structure including multiple parallel wirings is highly advantageous to wash away dusts.

FIG. 30A shows N-channel transistors 21 to 24 and P-channel transistors 25 and 26. The N-channel transistor 23 and the P-channel transistor 25 constitute an inverter 27. The N-channel transistor 24 and the P-channel transistor 26 constitute an inverter 28. A circuit including these six transistors constitutes an SRAM. An insulating layer made of silicon nitride, silicon oxide, or the like may be formed over these transistors.

Since a memory with fewer defects can be formed according to this embodiment, reliability of a semiconductor device of the invention can be improved by using the memory.

In a semiconductor device of the invention, part of circuits which generate amplitude-modulation signals and frequency-modulation signals (the first frequency-dividing circuit 101, the second frequency-dividing circuit 102, the low-speed/high-speed switching portion 105, the modulating circuit 507 and the like) can be shared between the amplitude-modulation method and the frequency-modulation method, so that size and power consumption of the semiconductor device can be reduced.

This embodiment can be freely combined with the aforementioned embodiment modes and Embodiments 1 to 3.

Embodiment 5

Figure 31A:
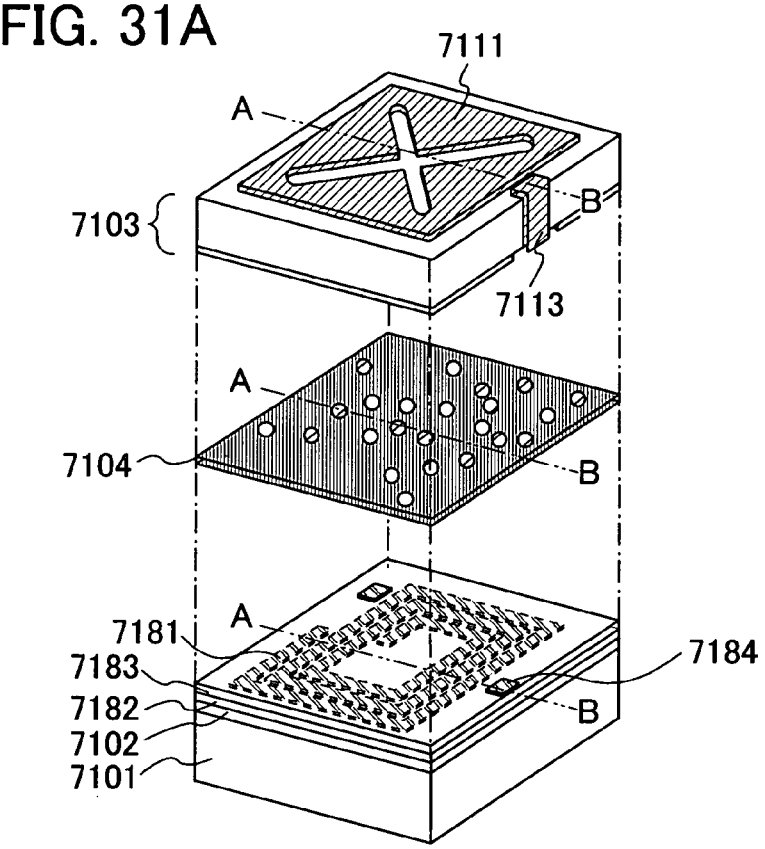
FIGS. 31A and 31B are diagrams showing a structure of a semiconductor device of Embodiment 5.
Figure 31B:
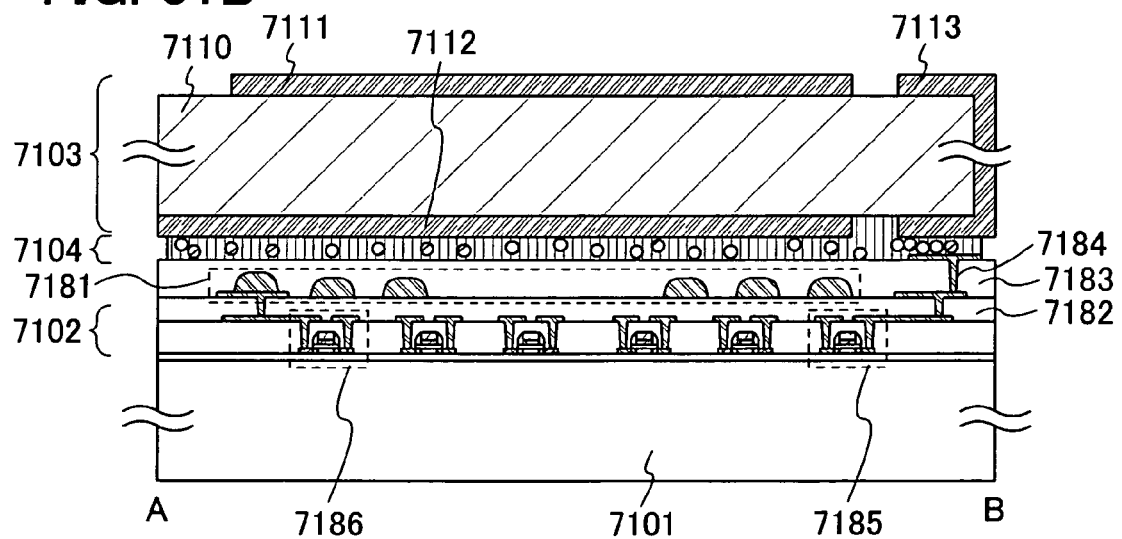

One embodiment of a semiconductor device of the invention is shown in FIGS. 31A and 31B. FIG. 31A is a development view of the semiconductor device, and FIG. 31B is a cross-sectional view along a line A-B of FIG. 31A. Described in this embodiment is a structure of the semiconductor device including a plurality of antennas, particularly the semiconductor device including an antenna and a patch antenna that are formed over a layer having a thin film transistor. The patch antenna 7103 includes a dielectric layer 7110, a conductive layer 7111 formed on one surface of the dielectric layer 7110, a conductive layer 7112 opposed to the conductive layer 7111 and formed on the other surface of the dielectric layer 7110, and a power feeding layer 7113. The power feeding layer 7113 is formed so as not to contact with the conductive layer 7111 nor conductive layer 7112.

Similarly to the method for manufacturing the element group 601 described in the Embodiment 1, a layer 7102 including thin film transistors is formed over an insulating substrate 7101. An interlayer insulating layer 7182 is formed over the layer 7102 including thin film transistors. A first antenna 7181 is formed over the interlayer insulating layer 7182. An insulating layer 7183 is formed over the first antenna 7181, and a connecting terminal 7184 is formed on the surface of the insulating layer 7183.

The insulating layer 7183, in a part of which the connecting terminal 7184 is exposed, is attached to a patch antenna 7103 that is a second antenna with an anisotropic conductive adhesive 7104. The connecting terminal 7184 is electrically connected to the power feeding layer 7113 of the patch antenna with conductive particles dispersed in the anisotropic conductive adhesive. The connecting terminal 7184 is also electrically connected to a first thin film transistor 7185 that is formed in the layer 7102 including thin film transistors. Furthermore, the first antenna 7181 is connected to a second thin film transistor 7186 that is formed in the layer 7102 including thin film transistors. It is to be noted that a conductive layer that is obtained by curing a conductive paste may be used instead of the anisotropic conductive adhesive.

The first antenna 7181 is made of a metal material containing aluminum, copper, or silver. For example, composition of copper or silver paste can be formed by a printing method such as screen printing, offset printing, or ink-jet printing. Alternatively, an aluminum film may be formed by sputtering or the like, and processed by etching. The first antenna 7181 may also be formed by an electrolytic plating method or an electroless plating method.

It is to be noted that the first antenna 7181 can be omitted.

Figure 32A:
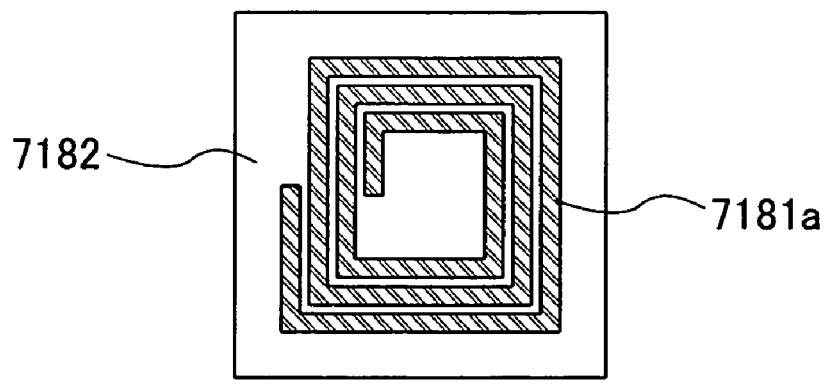
FIGS. 32A to 32C are diagrams each showing a shape of an antenna of Embodiment 5.

Here, the first antenna 7181 has a shape of a square coil as shown in FIG. 32A.

Figure 32B:
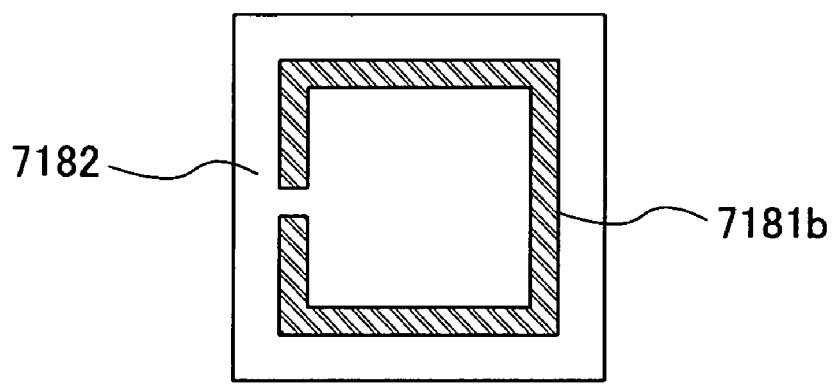
Figure 32C:
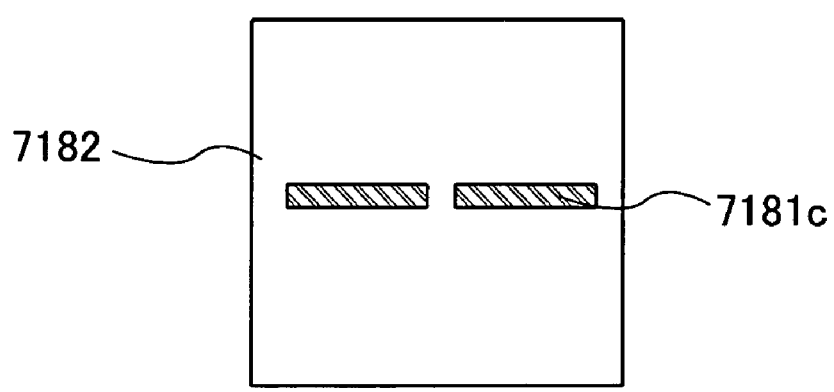

The shape of the first antenna 7181 will be described with reference to FIGS. 32A to 32C. FIGS. 32A to 32C are top views showing the interlayer insulating layer 7182 and an antenna formed thereover. Although the first antenna 7181 has a square coil shape 7181*a* as shown in FIG. 31A and FIG. 32A in this embodiment, the shape is not limited to this. The antenna may have a circular coil shape or a polygon coil shape. Alternatively, as shown in FIG. 32B, the antenna may have a square loop shape 7181*b*. The antenna may also have a circular loop shape or a polygon loop shape. Furthermore, as shown in FIG. 32C, the antenna may have a linear-dipole shape 7181*c*. Moreover, the antenna may also have a curved-dipole shape.

By thus providing a plurality of antennas, a multiband semiconductor device that is capable of receiving electric waves with a plurality of different frequencies can be formed.

In a semiconductor device of the invention, part of circuits which generate amplitude-modulation signals and frequency-modulation signals (the first frequency-dividing circuit 101, the second frequency-dividing circuit 102, the low-speed/high-speed switching portion 105, the modulating circuit 507 and the like) can be shared between the amplitude-modulation method and the frequency-modulation method, so that size and power consumption of the semiconductor device can be reduced.

This embodiment can be freely combined with the aforementioned embodiment modes and Embodiments 1 to 4.

Embodiment 6

In this embodiment, applications of a semiconductor device of the invention (corresponding to the wireless tag 200 in FIG. 2) are described with reference to FIGS. 24A to 25E. The wireless tag 200 can be incorporated in, for example, bills, coins, securities, bearer bonds, certificates (driving license, resident card, and the like, see FIG. 25A), containers for wrapping objects (wrapping paper, bottle, and the like, see FIG. 25B), recording media such as DVDs, CDs, and video tapes (see FIG. 25C), vehicles such as cars, motorbikes, and bicycles (see FIG. 25D), personal belongings such as bags and glasses (see FIG. 25E), foods, clothes, commodities, electronic apparatuses, and the like. The electronic apparatuses include a liquid crystal display device, an EL (electroluminescence) display device, a television set (also simply called a television or a television receiver), a mobile phone set, and the like.

The wireless tag 200 can be fixed to an object by being attached to the surface of the object or embedded in the object. For example, the wireless tag 200 may be embedded in paper of a book, or organic resin of a package. When the wireless tag 200 is incorporated in bills, coins, securities, bearer bonds, certificates, and the like, forgery thereof can be prevented. Furthermore, when the wireless tag 200 is incorporated in containers for wrapping objects, recording media, personal belongings, foods, clothes, commodities, electronic apparatuses, and the like, an inspection system, a rental system, and the like can be performed more efficiently. The wireless tag 200 can also prevent vehicles from being forged or stolen. In addition, when the wireless tag 200 is implanted into creatures such as animals, each creature can be identified easily. For example, when the wireless tag is implanted into creatures such as domestic animals, the year of birth, sex, breed, and the like thereof can be identified easily.

As described above, the wireless tag 200 of the invention can be incorporated in any object (including creatures).

The wireless tag 200 has various advantages such that data can be transmitted and received by wireless communication, the wireless tag can be processed into various shapes, and wide directivity and recognition range are achieved depending on a selected frequency.

Figure 24A:
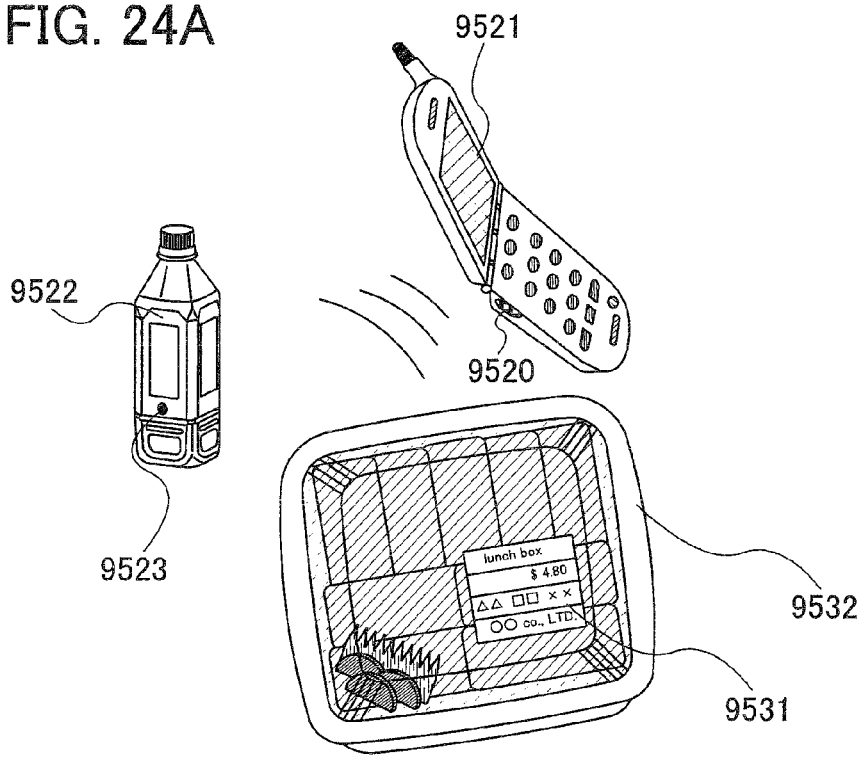
FIG. 24A is a diagram showing a structure of semiconductor devices and FIG. 24B is a chart of a business model of Embodiment 6.
Figure 24B:
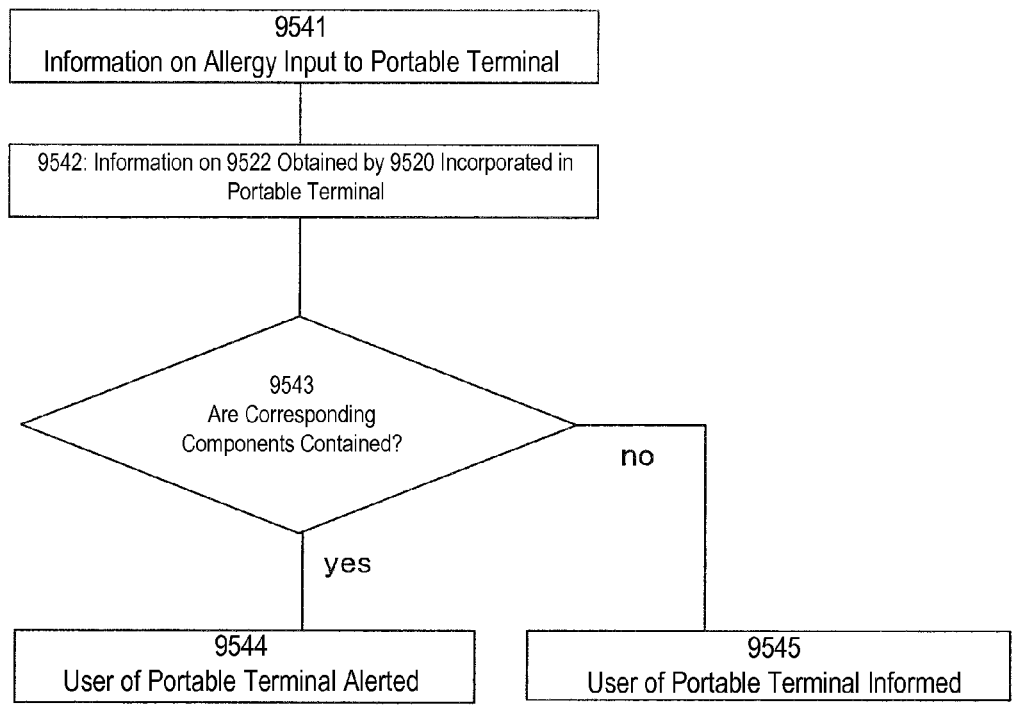
Figure 25A:
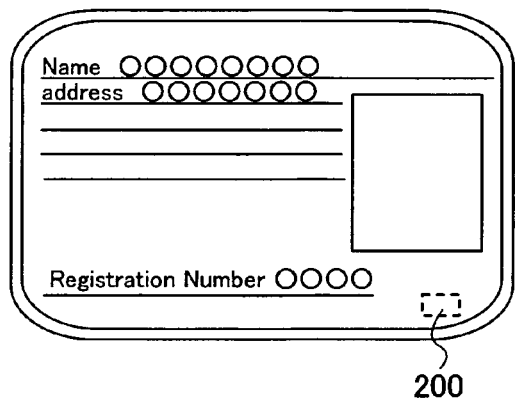
FIGS. 25A to 25E are diagrams each showing a structure of a semiconductor device of Embodiment 6.
Figure 25B:
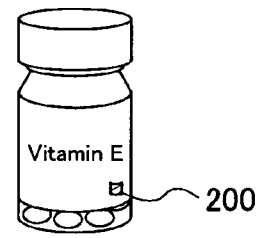
Figure 25C:
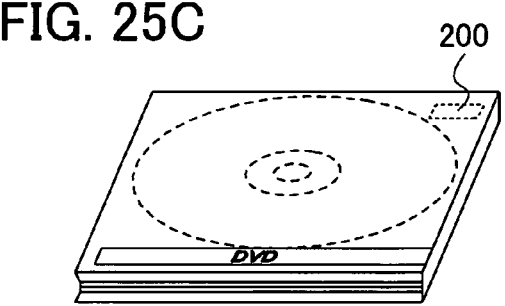
Figure 25D:
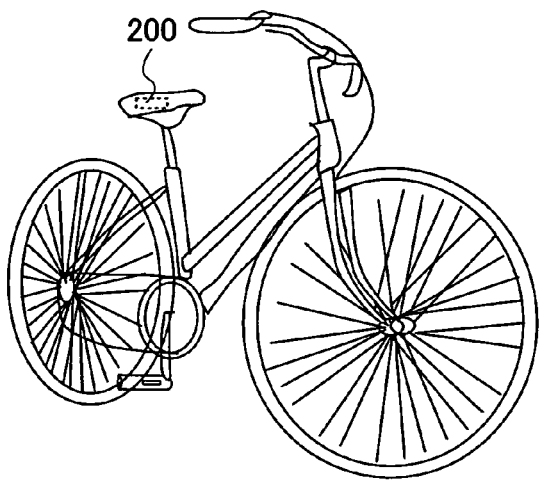
Figure 25E:
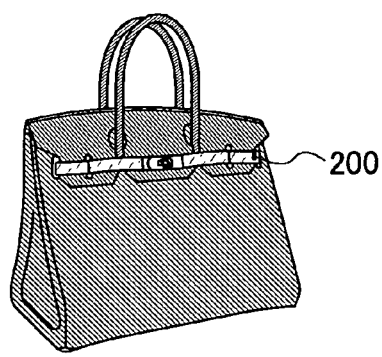

Next, one mode of a system using the wireless tag 200 will be described with reference to FIGS. 24A and 24B. A reader/writer 9520 (corresponding to the reader/writer 201 in FIG. 2) is provided on a side of a portable terminal including a display portion 9521. A semiconductor device 9523 of the invention (corresponding to the wireless tag 200 in FIG. 2) is provided on a side of an object A 9522, and a semiconductor device 9531 of the invention is provided on a side of an object B 9532 (see FIG. 24A). When the reader/writer 9520 is brought close to the semiconductor device 9523 included in the object A 9522, information on the object A 9522, such as ingredients, place of origin, test result in each production step, history of the distribution process, and explanation of the object is displayed on the display portion 9521. When the reader/writer 9520 is brought close to the semiconductor device 9531 included in the object B 9532, information on the object B 9532, such as ingredients, place of origin, test result in each production step, history of the distribution process, and explanation of the object is displayed on the display portion 9521.

An example of a business model utilizing the system shown in FIG. 24A will be described with reference to a flow chart shown in FIG. 24B. Information on allergy is input to a portable terminal (9541). The information on allergy is information on medical products, their components, or the like that may cause allergic reactions to certain people. As described above, information on the object A 9522 is obtained by the reader/writer 9520 incorporated in the portable terminal (9542). Here, the object A 9522 is a medical product. The information on the object A 9522 includes information on the components and the like of the object A 9522. The information on allergy is compared to the obtained information on components and the like of the object A 9522, thereby determining whether corresponding components are contained (9543). If the corresponding components are contained, the user of the portable terminal is alerted that certain people may have allergic reactions to the object A (9544). If the corresponding components are not contained, the user of the portable terminal is informed that certain people are at low risk of having allergic reactions to the object A (the fact that the object A is safe) (9545). In the 9544 and the 9545, in order to inform the user of the portable terminal, the information may be displayed on the display portion 9521 of the portable terminal, or an alarm of the portable terminal or the like may be sounded.

Alternatively, as another example of a business model, information on combinations of medical products which are dangerous when used simultaneously or combinations of components of medical products which are dangerous when used simultaneously (hereinafter referred to simply as combination information) is input to a terminal (9541). As described above, information on the object A is obtained by the reader/writer incorporated in the terminal (9542). Here, the object A is a medical product. The information on the object A includes information on components and the like of the object A. Next, as described above, information on the object B is obtained by the reader/writer incorporated in the terminal (9542'). Here, the object B is also a medical product. The information on the object B includes information on components and the like of the object B. In this way, information of a plurality of medical products is obtained. The combination information is compared to the obtained information of a plurality of objects, thereby determining whether a corresponding combination of medical products which are dangerous when used simultaneously is contained (9543). If the corresponding combination is contained, the user of the terminal is alerted (9544). If the corresponding combination is not contained, the user of the terminal is informed of the safety (9545). In the 9544 and the 9545, in order to inform the user of the terminal, the information may be displayed on the display portion of the terminal, or an alarm of the terminal or the like may be sounded.

As described above, by utilizing a semiconductor device of the invention for a system, information can be obtained easily, and a system which realizes high performance and high added values can be provided.

In particular, the semiconductor device of the invention can reduce the power consumption, the circuit scale, and further, the manufacturing cost, so that the semiconductor device of the invention can be provided for various objects and used. Therefore, the semiconductor device of the invention can be utilized for various systems.

This embodiment can be freely combined with the aforementioned embodiment modes and Embodiments 1 to 5.

This application is based on Japanese Patent Application serial no. 2005-232823 filed in Japan Patent Office on Aug. 11, 2005, and Japanese Patent Application serial no. 2005-321290 filed in Japan Patent Office on Nov. 4, 2005, the entire contents of which are hereby incorporated by reference.

The invention claimed is:

1. A semiconductor device which inputs and outputs data by wireless communication, comprising:
   an analog portion and a digital portion;
   a power supply circuit provided in the analog portion;
   an encoding output circuit provided in the digital portion; and
   an encoding circuit provided in the encoding output circuit, the encoding circuit comprising:
   a reset control circuit to which a modulation mode select signal that selects an amplitude-modulation mode or a frequency-modulation mode, and Manchester-encoded information are input, which outputs a first reset signal and a second reset signal;

a first frequency-dividing circuit to which a carrier wave is input, which outputs a sub-carrier wave responding to an amplitude-modulation mode or a frequency-modulation signal responding to a frequency-modulation mode, according to the first reset signal;

a second frequency-dividing circuit which outputs a basic clock signal of which a duty ratio is different between an amplitude-modulation mode and a frequency-modulation mode, according to the second reset signal and an output of the first frequency-dividing circuit; and an ASK/FSK switching portion comprising an ASK signal generating portion and an output signal switching portion, wherein the Manchester-encoded information is input to the ASK signal generating portion, wherein in a case where the sub-carrier wave responding to the amplitude-modulation mode and the output from the first frequency-dividing circuit is input to the ASK signal generating portion, the ASK signal generating portion processes arithmetically the sub-carrier wave responding to the amplitude-modulation mode and the Manchester-encoded information, and an amplitude-modulation signal is output from the ASK signal generating portion to be input to the output signal switching portion, and wherein in a case where the frequency-modulation signal responding to the frequency-modulation mode is input to the ASK signal generating portion, the frequency-modulation signal is output from the ASK signal generating portion to be input to the output signal switching portion.

2. A semiconductor device which inputs and outputs data by wireless communication, comprising:

a reset control circuit to which a modulation mode select signal that selects an amplitude-modulation mode or a frequency-modulation mode, and Manchester-encoded information are input, which outputs a first reset signal and a second reset signal;

a first frequency-dividing circuit to which a carrier wave is input, which outputs a sub-carrier wave responding to an amplitude-modulation mode or a frequency-modulation signal responding to a frequency-modulation mode, according to the first reset signal;

a low-speed/high-speed switching portion to which an output signal of the first frequency-dividing circuit is input, which outputs a basic clock control signal according to a selected data transmission rate wherein a signal having a same frequency as the output signal of the first frequency-dividing circuit is outputted from the low-speed/high-speed switching portion as the basic clock control signal when a high speed rate is selected as the data transmission rate, and wherein a signal divided from the output signal of the first frequency-dividing circuit is outputted from the low-speed/high-speed switching portion as the basic clock control signal when a low speed rate is selected as the data transmission rate;

a second frequency-dividing circuit which outputs a basic clock signal of which a duty ratio is different between an amplitude-modulation mode and a frequency-modulation mode, and of which a cycle is different according to a data transmission rate, according to the second reset signal and the basic clock control signal; and an ASK/FSK switching portion comprising an ASK signal generating portion and an output signal switching portion, wherein the Manchester-encoded information is input to the ASK signal generating portion, wherein in a case where the sub-carrier wave responding to the amplitude-modulation mode and the output signal from the first frequency-dividing circuit is input to the ASK signal generating portion, the ASK signal generating portion processes arithmetically the sub-carrier wave responding to the amplitude-modulation mode and the Manchester-encoded information, and an amplitude-modulation signal is output from the ASK signal generating portion to be input to the output signal switching portion, and wherein in a case where the frequency-modulation signal responding to the frequency-modulation mode is input to the ASK signal generating portion, the frequency-modulation signal is output from the ASK signal generating portion to be input to the output signal switching portion.

3. The semiconductor device according to claim 1 or 2, wherein the ASK/FSK switching portion comprises:

an ASK signal generating portion to which the Manchester-encoded information and a sub-carrier wave responding to the amplitude-modulation mode or the frequency-modulation signal responding to a frequency-modulation mode output from the first frequency-dividing circuit are input, which outputs an amplitude-modulation signal by arithmetically processing the sub-carrier wave responding to the amplitude-modulation mode and the Manchester-encoded information, and outputs the frequency-modulation signal; and an output signal switching portion to which an output from the ASK signal generating portion is input, which outputs the amplitude-modulation signal or the frequency-modulation signal, by switching the two, according to the modulation mode select signal.

4. The semiconductor device according to claim 1 or 2, wherein a control signal from the first frequency-dividing circuit and a count signal from the second frequency-dividing circuit are input to the reset control circuit.

5. The semiconductor device according to claim 1 or 2, further comprising:

an encoding circuit to which each data of flag, DSFID, UID, and CRC is input sequentially, which Manchester-encodes them and outputs them sequentially; and an SOF-EOF adding circuit to which an output of the encoding circuit is input, which generates the Manchester-encoded information by adding SOF and EOF to the output of the encoding circuit, and outputs the Manchester-encoded information.

6. The semiconductor device according to claim 1 or 2, further comprising a modulating circuit to which the amplitude-modulation signal or the frequency-modulation signal is input from the ASK/FSK switching portion, which load-modulates the carrier wave by the amplitude-modulation signal or the frequency-modulation signal.

7. The semiconductor device according to claim 1 or 2, further comprising:

a modulating circuit to which the amplitude-modulation signal or the frequency-modulation signal is input from the ASK/FSK switching portion, which load-modulates the carrier wave by the amplitude-modulation signal or the frequency-modulation signal; and an antenna which transmits the load-modulated carrier wave.

8. A wireless communication system comprising the semiconductor device according to claim 1 or 2, and a reader/writer which inputs and outputs data from/to the semiconductor device by wireless communication.

* * * * *